United States Patent

Dodds, Jr. et al.

[15] 3,648,245

[45] Mar. 7, 1972

[54] TIME-SHARED APPARATUS FOR OPERATING PLURAL DISPLAY MEDIA, AND DISPLAY METHODS INCLUDING PAGING, DISPLAYING SPECIAL FORMS AND DISPLAYING INFORMATION IN TABULATED FORM

[72] Inventors: Thomas J. Dodds, Jr., Secane, Del.; Clegg Eagleson, Philadelphia; Harold F. Gibson, Downingtown, both of Pa.

[73] Assignee: Burroughs Corporation, Detroit, Mich.

[22] Filed: Jan. 30, 1970

[21] Appl. No.: 7,055

[52] U.S. Cl. ........ 340/172.5
[51] Int. Cl. ........ G06f 3/14
[58] Field of Search ........ 340/172.5, 324 A

[56] References Cited

UNITED STATES PATENTS

| | | | |
|---|---|---|---|
| 3,323,119 | 5/1967 | Barcomb et al. | 340/172.5 X |
| 3,500,338 | 3/1970 | Cuccio et al. | 340/172.5 |
| 3,505,665 | 4/1970 | Lasoff et al. | 340/324 |
| 3,524,182 | 8/1970 | Criscimagna et al. | 340/324 |
| 3,248,705 | 4/1966 | Dammann et al. | 340/172.5 |
| 3,346,853 | 10/1967 | Koster et al. | 340/172.5 |
| 3,364,473 | 1/1968 | Reitz et al. | 340/172.5 |
| 3,453,384 | 7/1969 | Donner et al. | 340/172.5 X |
| 3,501,746 | 3/1970 | Vosbury | 340/172.5 |

*Primary Examiner*—Gareth D. Shaw
*Assistant Examiner*—Melvin B. Chapnick
*Attorney*—Paul W. Fish, Edward J. Feeny, Jr. and Charles S. Hall

[57] ABSTRACT

A cathode-ray tube display terminal having a single cathode-ray tube keyboard-monitor or plural cathode-ray tube keyboard-monitors which time-share a magnetic core memory, a symbol generator, a printer and an input/output section for two-way communication with a digital computing system. The digital computing system may select any one of the keyboard-monitors, or some or all of the keyboard-monitors to receive information. Methods are disclosed for displaying information in tabulated form, for transmitting and receiving information in excess of the capacity of the cathode-ray tube screen, and for displaying special forms which limit operator access to predefined areas of the cathode-ray tube screen.

14 Claims, 54 Drawing Figures

INVENTORS.
THOMAS J. DODDS JR.
CLEGG EAGLESON
HAROLD F. GIBSON

BY

Samuel Kane
ATTORNEY

INVENTORS.
THOMAS J. DOODS JR.
CLEGG EAGLESON
HAROLD F. GIBSON
BY
Samuel Kane
ATTORNEY INVENTORS.
THOMAS J. DODDS JR.
CLEGG EAGLESON
HAROLD F. GIBSON
BY
Samuel Kane
ATTORNEY INVENTORS.
THOMAS J. DODDS JR.
CLEGG EAGLESON
HAROLD F. GIBSON
BY
Samuel Kane
ATTORNEY INVENTORS.
THOMAS J. DODDS JR.
CLEGG EAGLESON
HAROLD F. GIBSON
BY
Samuel Kane
ATTORNEY

| ADR-2 | ADR-1 | KEYBOARD SEND PRIORITY |
|---|---|---|
| 0 | 0 | K-0 |
| 0 | 0 | K-1 |
| 1 | 0 | K-2 |
| 1 | 1 | K-3 |

NOTE:
1 = SET
0 = RESET

INVENTORS.
THOMAS J. DODDS JR.
CLEGG EAGLESON
HAROLD F. GIBSON
BY Samuel Kane
ATTORNEY

| | | $\overline{\text{SEND}}$ | SEND |
|---|---|---|---|
| PC0 | $\overline{\text{TRANSMIT}}$ (RECEIVE) | ENQ<br>POLL MESSAGE<br>SELECT MESSAGE<br>CONTENTION MESSAGE | |
| PC1 | TRANSMIT | SELECT RESPONSE(ACK OR NAK)<br>NO TRAFFIC POLL RESPONSE(EOT)<br>REQUEST TO TRANSMIT(ENQ IN POINT TO POINT. POL MESSAGE IF IN CONTENTION MODE WITH POL & SEL OPTION) | ALL DATA |
| PC2 | $\overline{\text{TRANSMIT}}$ (RECEIVE) | ALL DATA (FROM STX TO ETB OR ETX INCLUDING ESC SEQUENCES)<br>[GO TO PC0 IF EOT RECEIVED] | RESPONSE TO TRANSMIT MESSAGE(ACK OR NAK)<br>WAIT TO RETRANSMIT<br>WAIT FOR REQUEST TO TRANSMIT RESPONSE(POINT TO POINT)<br>[GO TO PC0 IF EOT RECEIVED] |
| PC3 | TRANSMIT | RESPONSE TO RECEIVED MESSAGE(ACK OR NAK)<br>[GO TO PC2] | END OF TRANSMISSION (EOT) |

Fig.17

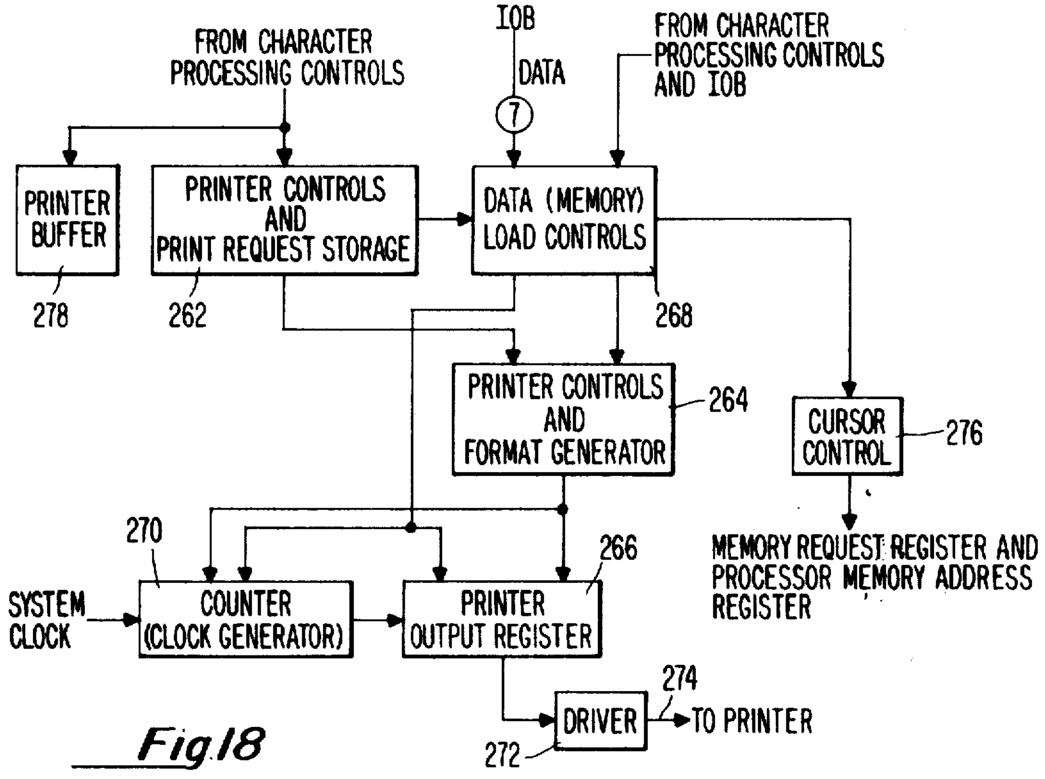

Fig.18

| BITS | | | | | | | | | | | | |
|---|---|---|---|---|---|---|---|---|---|---|---|---|
| b7 → | | | | | 0 | 0 | 0 | 0 | 1 | 1 | 1 | 1 |
| b6 → | | | | | 0 | 0 | 1 | 1 | 0 | 0 | 1 | 1 |
| b5 → | | | | | 0 | 1 | 0 | 1 | 0 | 1 | 0 | 1 |
| b4 | b3 | b2 | b1 | COLUMN → / ↓ ROW | 0 | 1 | 2 | 3 | 4 | 5 | 6 | 7 |
| 0 | 0 | 0 | 0 | 0 | | | SP | 0 | @ | P | | POL |
| 0 | 0 | 0 | 1 | 1 | SOH | | ≥ | 1 | A | Q | | |
| 0 | 0 | 1 | 0 | 2 | STX | | " | 2 | B | R | | |
| 0 | 0 | 1 | 1 | 3 | ETX | | # | 3 | C | S | | |
| 0 | 1 | 0 | 0 | 4 | EOT | | $ | 4 | D | T | | |
| 0 | 1 | 0 | 1 | 5 | ENQ | NAK | % | 5 | E | U | | |
| 0 | 1 | 1 | 0 | 6 | ACK | SYN | & | 6 | F | V | | |
| 0 | 1 | 1 | 1 | 7 | | | ≤ | 7 | G | W | | |
| 1 | 0 | 0 | 0 | 8 | | | ( | 8 | H | X | | |
| 1 | 0 | 0 | 1 | 9 | HT | | ) | 9 | I | Y | | |
| 1 | 0 | 1 | 0 | 10 | LF | | * | : | J | Z | | |
| 1 | 0 | 1 | 1 | 11 | VT | | + | ; | K | [ | | |
| 1 | 1 | 0 | 0 | 12 | | | , | < | L | X | | |
| 1 | 1 | 0 | 1 | 13 | CR | GS | - | = | M | ] | | |
| 1 | 1 | 1 | 0 | 14 | | RS | . | > | N | ≠ | | |
| 1 | 1 | 1 | 1 | 15 | | US | / | ? | O | ← | | |

NUL—NULL
SOH—START OF HEADER(CC)
STX—START OF TEXT(CC)
ETX—END OF TEXT (CC)
ENQ—ENQUIRY (CC)
HT—HORIZONTAL TABULATION (FE)-FIXED TAB
VT—VARIABLE TABULATION(FE)-VARIABLE TAB
LF—LINE FEED (FE)
EOT—END TRANSMISSION (CC)

ACK—ACKNOWLEDGE (CC)
NAK—NEGATIVE ACKNOWLEDGE(CC)
POL—POLL
SYN—SYNCHRONOUS IDLE (CC)
GS—GROUP SEPARATOR (IS)
CR—CARRIAGE RETURN (FE)
US—UNIT SEPARATOR (IS)
RS—RECORD SEPARATOR(IS)

(CC)—COMMUNICATION CONTROL
(IS)—INFORMATION SEPARATOR
(FE)—FORMAT EFFECTOR

Fig.19

| BITS | | | | b7 → | 0 | 0 | 0 | 0 | 1 | 1 | 1 | 1 |
|---|---|---|---|---|---|---|---|---|---|---|---|---|
| | | | | b6 → | 0 | 0 | 1 | 1 | 0 | 0 | 1 | 1 |
| | | | | b5 → | 0 | 1 | 0 | 1 | 0 | 1 | 0 | 1 |
| b4 | b3 | b2 | b1 | COLUMN → / ↓ ROW | 0 | 1 | 2 | 3 | 4 | 5 | 6 | 7 |
| 0 | 0 | 0 | 0 | 0 | NUL | DLE | SP | 0 | @ | P | \ | p/POL |
| 0 | 0 | 0 | 1 | 1 | SOH | | ≥ | 1 | A | Q | a | q/SEL |
| 0 | 0 | 1 | 0 | 2 | STX | | " | 2 | B | R | b | r/SEQ |
| 0 | 0 | 1 | 1 | 3 | ETX | | # | 3 | C | S | c | s/FSL |
| 0 | 1 | 0 | 0 | 4 | EOT | | $ | 4 | D | T | d | t/BSL |
| 0 | 1 | 0 | 1 | 5 | ENQ | NAK | % | 5 | E | U | e | u |
| 0 | 1 | 1 | 0 | 6 | ACK | SYN | & | 6 | F | V | f | v |
| 0 | 1 | 1 | 1 | 7 | BEL/CON | ETB | ≤ | 7 | G | W | g | w |
| 1 | 0 | 0 | 0 | 8 | | | ( | 8 | H | X | h | x |
| 1 | 0 | 0 | 1 | 9 | HT | | ) | 9 | I | Y | i | y |
| 1 | 0 | 1 | 0 | 10 | LF | | * | : | J | Z | j | z |
| 1 | 0 | 1 | 1 | 11 | VT | ESC | + | ; | K | [ | k | { |
| 1 | 1 | 0 | 0 | 12 | FF | | | < | L | x | l | \| |
| 1 | 1 | 0 | 1 | 13 | CR | GS | - | = | M | ] | m | } |
| 1 | 1 | 1 | 0 | 14 | | RS | • | > | N | ≠ | n | ¬ |
| 1 | 1 | 1 | 1 | 15 | | US | / | ? | O | ← | o | DEL |

NUL—NULL (CC)
SOH—START OF HEADER (CC)
STX—START OF TEXT (CC)
ETX—END OF TEXT (CC)
HT—HORIZONTAL TABULATION (FE)-FIXED TAB
LF—LINE FEED (FE)
VT—VARIABLE TABULATION (FE)-VARIABLE TAB
FF—FORM FEED (FE)
RS—RECORD SEPARATOR (IS)
EOT—END OF TRANSMISSION (CC)
NAK—NEGATIVE ACKNOWLEDGE (CC)
ACK—ACKNOWLEDGE (CC)
BEL—ATTENTION SIGNAL (CC)
POL—POLL
SEL—SELECT
SYN—SYNCHRONOUS IDLE (CC)
ESC—ESCAPE (CC)
GS—GROUP SEPARATOR (IS)
GSL—GROUP SELECT
DEL—DELETE
CR—CARRIAGE RETURN (FE)
US—UNIT SEPARATOR (IS)
ENQ—ENQUIRY (CC)
ETB—END OF TRANSMISSION BLOCK (CC)
DLE—DATA LINK ESCAPE (CC)
FSL—FAST SELECT
BSL—BROADCAST
CON—CONTENTION
SEQ—SEQUENTIAL (CC)—COMMUNICATION CONTROL
(IS)—INFORMATION SEPARATOR
(FE)—FORMAT EFFECTOR

Fig. 20

Fig. 28
Fig. 29
| MEMORY CELL | M-15 | M-16 | M-17 | M-18 | M-19 | M-20 | M-21 |
|---|---|---|---|---|---|---|---|
| CELL CONTENT (6-BIT BYTE) | A | D | R | E | S | S | |
| | | | ↑ CURSOR POSITION | | | | |
Fig. 30
| MEMORY CELL | M-15 | M-16 | M-17 | M-18 | M-19 | M-20 | M-21 |
|---|---|---|---|---|---|---|---|
| CELL CONTENT (6-BIT BYTE) | A | D | D | R | E | S | S |
| | | | | ↑ CURSOR POSITION | | | |
Fig. 31
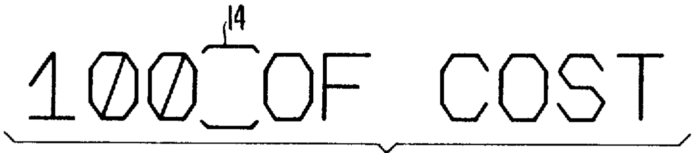
Fig. 32
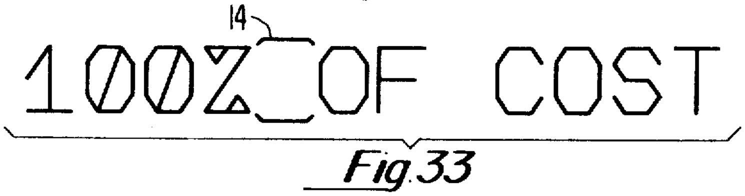
Fig. 33
| MEMORY CELL | M-40 | M-41 | M-42 | M-43 | M-44 | M-45 | M-46 | M-47 | M-48 | M-49 | M-50 | M-51 | M-52 |
|---|---|---|---|---|---|---|---|---|---|---|---|---|---|
| CELL CONTENT (6-BIT BYTE) | 1 | 0 | 0 | SP | O | F | SP | C | O | S | T | | |
| | | | | ↑ CURSOR POSITION | | | | | | | | | |
Fig. 34
| MEMORY CELL | M-40 | M-41 | M-42 | M-43 | M-44 | M-45 | M-46 | M-47 | M-48 | M-49 | M-50 | M-51 | M-52 |
|---|---|---|---|---|---|---|---|---|---|---|---|---|---|
| CELL CONTENT (6-BIT BYTE) | 1 | 0 | 0 | ESC | ≥ | SP | O | F | SP | C | O | S | T |
| | | | | | | ↑ CURSOR POSITION | | | | | | | |
Fig. 35

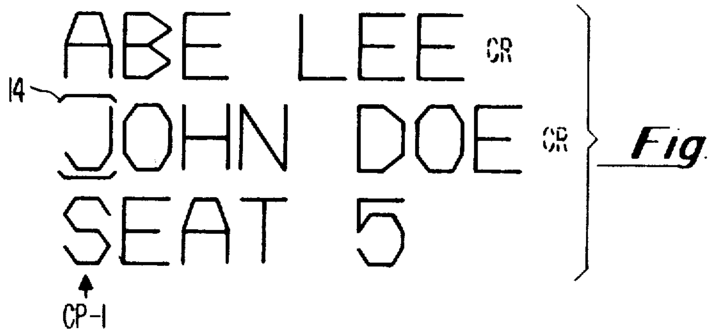
Fig 42
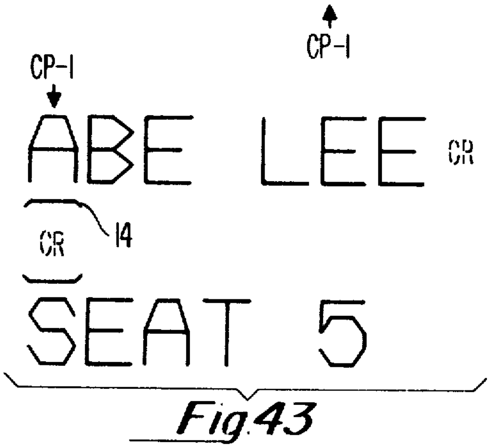
Fig 43
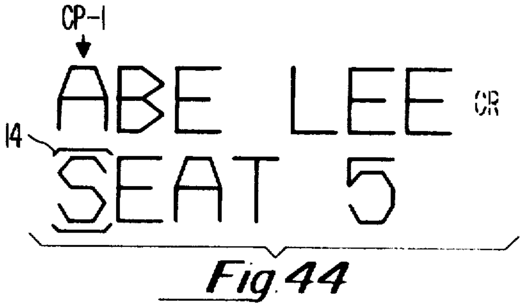
Fig 44
Fig 45
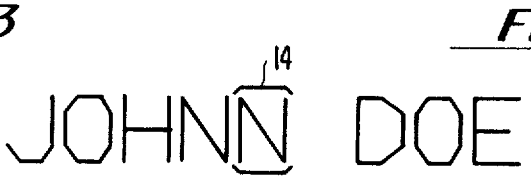
Fig 46
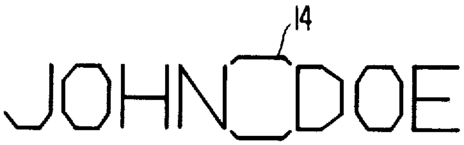
| MEMORY CELL | M-25 | M-26 | M-27 | M-28 | M-29 | M-30 | M-31 | M-32 | M-33 |
|---|---|---|---|---|---|---|---|---|---|
| CELL CONTENT (6-BIT BYTE) | J | O | H | N | N | SP | D | O | E |
| | | | | | ↑ CURSOR POSITION | | | | |
Fig 47
| MEMORY CELL | M-25 | M-26 | M-27 | M-28 | M-29 | M-30 | M-31 | M-32 | M-33 |
|---|---|---|---|---|---|---|---|---|---|
| CELL CONTENT (6-BIT BYTE) | J | O | H | N | SP | D | O | E | |
| | | | | | ↑ CURSOR POSITION | | | | |
Fig 48

TIME-SHARED APPARATUS FOR OPERATING PLURAL DISPLAY MEDIA, AND DISPLAY METHODS INCLUDING PAGING, DISPLAYING SPECIAL FORMS AND DISPLAYING INFORMATION IN TABULATED FORM

BACKGROUND OF THE INVENTION

This invention relates generally to data handling systems, and particularly to such systems wherein the data is converted to a perceptible form such as for presentation on the face or screen of a cathode-ray tube. A somewhat similar data handling system is described and claimed in a copending application of Murray Lasoff, Irwin R. Holmes, and Thomas J. Dodds, Jr. entitled "Display System," Ser. No. 557,194, filed June 13, 1966, now U.S. Pat. No. 3,505,665 and assigned to the same assignee as the instant invention. The display terminal which embodies the present invention is a general purpose input/output display apparatus which was specifically designed for use in areas such as offices, reception rooms and other similar locations, however, the invention is not limited to such uses.

SUMMARY OF THE INVENTION

An object of the invention is to provide improvements in data handling systems.

More specifically, it is an object of this invention to provide improvements in data handling systems for display applications.

A further object of the invention is to provide a display system in which plural display devices are controlled so as to time-share a storage device which stores data to be displayed on their display media.

Another object of the invention is to provide a display system in which plural display devices are controlled so as to time-share a symbol generator.

Another object of the invention is to provide a display system in which plural display devices are controlled so as to time-share an output device.

Still another object of the invention is to provide a display system in which plural display devices are controlled so as to time-share an input/output section.

A further object of the invention is to provide a display system in which plural display devices are controlled with one set of controls.

Another more specific object of the invention is to provide a display system in which plural display devices may perform tabulating functions on their display media similar to that performed in a typewriting machine.

Another more specific object of the invention is to provide a display system in which plural display devices may have a data-processor-generated form displayed on their display media, which form may or may not be alterable by the operator.

Still another more specific object of the invention is to provide a display system in which a paging feature permits an operator of a display device to effect receipt of a quantity of data from a data processor which may be in excess of the capacity of the display medium of the display device.

Another object of the invention is to provide a display system which may be used with a variety of communication selection and checking techniques.

In accordance with the above objects and considered first in one of its broader aspects, a display terminal according to the invention may comprise a plurality of display media, storage means for storing groups of character codes each group representative of symbols to be displayed on one of the display media, and means common to the display media and responsive to the character codes of each group for generating the representative symbol information to the associated one of the display media to be used in effecting the display and including a common blanking control for controlling blanking of the display on each of the display media. Also provided is a means for generating a sequence of pulses in successive time periods each pulse associated with one of the display media and a steering means is also provided which is responsive to each one of the pulses for steering the output of the blanking control in each time period so that in each time period the display of the associated display medium is enabled and the display of the other display media is blanked.

One of the methods of the invention permits information to be displayed at fixed tab positions. Another method permits the transmission, receipt and display of a number of pages of information where each page except, perhaps, the last page corresponds to a full, or substantially full, cathode-ray tube screen. A third method permits the display of special forms, one of which is alterable and the other unalterable, and limits operator access to certain areas of the cathode-ray tube screen. In the alterable mode, the operator can expand or contract the operator areas of the screen.

The invention will be more clearly understood when the following description of the preferred embodiment and methods thereof is read in conjunction with the accompanying drawing which is described below.

BRIEF DESCRIPTION OF THE DRAWING

FIG. 17 is a tabulation of the mode control summary.

FIG. 18 is a block diagram of the circuitry in a printer interface.

FIG. 19 is a tabulation of illustrative symbol or character codes used in the Transmit mode.

FIG. 20 is a tabulation of illustrative symbol or character codes used in the Receive mode.

FIG. 28 illustrates the display of a misspelled word.

FIG. 29 illustrates the result of inserting a character into the display of FIG. 28.

FIG. 30 shows the memory cell content of the display in FIG. 28.

FIG. 31 shows the memory cell content of the display shown in FIG. 29.

FIG. 32 illustrates a display prior to inserting one of the eight excess characters (%).

FIG. 33 illustrates the result of inserting an excess-type character into the display of FIG. 32.

FIG. 34 shows the memory cell content of the display in FIG. 32.

FIG. 35 shows the memory cell content of the display shown in FIG. 33.

FIG. 42 illustrates a display prior to deleting an entire line of characters.

FIG. 43 illustrates the result of deleting a line of characters in FIG. 42.

FIG. 44 illustrates the result of deleting the new-line character in FIG. 43.

FIG. 45 illustrates a misspelled name.

FIG. 46 illustrates the result of deleting a character in the display of FIG. 45.

FIG. 47 shows the memory cell content of the display in FIG. 45.

FIG. 48 shows the memory cell content of the display in FIG. 46.

DESCRIPTION OF THE PREFERRED EMBODIMENT

INTRODUCTION

Figure 1:
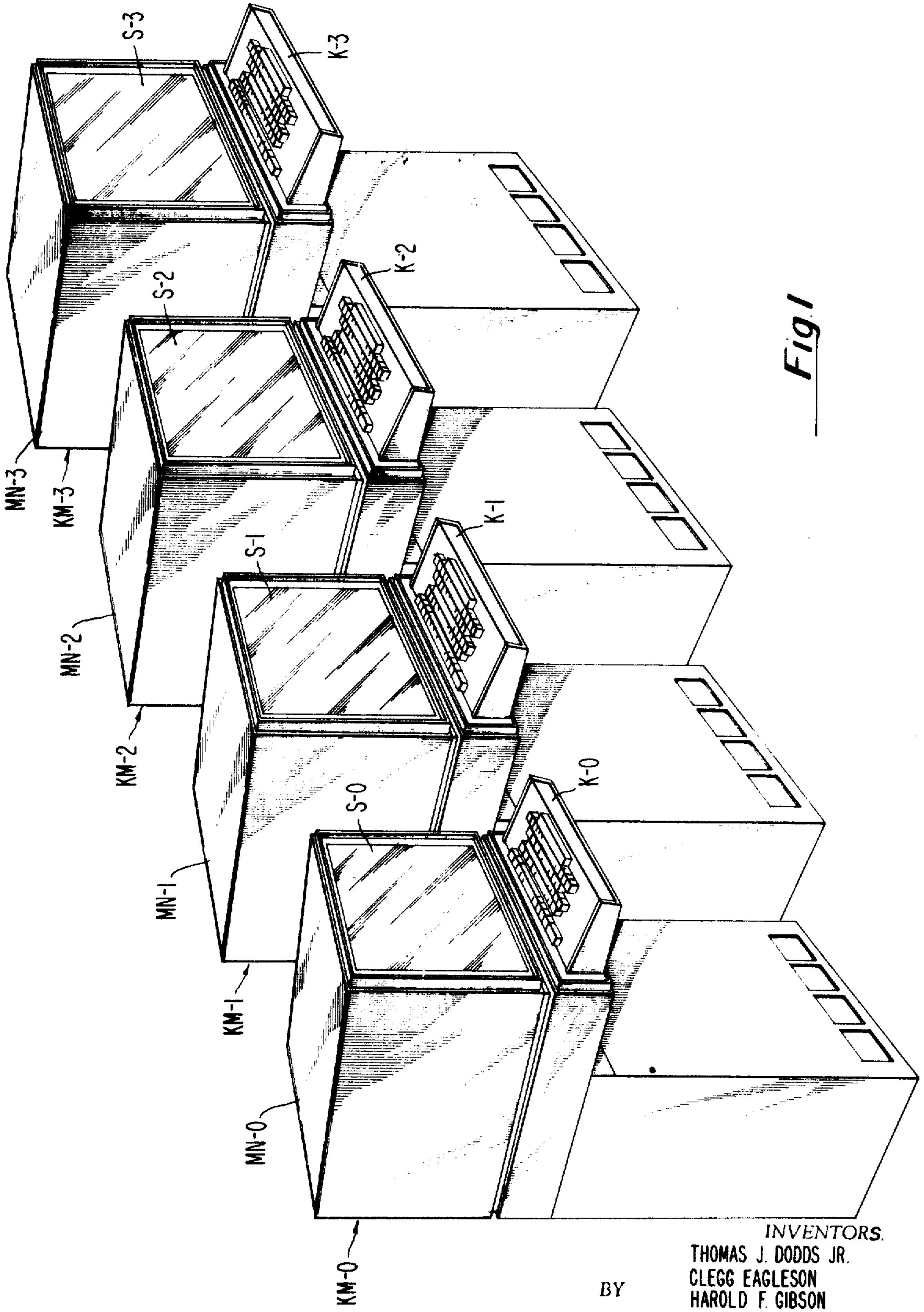
FIG. 1 is a perspective view of a number of display sets embodying the invention.

The illustrated embodiment of the invention, or display terminal (hereafter also "Terminal") may have one or more keyboard-monitors and incorporates for each keyboard-monitor a keyboard for data entry, and a cathode-ray tube monitor, along with a character or symbol generator, for data display. The display has a repertoire of 66 alphanumeric and special symbols, plus space and nondestructive cursor. The content of the internal storage is sampled, converted to stroke code, and displayed 50 to 60 times per second to produce a display presentation with 2,000 character positions on each cathode-ray tube arranged as 25 lines of 80 characters each. The memory is partitioned if there is more than one keyboard-monitor, and the associated logic time-shared by the separate, functionally independent keyboard-monitors.

Internal storage is provided for the data to be displayed and the data content of this internal storage, or memory, is generated or altered by a keyboard, or by an incoming message, or both. All or part of the content of storage may be transmitted as an outgoing message upon initiation by a keyboard. A multiwire direct system interface is standard. This interface is also compatible with several Bell System sets utilizing either 2-wire or 4-wire private lines or DATA-PHONE service for communications circuit or with a 2-wire circuit. DATA-PHONE service is a data transmission service supplied by the Bell System. This service utilizes the switched telephone network and includes the use of the following features of this network:

DDD (Direct Distance Dialing)

WATS (Wide Area Telephone Service)

PBX (Private Branch Exchange)

Automatic alternate routing

The data sets used with the Bell System data transmission service are termed DATA-PHONE data sets whether they utilize the switched network or private lines. The display Terminal interfaces with one of these data sets which is coupled to a communications system, such as a digital computing system or a data processor (hereafter also "System").

The invention contains a magnetic core memory with 1,024 six-bit bytes. As indicated earlier, the entire memory may be associated with a single monitor and keyboard, or the memory may be divided into a number of equal sections with each section or group of sections associated with a separate monitor and keyboard. Each section or group of sections associated with a particular keyboard is loaded by that keyboard or by an incoming message from the System addressed to the associated monitor. The content of each section or group of sections of the memory is displayed on the associated monitor at a flicker-free refresh rate. All or part of the display data content of a section or group of sections of the memory is transmitted as an outgoing message upon command from the associated keyboard.

For each keyboard-monitor in the Terminal, six memory bytes are reserved for internal functions, and the remainder of the memory assigned to the keyboard-monitor is available for the storage of display data. The number of bytes available for display data on a monitor is dependent upon the number of monitors chosen and the number of sections of memory assigned to each monitor. With a Terminal employing an illustrative number of four keyboard-monitors, as in the present embodiment, the memory section and byte assignments are as follows:

| Number of sections of memory assigned to monitor | Total number of memory bytes assigned to monitor | Number of display data memory bytes assigned to monitor |
|---|---|---|
| 1 | 256 | 250 |
| 2 | 512 | 506 |
| 3 | 768 | 762 |
| 4 | 1024 | 1018 |

The display data consists of both graphic and format effector character codes. The graphic characters are displayed while the format effectors are not displayed. The space character is considered to be a graphic.

The first display data memory byte corresponds to the upper left screen position. If this character is a graphic, the next memory byte corresponds to the next screen position on the line. Each graphic character in memory assigns the next memory byte to the next screen position across each line and automatically from the end of one line to the beginning of the next line. A format effector in memory assigns the next memory byte to a screen position dependent upon the format effector. For example, the format effector character CR (carriage return) for a new line assigns the next memory byte to the first position of the next line; therefore, the screen positions after the CR screen position do not have an associated byte in memory. These screen positions are referred to as unassigned positions. Two memory bytes are required for eight of the graphic characters, $ % & ≤ X ] ≠ and ←. One memory byte is required for each screen for the end-of-screen position which is included in the six bytes mentioned above.

Corresponding to each of the graphic codes stored in memory, the appropriate graphic character is generated by using up to 12 straight line strokes to form the character. A cursor presentation is also provided. It appears at the character position where the next keyboard or input/output operation is to take place. The character is formed on the screen as a set of horizontal brackets that embrace the character position, such that the character to be edited remains viewable.

The invention may use various character codes, however, for purposes of illustration, the disclosed embodiment uses a modified limited subset of the USA Standard Code for Information Interchange (ASCII), USAS X3.4. FIGS. 19 and 20 designate the characters to each bit ($b_1$ to $b_7$) character code. With the exception of five character substitutions, namely the characters ≥, ≤, X, ≠ and ← in lieu of the characters ! ' / ∧ and _, respectively, the tables agree with the proposed ASCII. FIG. 20 applies to incoming (Receive) messages which FIG. 19 applies to outgoing (Transmit) messages. These tables differ only in the inclusion of certain characters.

Operation of the Terminal may be considered to consist of four phases: Composition, Send, Wait, and Receive. The modes are independent for each keyboard.

Figure 8:
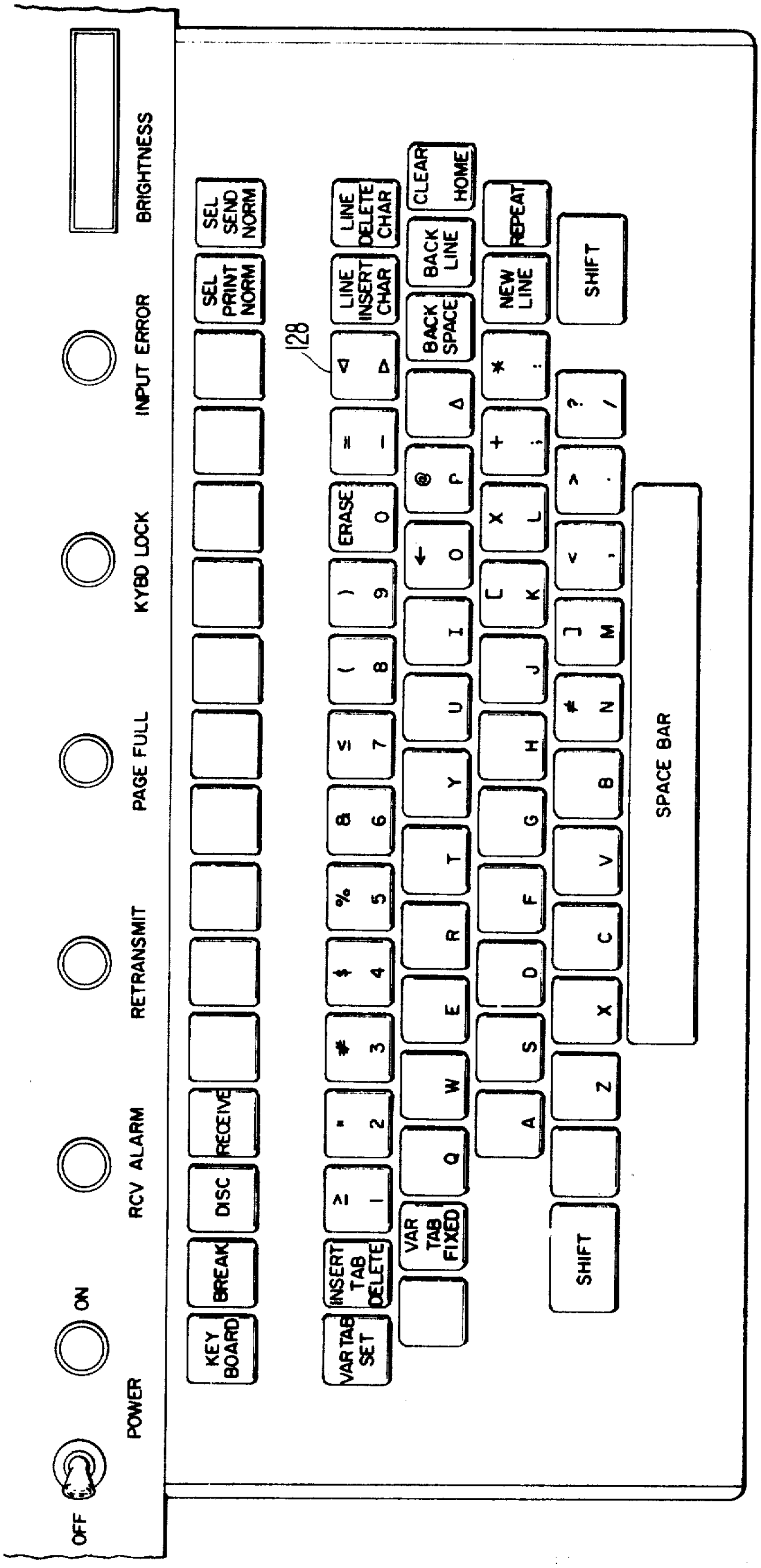
FIG. 8 is a diagrammatic illustration of a typical keyboard.

In the Composition phase, which is evoked by depressing the KEYBOARD key, the operator may compose a message by using the keyboard shown diagrammatically in FIG. 8. The operator has complete freedom to edit and compose information anywhere on the screen (except with the forms mode option, which will be described later on). The Composition phase is ended by depressing the SEND or PRINT keys, either of which evokes the Send phase. During the Composition phase, the KEYBOARD LOCK indicator is off.

The keyboard consists of graphic, cursor movement, and control keys. Certain of the keys work in conjunction with the SHIFT key.

Depressing a graphic key causes the character depicted by the keystop designation to appear at the position of the cursor. If the cursor position already displays a graphic character, the existing character is replaced by the new character. The cursor moves forward one position. When a graphic key is operated with the cursor in the last position of the line, the cursor moves to the first position of the next line down, except that the cursor does not move from the last position of the last line.

Graphic keys with dual keytop designations work in conjunction with the SHIFT key. With the SHIFT key not depressed, the character depicted by the lower keytop designation appears at the position of the cursor. With the shift key depressed, the character depicted by the upper keytop designation appears at the position of the cursor. Keys with single keytop designations are independent of the SHIFT key.

Keys are included to move the cursor forward or backward a single position, or to the first position of the next line down, the same line, the next line up, or the top line. Some of these keys also have erase capability when used in conjunction with the SHIFT key. In addition, horizontal tabulation is provided. Fixed tab stops are provided for the first screen character position and every eighth character position thereafter, i.e., character positions 1, 9, 17, 25, 33, 41, 49, 57, 65, and 73.

A cursor movement operation which moves the cursor to a screen position to which a memory byte is assigned does not alter the content of memory. A cursor movement operation from an assigned position to an unassigned position alters the content of the memory to make the new cursor position an assigned position, e.g., a new-line or carriage return character CR is inserted in memory when the NEW LINE key is operated if the first position of the next line is unassigned.

Depressing a space bar moves the cursor forward one position. From the last position of a line the cursor moves to the first position of the next line down; except that the cursor does not move from the last position of the last line. With the SHIFT key depressed, depressing the space bar also causes the space character SP to replace the character at the cursor position before the cursor is moved. (In this regard, the space character is considered to be graphic.)

Depressing a BACKSPACE key moves the cursor backward one position, unless the cursor is in the first position of the line, in which case the cursor is positioned to the last character position of the line above. The BACKSPACE key is inoperative when the cursor is in the first position of the top line.

Depressing a NEW LINE key moves the cursor to the first position of the next line down. The NEW LINE key is inoperative when the cursor is in the last line.

A BACK LINE key is provided for moving the cursor to the first position of the same line if it is not positioned at the first position of the line. When it is positioned at the first position of a line, the cursor is moved to the first position of the next line above. The BACK LINE key is inoperative when the cursor is in the first position of the top line.

A CLEAR/HOME key is also provided for moving the cursor to the first position of the top line. With the SHIFT key depressed, depressing the CLEAR/HOME key also clears the screen.

With the SHIFT key not depressed, the TAB key moves the cursor to the next tab stop (fixed or variable). If there is no tab stop to the right of the cursor, the cursor will move to the first tab stop on the next line except when the cursor is in the last line. The TAB key is used in conjunction with a depressed SHIFT key for performing a single variable tab function.

With the SHIFT key depressed, depressing the TAB INSERT key causes a fixed tab character to be inserted at the cursor position. The cursor does not move. If the line contains more than 72 character positions, the tab insert function is inhibited. If the cursor is positioned over a tab character, depressing the TAB DELETE key causes the deletion of the tab character and as a result the character at the next tab stop (which may not be displayed) moves leftwardly to the cursor position and the following characters move leftwardly a corresponding number of positions or a full tab stop.

A REPEAT key is also provided for causing repetition at a suitable rate, for example, 10 times per second, of the function defined by a graphic or format effector key that is operated concurrently with the REPEAT key. Either key may be operated first, repetition stops when either key is released.

With the SHIFT key not depressed, depressing a SEND key invokes "Frame Send" to the System interface. This mode of transmitting will be described shortly. With the SHIFT key depressed, depressing the SEND key evokes "Selective Send" to the System interface. This mode of transmitting will also be described shortly.

Various indicators are included on each keyboard-monitor to enable each operator to ascertain the status of his keyboard-monitor. These are described below.

A POWER indicator is turned on when the monitor power ON switch is activated.

An INPUT ERROR indicator is turned on when an input error is detected. The INPUT ERROR indicator is turned off by the start of a Receive message.

A RETRANSMIT indicator is turned on when in the point-to-point configuration the System gives no response within a specified time. The RETRANSMIT indicator is turned off by depressing the SEND key.

A RECEIVE ALARM indicator is turned on when the System attempts to send a message to a keyboard-monitor which is not in the Wait phase. The RECEIVE ALARM indicator is turned off when the keyboard-monitor is placed in the Wait phase.

A KEYBOARD LOCK Indicator is turned on whenever the SEND, PRINT, or RECEIVE keys are activated, or a Broadcast Select (BSL), a Group Select (GSL), or a Sequential Select (SEQ) message is received. It is turned off by either operating a KEYBOARD switch or whenever the Terminal ends the Receive phase or terminates the print operation.

A PAGE FULL indicator is on whenever the display reaches the 25th line on the cathode-ray tube screen, or the memory contains the maximum number of display data memory bytes.

The Send phase may be evoked by the keyboard operator to send a display data message to the System. In this phase, the KEYBOARD LOCK indicator is on. Upon completion of sending a message, the Terminal goes to the Wait phase.

There are two types of display data Send operations, Selective Send and Frame Send. The text generated by Selective Send is the content of memory corresponding to the display data from the cursor position to, but not including the first following group separator character GS or to and including the last data character, whichever occurs first. In Frame Send, the text is the content of memory corresponding to all the display data on the screen.

The operator normally either completes his composition by writing the group separator character GS and then positions the cursor to the beginning of his message before evoking Selective Send, or he evokes Frame Send. In either case, following the Send operation, the cursor is left in its original position on the screen and the receipt of an acknowledge character code response ACK from the System positions the cursor to either the end of the screen, or, in the case of Selective Send, over the group separator character GS.

The KEYBOARD LOCK indicator is on during the Wait phase. A receive message terminates the Wait phase and evokes the Receive phase. If the operator terminates the Wait phase with the KEYBOARD key, the keyboard returns to the Composition phase.

The Receive phase is evoked by the start of a Receive message addressed to the associated screen. The keyboard is inoperative. The INPUT ERROR indicator is reset at the beginning of the Receive message.

The Terminal examines the input data bits as characters and places the particular keyboard-monitor in the Receive phase when a start-of-text character code STX is detected. The characters following are processed until an end-of-text character code ETX, or an end-of-transmission-block character code ETB, is detected.

The System may send a message to the Terminal at any time. However, the System usually only responds to a message from the Terminal. When the System sends a message to the Terminal for another reason, that message is termed an unsolicited message and causes the appropriate RECEIVE ALARM indicator to be lit. This feature allows the System to inform the Terminal operator that it has traffic to send. The operator may place the particular keyboard-monitor in the Wait phase by depressing the RECEIVE key. Broadcast, Group Select and Sequential Select messages may be unsolicited message which automatically lock the keyboard and evoke the Receive phase.

Also, during the Receive phase, the System has control of the particular keyboard-monitor. The display data in the Receive message may be preceded by a form feed character code FF which clears the screen and causes subsequent message display data to be loaded starting in the first display memory byte (which corresponds to the first display position). Otherwise, the graphic data and format effectors load starting in the memory location corresponding to the screen position of the cursor. At the end of an error-free message, the cursor is left positioned in the position after the last display character received. In the case of an input error, the cursor is left in the original position before reception of the message.

Receive data that exceeds the capacity of either the screen or its allocated portion of memory is discarded. The INPUT ERROR indicator is turned on to indicate such loss of data. The response to a message containing an overflow error is a negative acknowledge character code NAK transmitted by the Terminal to the System.

During the Receive phase, message integrity is checked by checking each character individually for correct character parity. If the message does not pass this test, the INPUT ERROR indicator is turned on, and a question mark character (!) is substituted for each character in error.

The various text characters that are received by the Terminal are termed graphics, format effectors, and control characters. Each received graphic character and some format effectors are stored in the display data portion of the particular section of memory.

Receipt of any of the graphic characters shown in FIG. 20 columns 2 through 5, causes storage of that character in memory. As indicated earlier, the space character SP is considered to be a graphic. The group separator character GS is also treated as a graphic and has no control significance in the Receive phase. Characters from columns 6 and 7, except for the last four characters in column 7, including delete, are translated to the equivalent character in columns 4 and 5 by changing bit $b_6$ to O. Thus, received lower case characters are displayed (and may be later transmitted) as upper case characters.

The format effector characters including carriage return CR, line feed LF, form feed FF and fixed tab HT are used to define the display format of graphic characters. Receipt of the carriage return character CR has no effect. It is equivalent to a NUL character, except for block check summation. Receipt of the line feed character LF causes the new-line character CR to be stored in memory and as a result the next stored character is displayed at the first position of the next line down. Receipt of the form feed character FF clears the screen and causes the following characters to be loaded starting in the first display data memory location. Receipt of the fixed tab character HT causes the fixed tab character FT to be stored in memory and as a result the next stored character is displayed at the next fixed tab stop.

The control characters NUL, SYN, or DEL are used to accomplish time fill for the Terminal and time and media fill for the System. No function is performed when these characters are received. Only SYN is excluded from the block check summation.

Receipt of an escape character code ESC indicates the beginning of a special control sequence. The special control sequences following ESCs cause the actions listed in Table I. A message may contain any number of control sequences. Special control sequence characters which are not defined terminate the control sequence, and no function is performed.

TABLE I

Special Receive Control Sequence Character Functions

| Character | Function |
|---|---|
| : | Reposition Cursor |
| ; | Set Variable Tab Stop |
| Others | Terminate ESC Sequence |

A printer interface allows the connection of a suitable printer to the display control unit. One example of such a printer is a Teletype Model 33 TCB page printer. The memory content associated with any keyboard-monitor may be printed upon command of the associated keyboard PRINT key, or by the presence of the third bit B3 of an address character code AD2 received from the System. The message format of messages to the printer is as follows:

| | | | |
|---|---|---|---|
| C C L | A | C C L | |
| R R F | D | R R F text | (from memory) |
| | 2 | | |

The two least significant bits of the AD2 character indicate the monitor from which the text data is obtained. It is printed as 0, 1, 2, or 3. Within text, each new-line character from memory is translated to CR, CR, LF. In addition, CR, CR, LF is inserted following each character in position 80. If a Receive message is addressed to a screen which is in the process of being printed, the Terminal will respond with a negative acknowledge character NAK.

When using the printer interface, a variation of the invention enables a portion of the Terminal memory (250, 506, or 762 characters) to be used as a buffer between communications inputs and the printer. The portion of memory so assigned is unavailable for display purposes, however, the Terminal will function exactly as if a keyboard-monitor unit was assigned to the printer-buffer area of memory. Multiple buffer areas can be assigned. Messages stored in the buffer area by the System (via the use of the AD2 address specifying the buffer area) may be printed via a print command from the System.

An INsert feature provides additional keyboard editing capability whereby characters and lines may be inserted into existing screen data. The existing data, starting at the insertion position, is moved to the right and/or down to make room for the insertion.

When the INSERT key is operated, the character under the cursor and following characters move one position to the right, a space character is inserted at the cursor position, and the cursor remains at the original position. The movement of characters to make room for the insertion involves all characters from the one under the cursor to the first character that precedes an unused screen location, i.e., at the end of a partially filled line or at the end of a tab column. When a character is moved from the last position of a line, it moves to the first position of the following line. Characters may be pushed from the bottom of the screen or memory by an insert operation. With the SHIFT key depressed, depressing the INSERT key moves the character under the cursor to the first position of the next line down and following characters to following positions. The cursor is not moved.

A Delete feature provides additional keyboard editing capability whereby characters of an entire or partial line may be deleted from existing screen data and the resulting gaps in memory closed by moving data. The DELETE key provides line delete in conjunction with SHIFT, and character delete without SHIFT.

With the SHIFT key not depressed, depressing the DELETE key deletes the character under the cursor provided the character is a graphic or space. The character to the right of the cursor is moved to the cursor position and the following characters through the end of a tab column, or the end of line, are moved one position to the left. Character delete has no effect when the cursor is positioned over the format effector characters FT (fixed tab), VT (variable tab), CR (new line), or RS (record separator). With the SHIFT key depressed, depressing the DELETE key causes erasing of all the characters from the cursor to the end of the line or RS character, provided the cursor is not positioned over the new-line character CR or over the record separator character RS. A CR or RS character is placed at the cursor position and the cursor is not moved. If the cursor is positioned over a new-line character CR, the CR character is deleted and, as a result, characters from the line below fill the cursor line starting at the cursor position. Any excess characters remain on their line, left-justified. The leftward and upward movement of characters affects all lines following the deleted new-line character CR through the next new-line character CR. If the cursor is positioned over an RS character, the line delete function has no effect.

A single variable tab feature provides a single tab stop which may be set either by a message from the System or by means of the keyboard. This tab stop may be used for tabulation either by a message from the System or by means of the keyboard. The single variable tab stop position may be altered by the message character sequence from the System:

ESC ; POS where POS defines a horizontal screen position.

The single variable tab stop position may also be altered by the keyboard to the horizontal position of the cursor by using the VAR TAB SET key. In order to avoid superimposition of characters, the variable tab stop is set greater than the maximum number of characters from the beginning of any line to the first variable tab character. With the SHIFT key depressed, depressing the TAB key causes the cursor to move to the next single variable tab stop, either on the same line or at the first character position of the next line. There is an automatic variable tab stop designated at the first position of each line in addition to the variable stop which may be positioned anywhere on the line. The variable tab character VT in a message causes the following character to be displayed at the next variable tab stop position.

In the time-shared mode of operation, when the stored data for one monitor contains an unusually high number of variable tab (VT) and new-line (CR) characters, the time required to display all of the monitor data may exceed the time available for the display. If this situation occurs, the display will be terminated when the monitor display time runs out (all following characters for this monitor will not be displayed). The INPUT ERROR indicator of the associated keyboard will be lit, and the System will respond with a negative acknowledge character NAK.

The invention also provides the feature in which the cursor may be repositioned by the System on the screen of any monitor by means of the AD2 character and the message character sequence:

ESC : POS LIN where POS again defines a horizontal screen position. ASCII characters 2/0 through 6/15 define horizontal screen positions 1 through 80, respectively. The function of other values is undefined. LIN defines the screen line. ASCII characters 2/0 through 3/8 define lines 1 through 25 respectively. If the cursor is repositioned to an unassigned screen position, the cursor will be moved to the position corresponding to the end-of-screen character EOS.

The invention also provides a form feature which allows a message to be displayed that inhibits operator access to predefined areas of the screen. This feature operates in either one of two modes: unalterable or alterable.

In the unalterable form mode, whenever the record separator character RS is displayed in character position 1 of line 1, the screen contains an unalterable form that causes the Terminal to prevent the operator from entering or deleting data in any character position except those between the unit separator US and the record separator RS characters. In this mode, the INSERT, DELETE and TAB keys are inhibited to prevent the operator from expanding or contracting any preassigned operating area. If the cursor is moved to any position between the record separator RS and unit separator US characters, the Terminal automatically positions the cursor to the first character position following the next unit separator character US. For example, if the cursor is initially placed over the character position following a unit separator character US and the BACKSPACE key is depressed, the cursor will move back one position (over the US character) and then automatically be repositioned to its original position. The function of the TAB key in the unalterable form mode is to allow the operator to change from one operating area to another by positioning the cursor to the character position following the next unit separator character US. Subsequently, if no other unit separator characters US occur between this cursor position and the end of the screen, then the cursor will be positioned to the character following the first US character on the screen (i.e., wraparound).

In the alterable form mode, whenever the character displayed in character position 1 of line 1 is a unit separator character US, the Terminal functions basically as in the unalterable mode except that the operator is allowed to expand or contract the operator areas of the screen. Each operator area of the screen is treated as if it were a separate screen and were completely expansible. If the cursor is positioned to the record separator character RS and data is entered, the RS character and the following existing data are shifted one character to the right and the operator data placed in front of the RS character. If the NEW LINE key is depressed, so as to cause the cursor to be placed in a nonoperator area, the Terminal will automatically insert a new-line character CR and assign an additional line to the operator area.

The INSERT and DELETE keys are enabled in the alterable form mode. The character delete function is modified to inhibit the deletion of record separator RS characters. Performance of the line delete function with an alterable form on the screen will cause deletion from the cursor to the end of the line, or to the first record separator character RS.

The TAB key operates in the alterable form mode in the same manner as in the unalterable form mode. Although the tab function is inhibited in the alterable form mode, tab characters may be placed by the System in either the operating or nonoperating areas for formatting purposes.

A Compose forms mode, which is enabled by manual operation of a switch on the control unit, provides a means of disabling the forms controls to permit the operator to type record separator and unit separator characters RS and US, respectively, and gain access to the entire screen.

The invention also provides a paging feature which is only used in a terminal system with a single keyboard-monitor and which provides the Terminal operator with some control over groups of messages coming from the System. In one mode of operation, each message from the System has been chosen to be no longer than 240 characters or 3 lines when using this feature. With this feature, acknowledge or ACK messages are automatically transmitted to the System following each received message. The acknowledge character ACK will always be sent unless the previous message included data which fell in the last 256 characters of available memory or the last 3 lines of the screen. In this case, the RECEIVE ALARM indicator will be lit and a negative acknowledge character NAK will be sent to the System as the response to all messages until operator intervention. The PAGE FULL indicator will be lit, and will remain lit as long as data remains in the last 256 characters of available memory or the last 3 lines of the screen. With the RECEIVE ALARM indicator lit, the Terminal will respond to all messages addressed to the particular screen with a negative acknowledge response NAK. The operator may take either of two actions:

a. Delete characters and/or lines from the existing text on the screen until the PAGE FULL indicator is extinguished. Depressing the RECEIVE key will allow the System to send new messages and extinguish the RECEIVE ALARM indicator.

Depress the RECEIVE key while the PAGE FULL indicator is lit. This will clear the screen, reposition the cursor to the top of the screen, reset the RECEIVE ALARM and PAGE FULL indicators, and allow the System to send new messages.

The invention may be used with a variety of communication selection, addressing and checking techniques such as, for example, Polling and Select Addressing, Selection Addressing, Identification Addressing, Fast Select, Broadcast Select, Group Select, Sequential Select, and Block Checking.

DETAILED DESCRIPTION

The illustrated embodiment of the invention contains a 1,024-character, six bits per character magnetic memory, preferably of the magnetic-core coincident current destructive readout type, and is organized to visibly display the contents of this memory in an illustrative 25-line by 80-position presentation on one or more suitable media which, in the present embodiment of the invention, have been chosen to be four cathode-ray tubes. This character capacity and bit capacity of the memory, as well as its type, and the particular type and number of display media chosen are not limiting, but only illustrative. The memory stack or memory 10 (FIG. 2B) is part of an overall memory system 12 (FIGS. 2B and 2E) which is described and claimed in U.S. Pat. No. 3,439,345 issued in the names of Edward F. Myers and John R. Port and assigned to the same assignee as the present invention. For details of the operation of this memory system, reference may be made to the aforementioned patent.

An X switch core matrix 8 (FIG. 2B) and a Y switch core matrix 9 are used for addressing the memory 10. The matrix 8 is organized in a 2×4 and a 2×2 matrix for the selection of the x-position in the memory 10 and the matrix 9 is similarly organized in a 2×2 and a 2×4 matrix for selection of the Y-position in the memory 10. The matrices 8 and 9 are strobed by Read and Write pulses developed in the memory control and timing circuits in a block 40 (FIG. 2F).

The matrices 8 and 9 are each driven by six selection switches 11 and 17, respectively, and by four selection drivers 15 and 13, respectively, all of which switches and drivers receive their inputs from a memory address decoder 19. The decoder 19 is fed from the address selection gates 66 which consist of a set of gates used for steering the memory address to the decoder 19 from either a memory address register 64 (FIG. 2E), a cursor memory address register 58, a processor memory address register 120 (FIG. 2B), or a preselected memory address on lines 63 from the memory control and timing circuits in the block 40. As will appear more clearly hereinafter, the preselected memory address on the lines 63 is used for both fetching and replacing the control storage in the memory 10 for each keyboard-monitor in the Terminal.

The memory 10 is divided logically into four sections MS–O to MS–3 (FIG. 3), each section allocated to one of four keyboard-monitors KM–O to KM–3 (FIG. 1).

The memory 10 contains 1,024 bytes or cells each for containing a six-bit character code. The cells may be identified in FIG. 3 from left to right and from top to bottom by reference characters M–O to M–1,023. The memory allocations to each keyboard-monitor KM–O to KM–3 have been chosen to be equal to each other in the present embodiment of the invention so that each section of the memory MS–O to MS–3 has been allocated 256 memory cells. Accordingly, memory section MS–O has been allocated memory cells M–0 to M–255, memory section MS–1 has been allocated memory cells M–256 to M–511, etc.

Each memory section MS–O to MS–3 has a group of five memory cells devoted to controlling certain internal functions. These control memory cells may be located as desired, however, in the illustrated embodiment of the invention they have been chosen to be the first five memory cells of each memory section. Thus, in memory section MS–O, for example, the memory cells reserved for controlling these certain internal functions are memory cells M–0 to M–4. In memory section MS–1, the memory cells reserved for controlling these certain internal functions are memory cells M–256 to M–260. In memory section MS–2, the memory cells reserved for controlling these certain internal functions are M–512 to M–516 and in memory section MS–3, the memory cells reserved for controlling these certain internal functions are M–768 to M–772.

Figure 21:
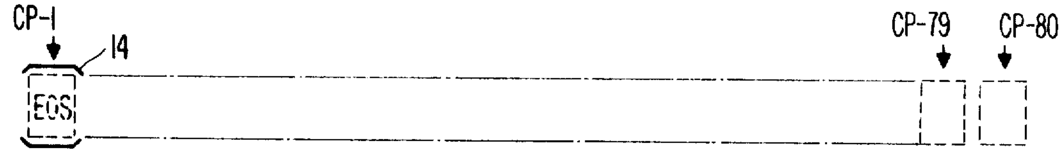
FIG. 21 illustrates the display of a cursor marker symbol at the first or leftmost character position on the screen of a cathode ray tube.
Figure 22:
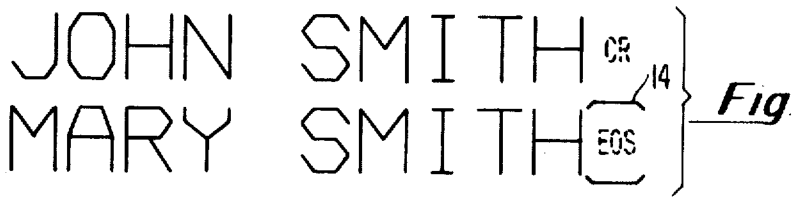
FIG. 22 illustrates the display effect of a new-line character (CR).

The first two memory cells of each memory section MS–0 to MS–3 are reserved for storing the address of a cursor marker symbol 14 (FIG. 21), the next two memory cells in each section are reserved for storing the cursor control storage bits, and the fifth memory cell in each memory section is reserved for storing a variable tab address character for use in performing the single variable tab function. Thus, in memory section MS–0, for example, memory cells M–0 and M–1 are reserved for storing the cursor address, memory cells M–2 and M–3 are reserved for storing the cursor control bits, and memory cell M–4 is reserved for storing the variable tab address character. The first five memory cells of the other memory sections MS–1, MS–2 and MS–3 are similarly used.

Figure 5:
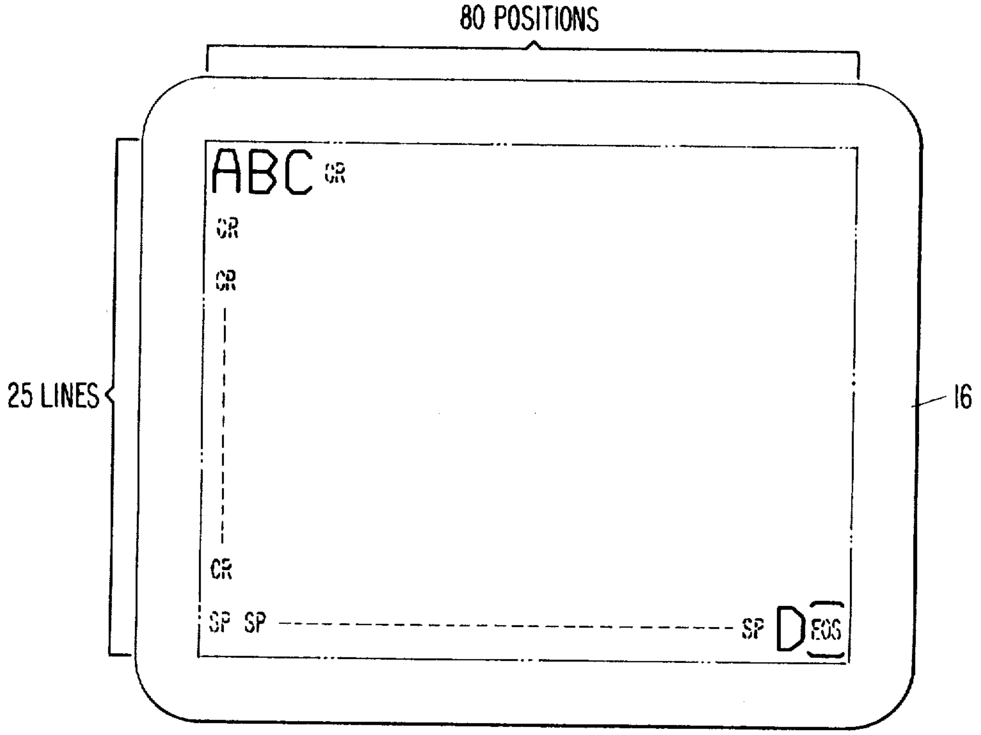
FIG. 5 is a diagrammatic illustration of one of the cathode-ray tubes.
Figure 6:
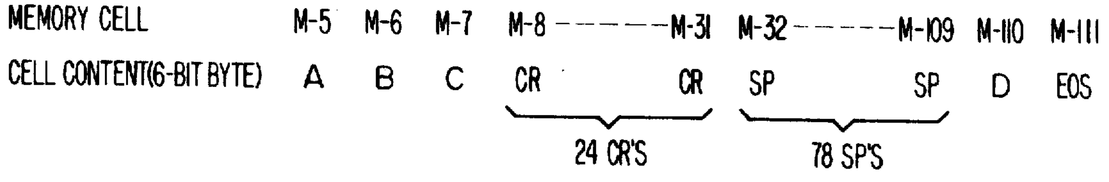
FIG. 6 illustrates the memory cell content corresponding to the display illustrated on the screen of the cathode-ray tube in FIG. 5.

Each of the keyboard-monitors KM–0 to KM–3 employs one of four keyboards K–0 to K–3 (FIG. 1) for manual entry of data into its associated allocated section of memory, and one of four monitors MN–0 to MN–3 for data display. Each one of the monitors MN–0 to MN–3 employs a cathode-ray tube such as is indicated diagrammatically at 16 in FIG. 5 and houses the cathode-ray tube power, driving circuits and controls, and contains the several status indicators. The particular cathode-ray tubes 16 utilized in the illustrative embodiment of the invention have been chosen to have electromagnetic deflection systems, however, other cathode-ray tube beam deflection systems may be used.

The horizontal deflection amplifier of the deflection system of each cathode-ray tube 16 is coupled to the output of a horizontal position counter 18 (FIG. 2C) through one of four line drivers 20 and a digital-to-analog converter 22, and the vertical deflection amplifier of the deflection system of each cathode-ray tube 16 is coupled to the output of a vertical position counter 24 through one of four line drivers 26 and a digital-to-analog converter 28, for horizontal and vertical positioning, respectively, of the several cathode-ray tube electron beams in the process of generating the display on the face of their screens S–0 to S–3 (FIG. 1). The electron beams of the several cathode-ray tubes 16 will illuminate their respective screens by displaying the various symbols and characters whenever the beams are unblanked by a blanking control 30 (FIG. 2F) which is part of a symbol generator 32.

The horizontal position counter 18 is a seven-bit counter which is used to obtain the horizontal positions of the display on each of the cathode-ray tubes 16. The counter 18 provides 80 output states so that the horizontal digital-to-analog converter 22 can establish the 80 positions for left-to-right positioning. The vertical position counter 24 is a five-bit counter and is used to obtain the vertical position of the display on the several cathode-ray tubes 16. The counter 24 provides 25 output states so that the vertical digital-to-analog converter 28 can establish the 25 positions for top-to-bottom positioning of the cathode ray tube electron beams.

The horizontal and vertical positioning of the electron beams by the counters 18 and 24 serves to position each beam to a reference point at each of the positions on the respective screens S–0 to S–3, so that the symbol generator 32 can use these points as reference points for generating the stroke-type symbols. The symbol generator 32 and the method of generating the stroke-type symbols will be described later on when a description is given of the display cycles.

Figure 4:
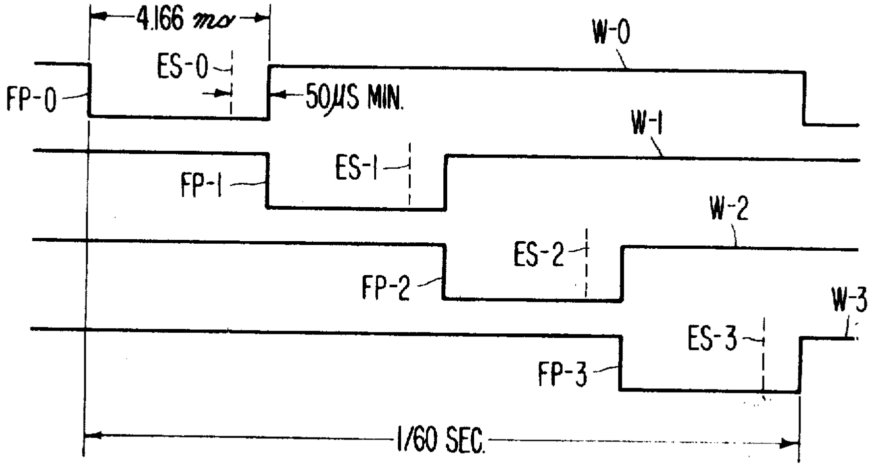
FIG. 4 is a waveform diagram.

The several keyboard-monitors KM–0 to KM–3 are selected sequentially to perform all their functions during the operation of the display Terminal. The selection is made by a start control circuit 34 (FIG. 2B) which is connected to a 60-cycle divide circuit 36 whose input is coupled to a suitable signal source such as a 60-cycle alternating current source 38. The divide circuit 36 processes the 60-cycle sinusoidal input waveform to obtain two 60-cycle square waves, 90° out of phase with each other, and the start control 34 receives these two waveforms and from them generates the four waveforms W–0 to W–3, illustrated in FIG. 4. Each of the waveforms W–0 to W–3 provides periodic frame pulses identified in the respective waveforms as FP–0, FP–1, FP–2 and FP–3, respectively. The frame pulses FP–0 to FP–3 are produced in the start control 34 as the output of a two-bit counter therein. The trailing edge of the frame pulse of each waveform coincides in time with the leading edge of the adjacent frame pulse in the next waveform. Thus, for example, the trailing edge of frame pulse FP–0 coincides with the leading edge of frame pulse FP–1.

The leading edge of the frame pulse is used by the start control 34 to generate a START SCREEN signal (FIG. 2B) for activating the display cycle of the associated monitor. The end of the display cycle of each monitor occurs at least 50 microseconds before the trailing edge time of the associated frame pulse and is terminated by the start control 34 by generating and END SCREEN signal at this time. The times when the several END SCREEN signals are generated are illustrated by the dotted lines ES–0 to ES–3 in FIG. 4. As will appear more fully later on, the 50-microsecond period in each frame pulse FP–0 to FP–3 is used for processing the storage in the five control cells of the memory section of the screen which has finished a display cycle and the next screen in succession which is going to begin its display cycle.

Selection of the particular keyboard-monitor KM–0 to KM–3 for a display cycle is made by transmitting the associated START SCREEN signal from the start control 34 to the circuitry in the block 40 containing the memory control and timing and cursor movement circuits which, in turn, generates a DISPLAY ON signal (FIG. 2F) on the appropriate one of four lines 42 to a screen blanking control 44 which consists of four gates whose outputs are coupled to the blanking control 30 of the symbol generator 32. Only one output of the gates in the screen blanking control 44 will be true at any particular time and this output will be the one that corresponds to the selected keyboard-monitor. As will appear in greater detail hereinafter, only the selected monitor will generate a display as determined by the true output of the particular gate in the screen blanking control 44 which steers the output of the blanking control 30 to the selected monitor through one of the line drivers in each of blocks 50 and 52.

The memory timing and control in the block 40 consists of a five-bit shift register used to generate timing pulses for accessing the memory 10. These timing pulses are also used in conjunction with the rope timing and control 54 for generating the timing pulses necessary for strobing the rope memory 56. The block 40 also contains the logic circuitry for effecting movements of the cursor 14, as well as for performing other functions, which will be described. For purposes of brevity, the components in the block 40 will be referred to hereafter as "memory control and timing 40."

Figures 2, 2C:
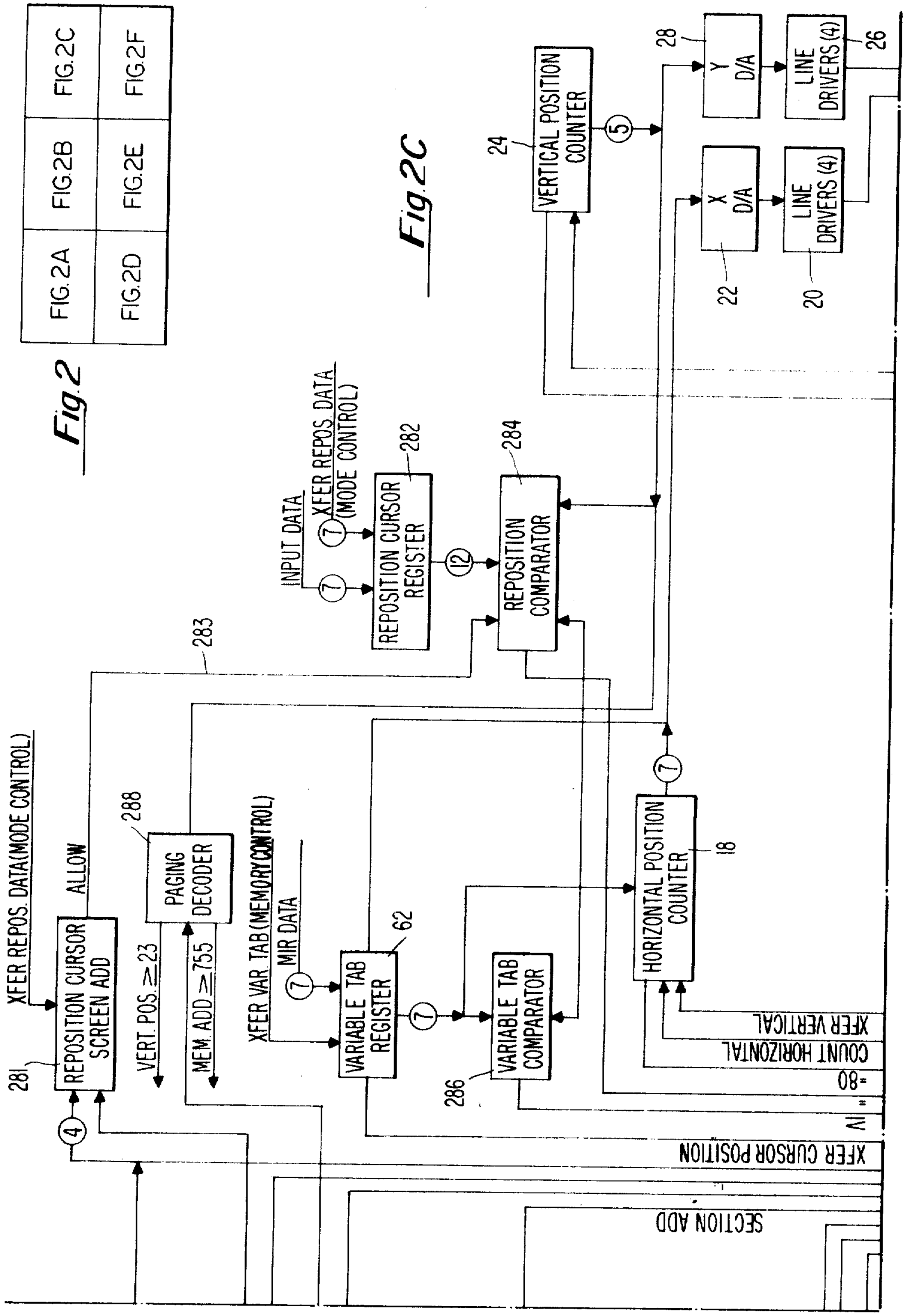
FIGS. 2A to 2F, when placed together as shown in FIG. 2, which is on the same sheet with FIG,. 2C, constitute a block diagram, less the input/output section, of the major portion of a display terminal constructed in accordance with the invention.
Figure 2A:
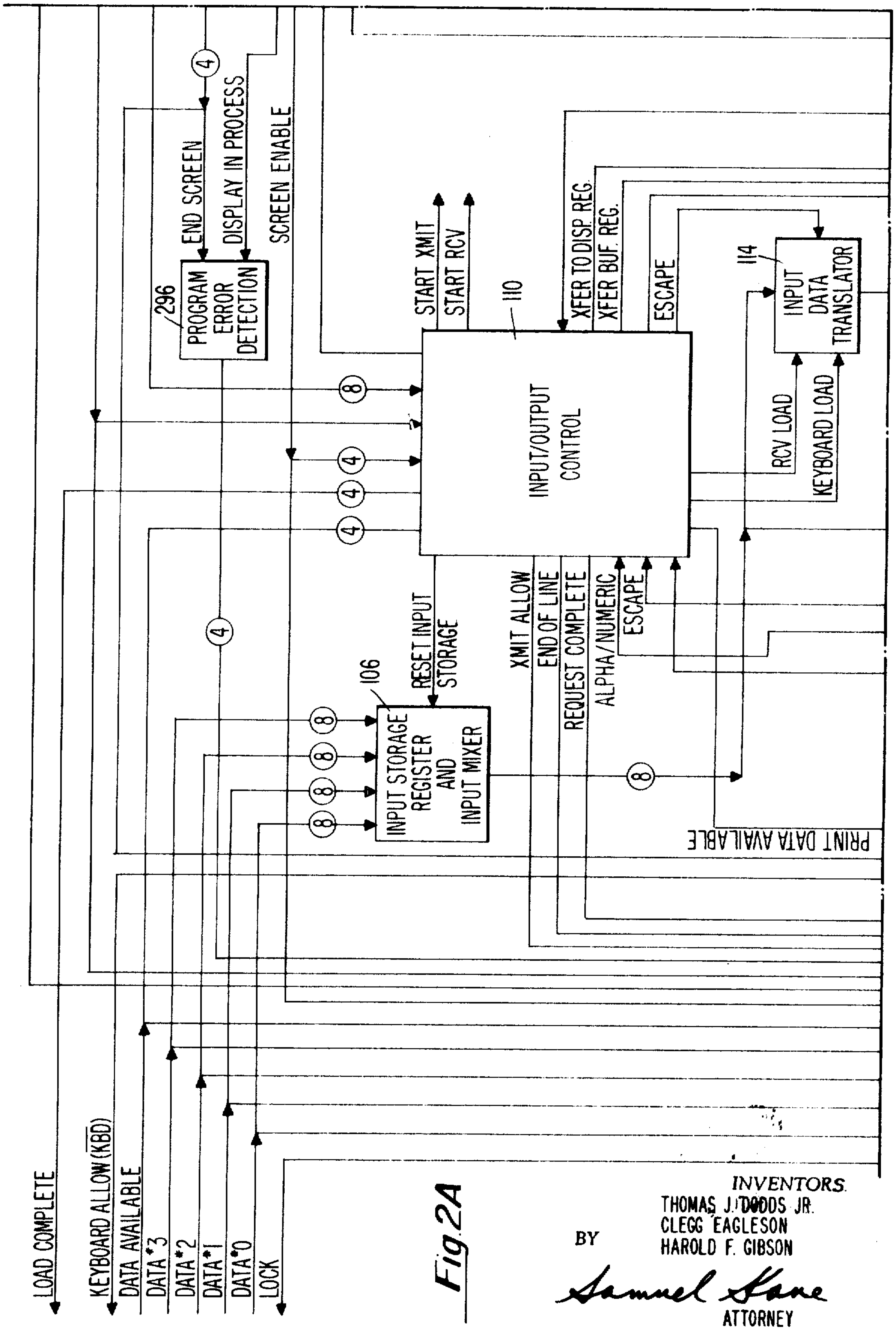

Transfers of the contents of the five control memory cells of each memory section MS–0 to MS–3 into and out of memory are accomplished by means of the cursor memory address register in a block 58 (FIG. 2E), a control storage register 60 and a variable tab register 62 (FIG. 2C). The cursor memory address register 58 is a 10-bit counter used for storing the address of the cursor marker 14. The control storage register 60 is a 12-bit register consisting of 12 flip-flops used to store the cursor control storage bit information for performing certain control functions in keyboard loading, which will be described later on. The variable tab register 62 is a seven-bit register for storing the variable tab character position or address. Use of the seventh bit of the variable tab register 62 will be described later on.

The several keyboard-monitors (also "screens" for brevity) go through the same sequence of operations, therefore, a cycle of such operations will be described for only one of the screens. This cycle of operations will be described from the end of the display of one screen to the end of the display of the next succeeding screen.

Figure 2B:
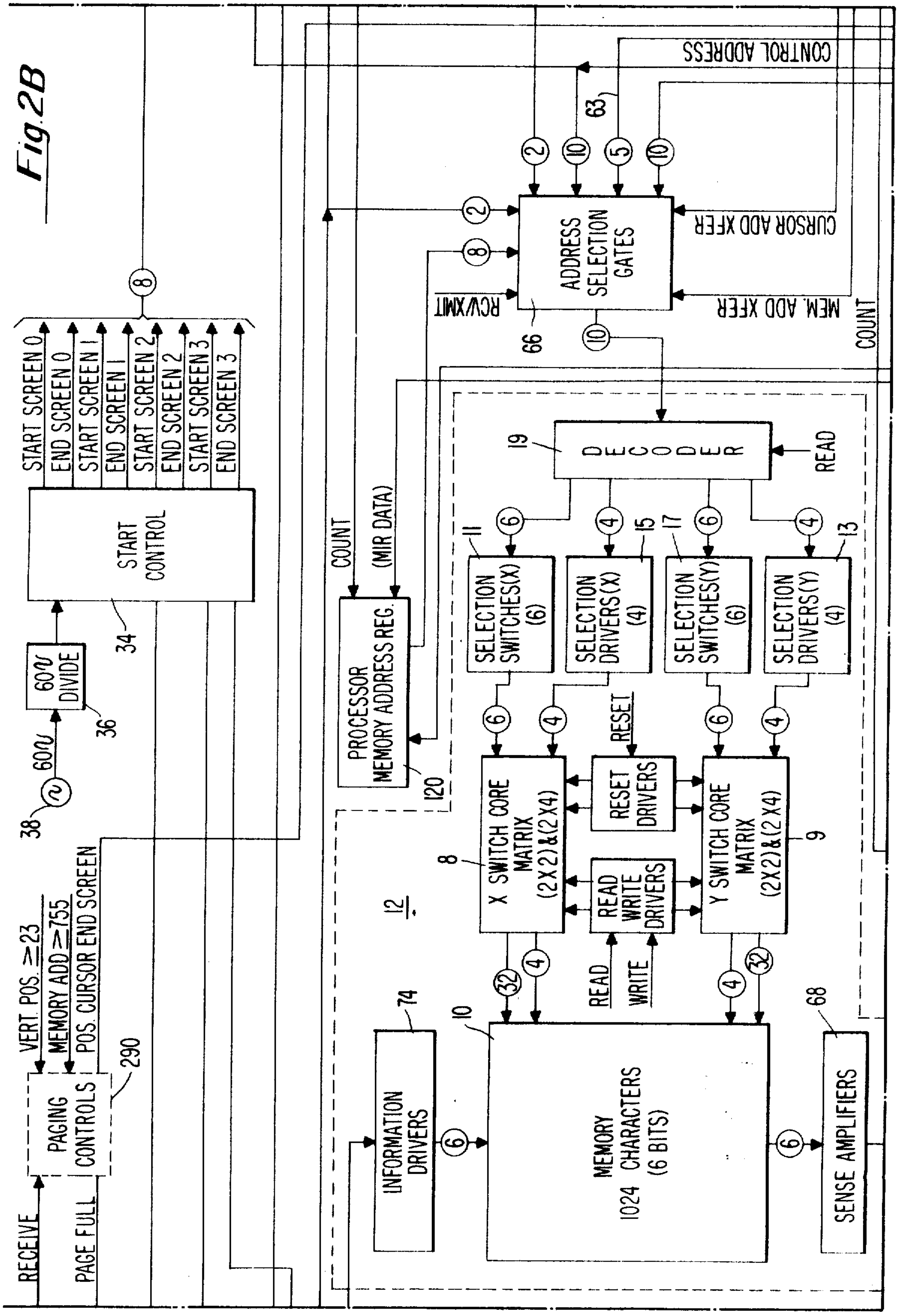
Figure 3:
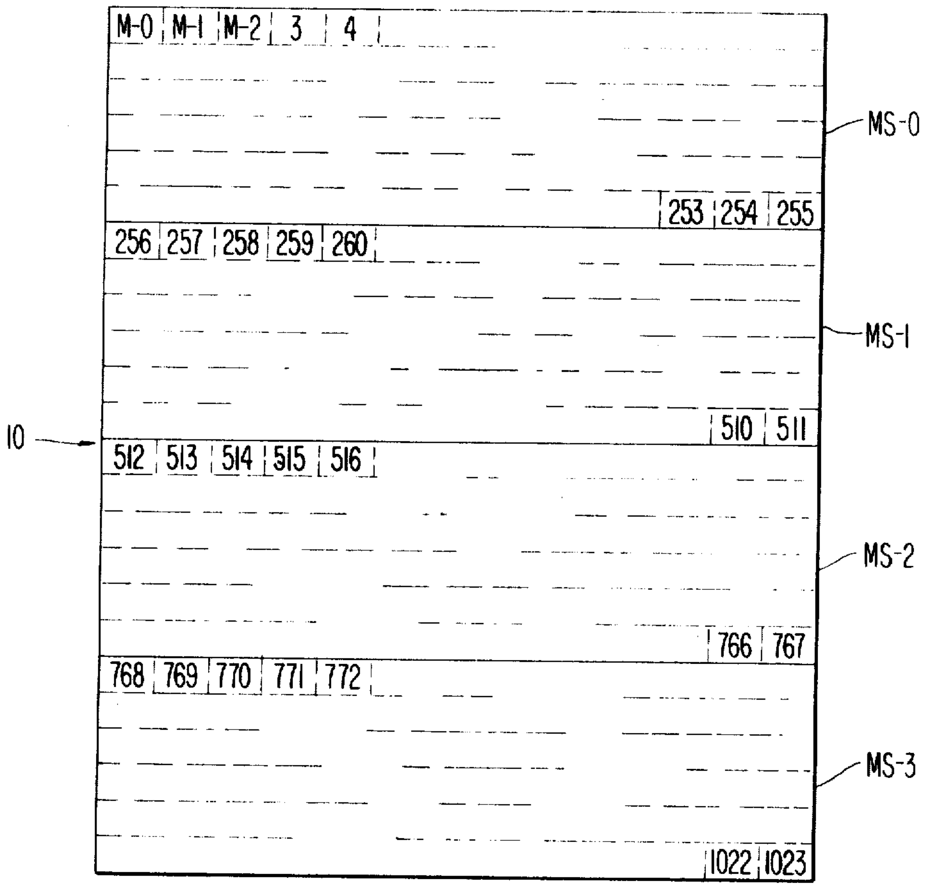
FIG. 3 is a diagrammatic illustration of the memory and memory sections.

Assuming that screen S–0 has completed its display cycle, the preselected control address on the five lines 63 (FIG. 2B) is reset by the memory control and timing 40 to the first control address of memory sections MS–0 which is the memory address of memory cell M–0 (FIG. 3). The three least significant lines of the five lines 63 are coupled to the three least significant stages or bits of the address selection gates 66 and the two most significant lines of the five lines 63 are coupled to the two most significant stages of the address selection gates 66. By counting or adjusting the two most significant ones of the lines 63, the particular one of the memory sections MS–0 to MS–3 is selected, and by counting or adjusting the three least significant ones of the lines 63 the particular one of the five control cells of the selected memory section is selected.

Returning to the point where screen S–0 has completed its display cycle, the address of memory cell M–0 on the five control lines 63 is applied to the memory system 12 through the address selection gates 66 and a read/write cycle of the memory 10 initiated by the memory timing and control 40.

Figure 2D:
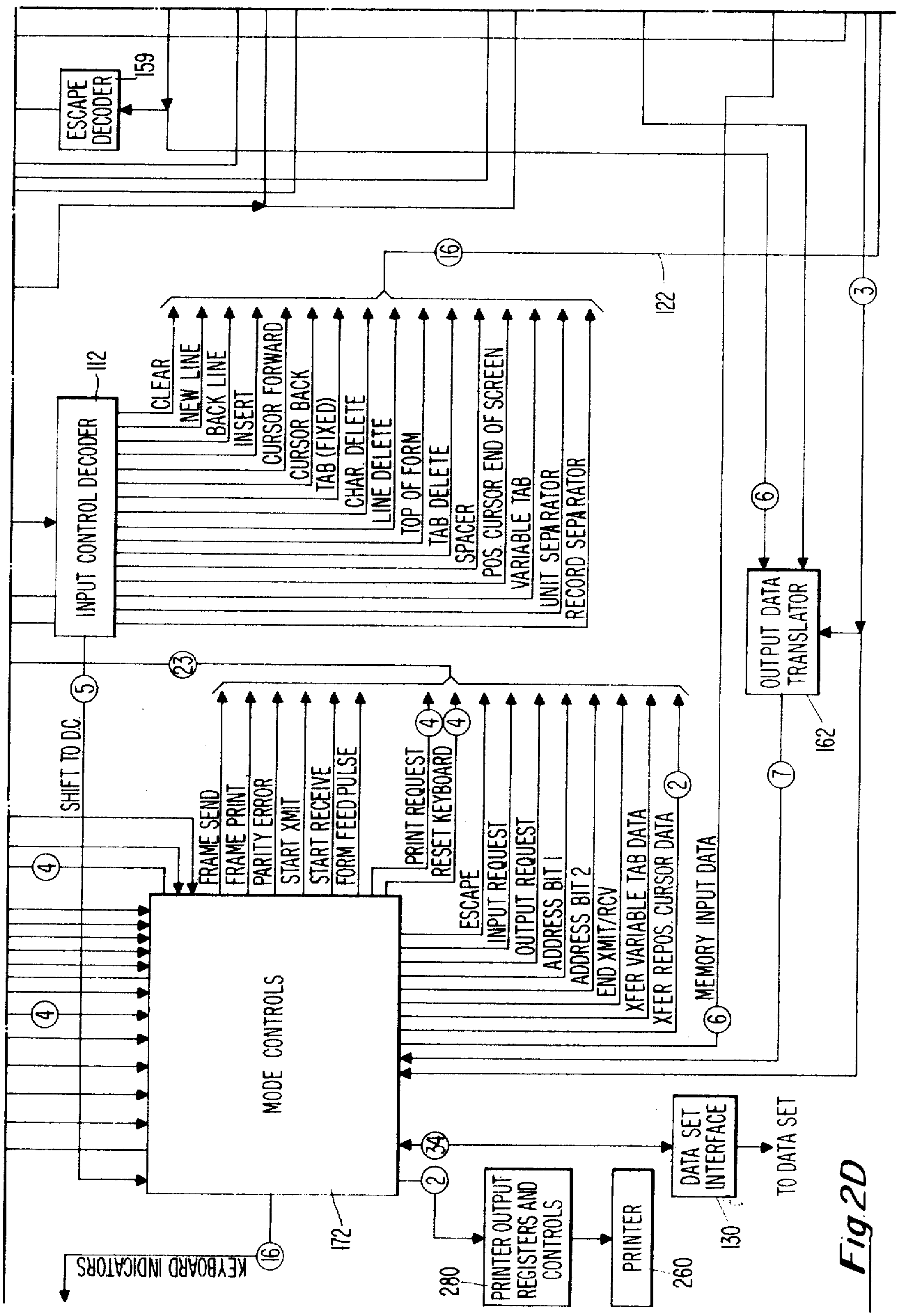

The storage in the memory cell M–0 is read out of the memory 10, amplified in sense amplifiers 68 (FIG. 2B) and transferred into a memory information register 70 (FIG. 2E) which is a six-bit register used to store information read from the memory 10. On the Write portion of this read/write cycle, the first five bits of the cursor memory address register 58 are transferred by the memory control and timing 40 back into their location in memory section MS–0 into memory cell M–0 via memory input data gates 72 (FIG. 2E) and the information drivers 74 (FIG. 2B). The address on the three least significant ones of the lines 63 is then counted up by one by the memory control and timing 40, the memory again addressed by the control address on lines 63 and another read/write cycle initiated by the memory control and timing 40. The second memory cell M-1 will similarly be read out into the memory information register 70 via the sense amplifiers 68, and on the Write portion of this cycle the second five bits of the cursor memory address register 58 will be written back into their storage location in memory cell M-1. The three least significant bits of the control address on lines 63 will again be counted up by one, the control address on lines 63 again presented to the address selection gates 66 and another read/write cycle similarly initiated by the memory control and timing 40. The storage in memory cell M-2 will similarly be read out into the memory information register 70 via the sense amplifiers 68, and again on the Write portion of this read/write cycle half of the control storage register 60 contents, or six bits, will be similarly written back into the memory 10 via the memory input data gates 72 and the information drivers 74 and stored in their location in memory cell M-2. The three least significant bits of the control address on lines 63 are again counted up by one and another read/write cycle of the memory is similarly initiated, so that on the Write portion of this cycle the second half of the control storage register 60, that is, the last six bits, are transferred back into memory location M-3 via the memory input data gates 72 and the information drivers 74. The three least significant bits of the control address on lines 63 are again counted up by one by the memory control and timing 40 and another read/write cycle initiated transferring the contents of the variable tab register 62 into its storage location into memory cell M–4 in the memory 10 via the memory input data gates 72 and the information drivers 74.

After the contents of the cursor memory address register 58, the control storage register 60 and the variable tab register 62 have been written back into the five memory control cells associated with screen S–0, the next operation is to read out the character codes from the five control memory cells of the next screen, which is screen S–1, and store these codes in the respective cursor memory address register 58, control storage register 60 and variable tab register 62.

At this time, the control address on lines 63 is reset by the memory control and timing 40 to the address of the first control memory cell M-256 (FIG. 3) in the memory section MS–1 associated with screen S–1. The control address on lines 63 is presented to the address selection gates 66 and a read/write cycle initiated by the memory control and timing 40. The character code in memory cell M-256 containing the first five bits of the cursor memory address for screen S–1 is read out into the memory information register 70 via the sense amplifiers 68 and into the cursor memory address register 58 via the input gates in the same block 58, and then written back into memory cell M-256 via the memory input data gates 72 and information drivers 74. After the Write portion of this read/write memory cycle, the least significant bits of the control address on lines 63 are counted up by one by the memory control and timing 40 and another read/write cycle initiated by the memory control and timing 40. The second five bits of the cursor memory address for screen S–1 are now read out of the memory cell M-257 and similarly read into the cursor memory address register 58 via the sense amplifiers 68, the memory information register 70 and the input gates in block 58, and similarly written back into memory cell M-257 via the memory input data gates 72 and information drivers 74. Two similar read/write cycles are initiated by the memory control and timing 40 to successively read out each six bits into the control storage register 60 from memory locations M-258 and M-259, and another similar read/write cycle is then initiated by the memory control and timing 40 to read out the variable tab position character from the last control memory cell M-260 in the memory section MS-1 and similarly transfer the variable tab position character into the variable tab register 62.

With the cursor memory address for screens S–1 now in the cursor memory address register 58, and the 12 cursor control bits for screen S–1 in the control storage register 60, and the variable tab position character for screen S–1 in the variable tab register 62, the next operation is to strobe keyboard K-1 for any input data that may be available. If input data is available for keyboard K-1, as will appear more clearly hereafter when the loading function is described, this data will be loaded into the display data portion of memory section MS–1 which begins with memory cell M-261. As will appear more fully hereafter, loading of this data into the memory section MS-1 of screen S–1 will be under the control of the cursor memory address for screen S–1 and, if necessary, the control storage bits for screen S–1 in the control storage register 60.

After the loading of data into the memory section MS–1 of screen S–1, if any, the next operation is the start of the display cycle for screen S–1. At the beginning of this display cycle for screen S–1, the bits in the control storage register 60 are reset by the memory control and timing 40. As the display cycle for screen S-1 proceeds, as will be described generally for all screens, the bits in the control storage register 60 will be updated in accordance with the type and location of the display data characters in the memory section MS-1 of screen S–1. At the end of the display cycle of screen S-1, another cycle of operations similar to those described above will take place for the next screen S–2 and screen S–1 which has now completed its display cycle. That is, the five control characters for screen S-1 will be written back into the memory 10 and the next group of five control characters for screen S-2 will be read out of the memory 10, loaded into the cursory memory address register 58, the control storage register 60 and variable tab register 62, and the other operations, as described, will follow in order.

The screen display cycles for the several screens S–0 to S–3 are similar and a typical screen display cycle begins at the leading edge of the current one of the frame pulses FP–0 to FP–3 and the occurrence of the accompanying START SCREEN pulse which selects the particular keyboard-monitor, as described previously. The display begins by the application of timing signals from the memory control and timing 40 to return or preset a memory address register in a block 64 (FIG. 2E) to the first address following the five control characters of the selected one of the memory sections MS–0 to MS-3, this address corresponding to the first character display position CP-1 (FIG. 21) at the upper left of the selected screen in its first, or top, display line. The memory address register 64 is a 10-bit counter. The horizontal position counter 18 is reset to its first position or output state corresponding to the left side of the selected screen and the first character position CP-1, and the vertical position counter 24 is reset to its first position or output state corresponding to the top, or first, line of the selected screen.

The address in the memory address register 64 is strobed into the address selection gates 66 by the memory control and timing 40 to read out the first display data character in the selected section of the memory 10 into the memory information register 70 via the sense amplifiers 68, and then into a display register 76 (FIG. 2E) via display register transfer gates 78. The action to be taken in the screen display cycle depends on the nature of the character in the display register 76. If the character in the display register 76 is a graphic character, as detected by a display register decoder 80, the decoder 80 provides an output signal to the memory control and timing 40 to cause the character in the display registers 76 to be transferred into a rope data register 82 (FIG. 2F) of the symbol generator 32 via input gates in the same block 82, and thus initiate a display on the selected screen of the character or symbol represented by the character code in the display register 76.

The character code in the rope data register 82 is decoded by a decoder 84 into an 8×9 matrix of lines which go into a selection matrix 86. The selection matrix 86 consists of drivers and receivers which are connected across the individual wires in the rope 56. By activating a selected pair of these drivers and receivers in the selection matrix 86, that is, one driver and one receiver, a current is sent through the appropriate one of the wires in the rope 56 to initiate readout of the rope 56, as will be explained.

Certain of the elements in the symbol generator 32 are similar to corresponding elements disclosed in U.S. Pat. No. 3,466,612 issued Sept. 9, 1969 in the names of Edward F. Myers and John R. Port and assigned to the same assignee as the present invention. For example, the selection matrix 86 in the present invention is similar to the X and Y switches 1–14X and 1–14Y, respectively, in the U.S. Pat. No. 3,466,612 and the rope control timing 54 in the present invention is similar to the inhibit drivers 1–18, the reset driver 1–50, the decoder 1–20, and the element line counter 1–22 of the U.S. Pat. No. 3,466,612. Also the rope 56 in the present invention is similar to the wired core matrix 1–16 of the U.S. Pat. No. 3,466.612 except that is is wired differently and employs 72 magnetic cores in a 12×6 matrix, representing 72 bits of information. Each group of 12 bits represents two strokes in the generation of the stroke-type characters. Thus, with six groups of 12 bits each, there are 12 strokes available for generating a character.

At the proper time, the rope control timing 54 will apply drive pulses to the rope 56 to read out the stroke information. Two strokes worth of information are read out of the rope 56 at a time, that is, 12 bits or two groups of six bits each, amplified in sense amplifiers 88 and one of the two groups of six bits stored in a rope register 90 and the other group of six bits passed through the rope register 90 and applied to a rope register encoder 92 which encodes this group of six bits into a 10-bit character and transfers it into a stroke storage register 94.

Four bits of the stroke storage register 94 are applied to an X-integrator 96, four bits are applied to a Y-integrator 98 and two bits are applied to the blanking control 30 for causing the generation and display of one stroke of a character. At the appropriate time, the other six bits in the rope register 90 are clocked out by the rope control timing 54 and similarly converted into a 10-bit character in the stroke storage register 94 for causing the generation and display of the second stroke of the character. The next group of 12 bits are similarly read out of rope 56 by the rope control timing 54 so as to cause the generation and display of the next two strokes of the character to be displayed. This process continues until the six groups of 12 bits each are sequentially read out of the rope 56 to obtain a displayed character with a maximum of 12 strokes.

In the present embodiment of the invention, 10 bits have been chosen to activate the X and Y integrators 96 and 98 and the blanking control 30. The four bits of the X and Y integrators 96 and 98 are designated to represent the magnitude and direction of the stroke which is to be generated by the selected cathode-ray tube beam. Thus the four bits into the X integrator 96 are designated as +1X, −1X, +2X and −2X, each bit representing a digital pulse into the X integrator. Similarly, the four bits into the Y integrator 98 are designated as +1Y, −1Y, +2Y and −2Y and each also represents a digital pulse into the Y integrator. To illustrate further the +1X designation represents a stroke of unit length in the positive X direction while the designation −1X represents a stroke of unit length in the negative X direction. The designation +2Y represents a double-length stroke or one of two units length in the positive Y direction while the designation −2Y represents a double-length stroke in the negative Y direction. When this four-bit digital pulse information is fed into the integrators 96 and 98, they will generate analog outputs in the form of ramp-type voltage waveforms which are applied to line drivers 100 and 102 which feed the deflection amplifiers of the four monitors MN–0 to MN–3. The vector sum of these waveforms describes the motion of the cathode-ray tube beam in generating and displaying the character stroke.

The information out of the X and Y integrators 96 and 98 is applied to the horizontal and vertical deflection amplifiers of all the monitors MN–0 to MN–3, however, only the selected one of the four monitors will display the stroke, as determined by the true output of the appropriate one of the four gates in the screen blanking control 44, described previously, which steers the output of the blanking control 30 to the selected monitor through one of the line drivers in each of the blocks 50 and 52.

The two bits of information coming out of the stroke storage register 94 and going into the blanking control 30 may be designated as the Z1 bit and the Z2 bit. The Z1 bit is used to control blanking for a unit- or single-length stroke, while the Z2 bit is used to control blanking for a double-length stroke. The Z1 bit represents unblanked normal intensity of the cathode-ray tube beam, while the Z2 bit represents unblanked double intensity of the beam. These bits serve to unblank the cathode-ray tube beam at the desired points in time and to provide brightness compensation for the intensity variations which are due to the inherent variance in the stroke writing rate. Thus, one function of the blanking control 30 is to convert the Z1 and Z2 bit information into two blanking control output signals and feed one of these signals to one of the line drivers in block 50 and the other signal to one of the line drivers in block 52. The line drivers 50 and 52 serve the purpose of conditioning the output voltage waveforms of the blanking control 30 to enable each of them to drive a terminating coaxial cable, not shown.

After the stroke-type character or symbol representing the character code in the display register 76 has been generated and displayed on the selected screen, the rope control timing 54 will detect an END OF CHARACTER signal from the rope register encoded 92 and in turn generate an END OF CHARACTER signal to the memory control and timing 40 to signify that a character display cycle has been completed and that the next character in the memory 10 may be displayed.

The character code in the display register 76 is then written back into the same location in the memory 10 via the memory input data gates 72 and information drivers 74, and the memory address register 64 and horizontal position counter 18 counted up by one count by the memory control and timing 40 to initiate the next character display cycle. If the graphic character which was just displayed happened to be located in the memory 10 in a position corresponding to character position CP–80 (FIG. 21), that is, the last character position of a line, then the next character cycle, or read/write cycle would be initiated by counting up the memory address register 64 by one count, resetting the horizontal position counter 18 to its first position corresponding to character position CP–1, and counting up the vertical position counter 24 by one count to place the display on the next line down on the screen.

If the character read out of the memory 10 into the display register 76 is decoded by the display register decoder 80 as a new-line character or carriage return character CR, the decoder 80 will signal the memory control and timing 40 which will then reset the horizontal position counter 18 to its first position corresponding to character position CP–1 at the left side of the screen, and will count up the vertical position counter 24 by one count to place the display on the next line down, and then on the Write portion of the cycle cause the carriage return character code CR in the display register 76 to be written back into its location in the memory 10 via the memory input data gates 72 and information drivers 74.

If the character read out of the memory 10 into the display register 76 is decoded by the decoder 80 as an end-of-screen character EOS, the decoder 80 will provide an output signal to the memory control and timing 40 which will then initialize the circuitry for the next screen's activities, and on the Write portion of the current read/write cycle will cause the character code in the display register 76 to be written back into its location in the memory 10.

If the character read out from the memory 10 into the display register 76 is decoded by the decoder 80 as an escape header character ESC, this indicates the beginning of an escape sequence. As indicated earlier, the escape sequence is a two-character sequence, including an escape header character ESC, which is not a displayable character, followed by a second character code, which may be designated "escape follower" character code and which together represent an excess graphic character which in ordinary use of the memory 10 is beyond the capacity of the memory 10, when considering its capacity to contain different kinds of characters. For example, with an illustrative six-bit memory, 64 different kinds of characters can be stored ($2^6$). By utilizing the two-character sequence, which has been arbitrarily designated an "escape" sequence, more than 64 kinds of characters can be stored in the memory 10. Thus, for each excess character, there is a corresponding escape sequence consisting of an escape header character code ESC followed by the escape follower character code.

Now if the escape header character code ESC in the display register 76 is decoded by the decoder 80 as the first character in the escape sequence, the decoder will signal the memory control and timing 40 which will set the seventh bit in the rope data register 82. The rope data register 82 will now contain the six-bit code of the escape header character ESC and the seventh bit to indicate to the symbol generator 32 that this is the beginning of an escape sequence, and that proper time should be allowed in its rope control timing circuits 54 for processing this character. The escape header character code ESC in the display register 76 is then written back into its location in memory 10 via the memory input data gates 72 and the information drivers 74, and the memory address register 64 counted up by one count, however, the horizontal position counter 18 is not counted up at this time. The next character code in the memory 10 which is the second or follower character code of the escape sequence, is then read out into the display register 76, transferred to the rope data register 82 via its input gates to cause the generation and display of the symbol on the cathode-ray tube screen representing the two-character escape sequence read out into the display register 76. The escape follower character code in the display register 76 is then written back into its location in the memory 10 via the memory input data gates 72 and information drivers 74, and the memory address register 64 and horizontal position counter 18, both counted up by one count to initiate the display of the next character out of the memory 10.

Figure 23:
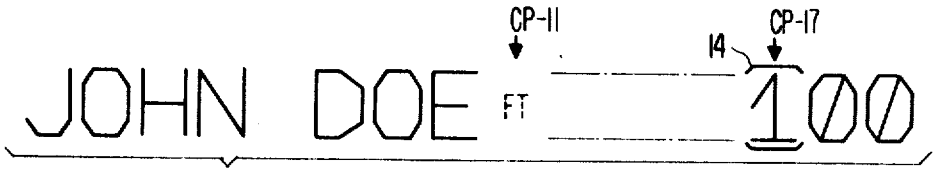
FIG. 23 illustrates the display at a fixed tab position.

As indicated earlier, the invention provides a number of fixed tab positions. There are 10 horizontal fixed tab positions CP-1, 9, 17, 25, 33, 41, 49, 57, 65, and 73, however, this number of horizontal fixed tab positions is not limiting, but only illustrative, as is also the eight-character spacing between the tab positions. Now, if the fixed tab character FT is read out into the display register 76 and decoded by the decoder 80, an output of the decoder 80 to the memory control and timing 40 will indicate that the next character out of the memory 10 is to be displayed at the next fixed horizontal tab position. The memory control and timing 40 will then cause the fixed tab character in the display register 76 to be written back into its location in the memory 10 via the memory input data gates 72 and the information drivers 74, and will count up the horizontal position counter 18 on a modulous $x$ basis, where $x$ represents the spacing between the fixed tab positions. Therefore, in the present embodiment of the invention $x=8$ so that the horizontal position counter 18 will be counted up on a modulous eight basis. This may be illustrated as follows:

Assume that a fixed tab character FT, shown dotted in FIG. 23 since it is not a graphic or displayable character, is stored in the memory 10 in a location corresponding to horizontal character position CP-11 of the particular screen. The binary count in the horizontal position counter 18 corresponding to character position CP-11 is

001010

Now, in the process of counting the horizontal position counter 18 on a modulous eight basis, the memory control and timing 40 will first reset the three least significant bits of the counter 18 and then count it up by a count of eight so that the binary state of the horizontal position counter 18 will then be

010000 which is binary number 16 and corresponds to character position CP-17 on the screen. Thus when the next character is read out of the memory 10 into the display register 76 it will be displayed in character position CP-17, as specified by the output of the horizontal position counter 18. In FIG. 23 the numeral 1 is illustrated as being displayed at character position CP-17 as the next character out of the memory 10 following the fixed tab character FT. In the actual display of the numeral 1 illustrated in FIG. 23, the cursor marker 14 has been chosen to be displayed first and the numeral 1 displayed next, however, the order of displaying the cursor 14 and the character located at the same position as the cursor 14 is arbitrary and illustrative, but not limiting.

After a graphic character has been displayed at a fixed tab position, it is written back into its location in the memory 10 from the display register 76 via the memory input data gates 72 and information drivers 74, and the memory address register 64 and horizontal position counter 18 counted up by one count to initiate the display of the next character in the memory 10.

Figure 24:
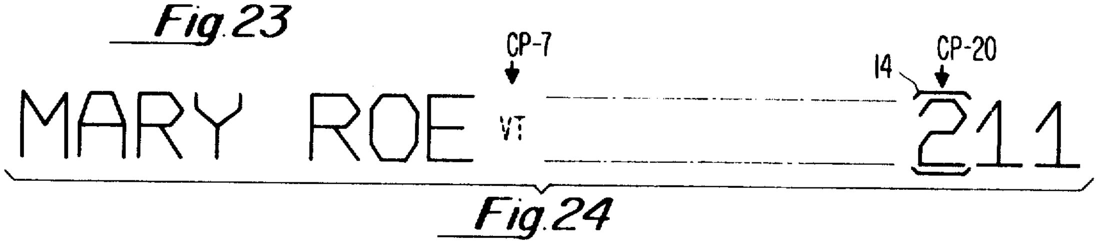
FIG. 24 illustrates the display at a variable tab position.

If the character readout of the memory 10 into the display register 76 is a variable tab character VT, as illustrated in dotted form in FIG. 24 since it is not a displayable character, it will be detected by the decoder 80 which will provide an output signal to the memory control and timing 40 to signify that the next graphic character out of memory is to be displayed at the variable tab stop position. The memory control and timing 40 will then cause the variable tab character in the display register 76 to be written back into its location in the memory 10 via the memory input data gates 72 and information drivers 74. The memory control and timing 40 will then count up the memory address register 64 by one count and cause the contents of the variable tab register 62 to be transferred into the horizontal position counter 18. The next character in the memory 10 will then be readout into the display register 76, presented to the symbol generator 32, and displayed horizontally at the variable tab stop, as specified by the horizontal position counter 18 which now contains the variable tab position character. As indicated in FIG. 24, the first character out of the memory 10, after the variable tab character VT, has been illustrated to be the numeral 2, and which is illustrated as being displayed in character position CP-20. As indicated earlier, and as will be described, display of the numeral 2 will follow display of the cursor 14 which is also shown, for purposes of illustration, at the same character position CP-20. After the display of the numeral 2 at the variable tab stop, the character code for this numeral in the display register 76 is written back into its location in the memory 10 via the memory input data gates 72 and the information drivers 74, and the memory address register 64 and horizontal position counter 18 counted up by one count to initiate the display of the next graphic character in the memory 10.

Figure 2E:
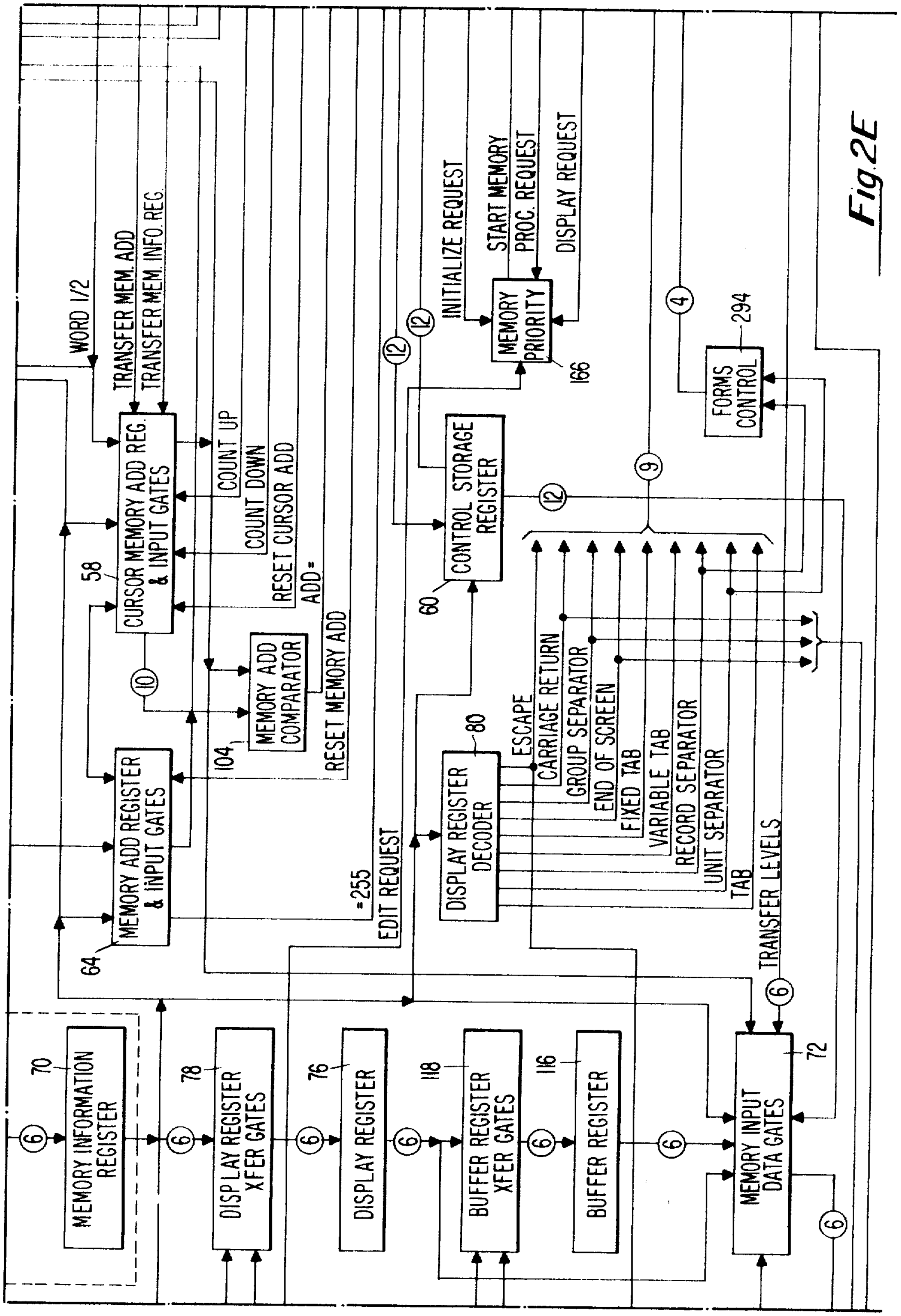
Figure 2F:
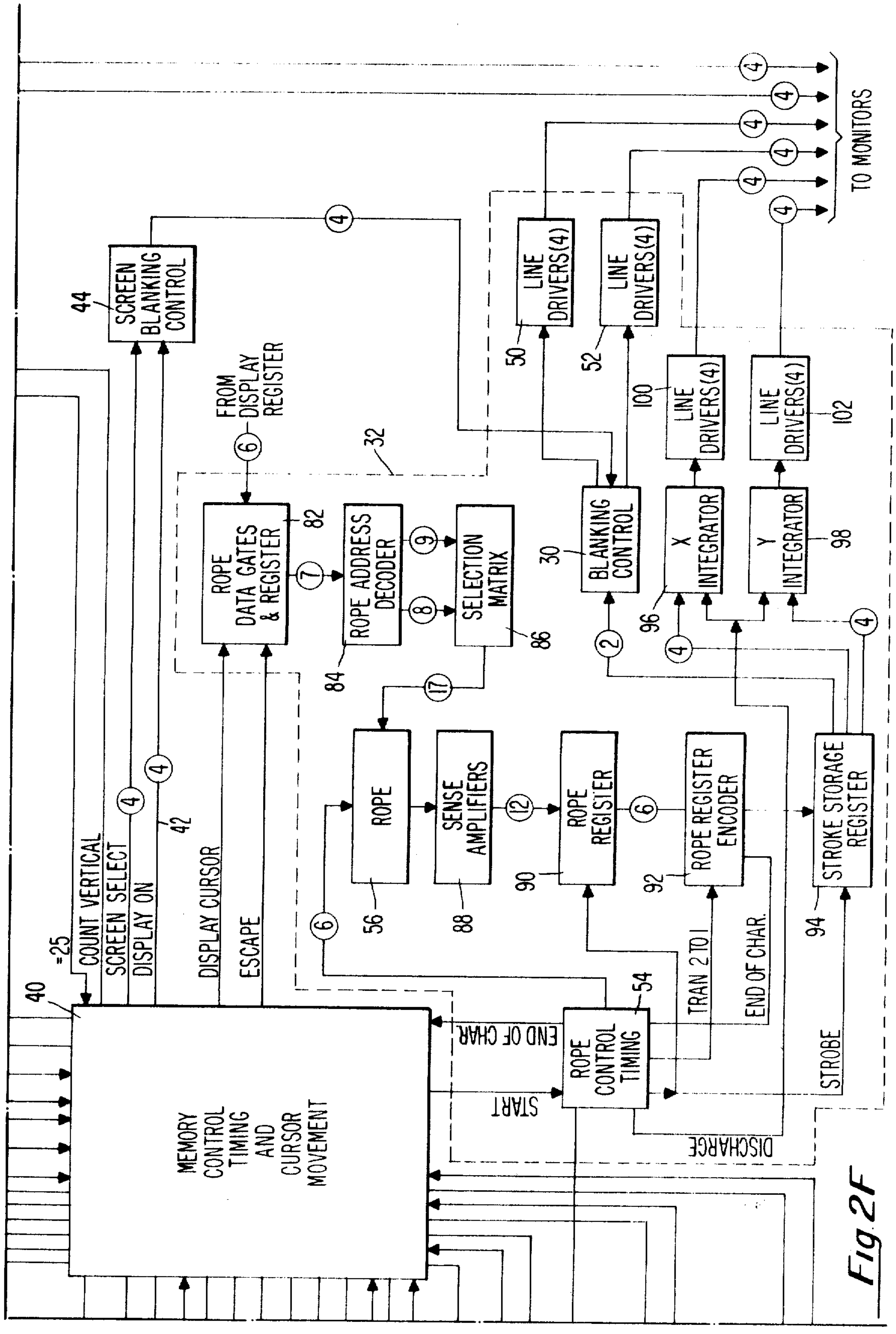

As the screen display cycle runs, the address in the memory address register 64 and the address in the cursor memory address register 58 are compared at the beginning of each read/write cycle in order to determine the place where the cursor marker 14 is to be displayed. Thus, each time the memory address register 64 is counted up by one count to initiate the next read/write cycle, but before the next character is read out of the memory 10, the address in the memory address register 64 and the address in the cursor memory address register 58 are compared in a memory address comparator circuit 104 (FIG. 2E). If these addresses are equal, the memory address comparator 104 will provide an output signal to the memory control and timing 40 to signify that the cursor marker 14 is to be displayed at the current screen position specified in the output of the horizontal position counter 18 and the output of the vertical position counter 24. The memory control and timing 40 will then transmit a DISPLAY CURSOR signal (FIG. 2F) to the rope data register 82 of the symbol generator 32 to cause the generation and the display of the cursor 14 at the screen position specified by the horizontal and vertical position counters 18 and 24. Since the cursor 14 always embraces or brackets a character at the same screen position, which may also be a space character, an additional display cycle is required in order to display the character which is located at the same position as the cursor 14.

In order to perform the additional display cycle for the character at the place where the cursor 14 is located, and after the Write portion of the current read/write cycle has taken place, the memory address register 64 and horizontal position counter 18 are not counted up at this time but the same character in memory corresponding to the same address in the memory address register 64 is now read out for the second time into the display register 76, presented to the symbol generator 32 and generated and displayed on the cathode-ray tube screen.

The screen display cycle will continue until all display data characters in the selected section of the memory 10 have been read out and the end-of-screen character EOS detected in the display register 76 by the decoder 80. The decoder 80 will then signal the memory control and timing 40 to signify the end of the current display and to signal the initialization of the next screen's activities.

As the screen display cycle runs, as just described, the control bits in the control storage register 60 are updated by the memory control and timing 40 in accordance with the particular type of characters that are read out into the display register 76 during the display cycle, the particular sequence of these characters as they are read out of the memory 10, and also in accordance with the output states of the horizontal and vertical position counters 18 and 24. Whenever it is set by the memory control and timing 40, each bit in the control storage register 60 stores a particular condition which was detected during the screen display cycle by the memory control and timing 40 and the display register decoder 80. The various conditions for the 12 control bits in the control storage register 60 are listed in Table II. As indicated earlier, the bits in the control storage register 60 are used in the logic of the memory control and timing 40 to perform various keyboard loading functions which will be described shortly.

TABLE II

Cursor Control Storage Bit Allocation

| | |
|---|---|
| B1 | Alterable form is on screen. |
| B2 | Cursor position—variable tab stop. |
| B3 | Inhibit Character insert. |
| B4 | Inhibit new-line insert. |
| B5 | Unalterable form on screen. |
| B6 | Spare. |
| B7 | Cursor follows escape sequence. |
| B8 | Line containing cursor contains over 72 characters. |
| B9 | Cursor over new line character. |
| B10 | Cursor over escape character position. |
| B11 | Cursor over tab character. |
| B12 | Cursor over end-of-screen character. |

Data may be loaded into the memory 10 either from a single keyboard if there is only one keyboard-montor in the Terminal, or from the several keyboards if there are more than one keyboard-monitor in the Terminal, or from the communication System which in the present embodiment of the invention is a data processor, or more specifically a digital computer. Loading from the several keyboards will be described first, and loading from the System will be described later on in connection with the description of the input/output section.

Figure 7:
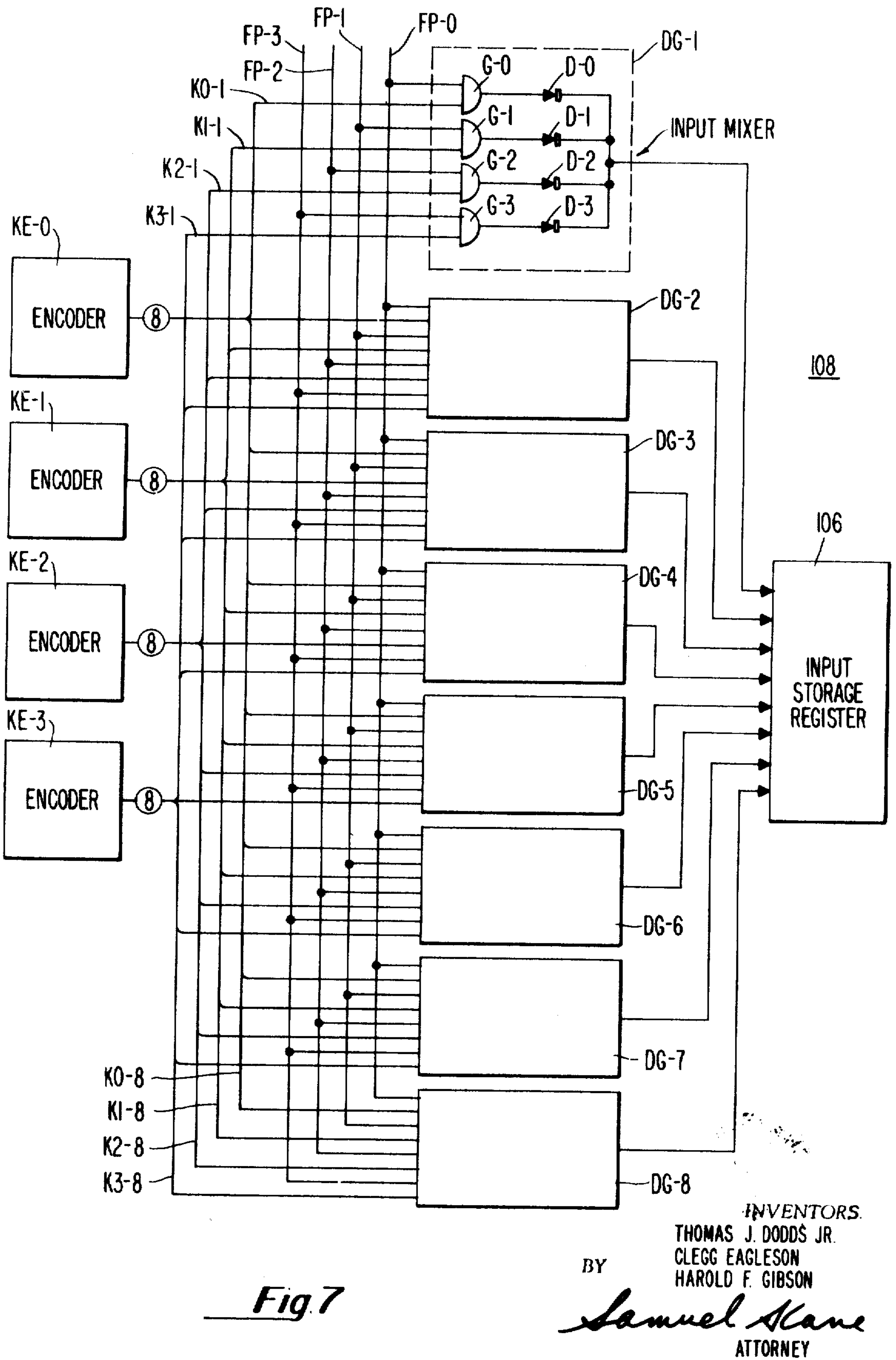
FIG. 7 is a block diagram of a priority selection circuit for granting access to the memory to the several keyboards.

Depressing a KEYBOARD key (FIG. 8) places the keyboard-monitor into the Composition phase so that data may be entered into the particular section of the memory 10. Depressing any one of the graphic, cursor movement or control keys causes the character code representing the particular key to be encoded in the particular one of the keyboard encoders KE–0 to KE–3 (FIG. 7) in an eight-bit character code and fed into an eight-bit input storage register in a block 106 (FIG. 2A) via an input mixer shown in the same block 106, and shown separate from the input storage register in FIG. 7. Input from both the keyboards and the System is an eight-bit ASCII code, and since the memory 10 is a six-bit memory, the character code in the input storage register 106 will later be converted to a six-bit code, as will be described.

Since the several keyboards are operated independently of each other and may at any time be operated simultaneously in a Composition phase, a priority selection network is provided to enable the the several keyboards to access the memory 10, one at a time. The priority selection network shown in FIG. 7 enables the several keyboards K–0 to K–3 sequentially by means of the selection network shown in FIG. 7 and their associated frame pulses FP–0 to FP–3. Thus, the priority selection network 108 includes eight diode-gate networks DG–1 to DG–8 which feed into the input storage register 106 through their several output circuits which represent the input mixer of block 106. Each of the diode-gate networks DG–1 to DG–8 includes a series-connected diode and gate for one of the bits of each of the several keyboards. Thus, the series-connected diode D–0 and AND-gate G–0 in the diode-gate network DG–1, for example, are connected to the first bit line KO–1 from keyboard encoder KE–0. Similarly, the diode D–1 and the AND-gate G–1 are connected to the first bit line K1–1 from the keyboard encoder KE–1. Diode D–2 and AND-gate G–2 are connected to the first bit line from keyboard encoder KE–2 and diode D–3 and AND-gate G–3 are connected to the first bit line from keyboard encoder KE–3. The other diode-gate networks are similarly connected to the other seven bit lines from the four encoders. The diode-gate network DG–8, for example, is connected to the eighth bit lines KO–8, K1–8, K2–8 and K3–8 from the four keyboard encoders KE–0 to KE–3.

Now, when a key is depressed on any one or more of the several keyboards K–0 to K–3, each of the keyboards K–0 to K–3 involved presents to an input/output control circuit 110 (FIG. 2A) a DATA AVAILABLE signal. The input/output control 110 is used in the keyboard mode to control the transfer of information from the input storage register 106 and input data translator 114 into the display register 76 and a buffer register 116 (FIG. 2E). The input/output control 110 also generates the necessary pulses to the memory control and timing 40 for both up- and down-counting of the cursor memory address register 58, and controls access to the memory system 12 by selecting either the memory address register 64, the cursor memory address register 58 or a processor memory address register 120 (FIG. 2B) as the means of addressing the memory system 12, and therefore the memory 10, at appropriate times.

The input/output control circuit 110 (FIG. 2A) utilizes the DATA AVAILABLE signal and the END SCREEN signal occurring at the end of the previous screen's display to strobe the particular one of the frame pulses FP–0 to FP–3 into the associated AND-gates of the diode-gate networks DG–1 to DG–8, and thereby select the particular keyboard. Since the frame pulses FP–0 to FP–3 occur sequentially, the several keyboards K–0 to K–3 will have access to the memory 10 on a sequential basis.

Data in the input storage register 106 is decoded by an input control decoder 112 (FIG. 2D) for decoding the specific character codes detected in the input storage register 106. If the character code in the input storage register 106 is a graphic or alphanumeric character, the input control decoder 112 will provide an output signal to the input/output control 110 which will signal the memory control and timing 40 to initiate a read/write cycle of the memory 10 for loading into the selected section of the memory 10 the graphic character code in the input storage register 106. The memory control and timing 40 then addresses the memory 10 to the address specified by the cursor memory address register 58 and reads out the character code into the display register 76 via the sense amplifiers 68, the memory information register 70 and display register transfer gates 78. The character code in the display register 76 is decoded by the display register decoder 80 which signals the memory control and timing 40 so as to initial the appropriate action, which depends upon the nature of the character in the display register 76.

Now, if the character in the display register 76 is detected by the decoder 80 as being a graphic character, the action to be taken is to replace this character in memory with the graphic character that is in the input storage register 106. This is accomplished by first writing back into the memory 10 the character code in the display register 76 via the memory input data gates 72 and information drivers 74. The memory control and timing 40 then generates another read-write cycle, by first addressing the memory 10 to the same address specified in the cursor memory address register 58 and reading out the same character code for the second time via the sense amplifiers 68, but storing it this time in the memory information register 70. At the same time, that is, during the Read portion of the current read/write cycle, the character in the input storage register 106 is converted into a six-bit code in an input data translator 114 (FIG. 2A) and transferred into the display register 76 via the display register transfer gates 78. On the Write portion of this cycle, the input character code in the display register 76 is written into the memory 10 via the memory input data gates 72 and information drivers 74 and into the cell vacated by the character code which is now in the memory information register 70, and thereby to complete the Replace function. The cursor memory address register 58 is then counted up by one count by the memory control and timing 40 so that displaywise the cursor 14 will move one character position to the right on the associated cathode-ray tube screen, unless it was at the last portion of a line in which case it will move to the first position of the next line down.

Now, if the input character code in the input storage register 106 is a graphic character and if the cathode code read out into the display register 76 is an end-of-screen character EOS, as detected by the decoder 80, and if bit B12 (Table II) of the control storage register 60 is detected by the memory timing and control 40 as being set, indicating that the cursor 14 is over the end-of-screen character EOS, the action to be taken is to insert the input data character in front of the end-of-screen character EOS in the memory 10, and this involves what has been termed a "Push" cycle. The end-of-screen character EOS in the display register 76 is written back into the memory 10 via the memory input data gates 72 and information drivers 74 and a Push cycle initiated by the memory control and timing 40 which in this instance will involve two read/write cycles. Thus, the memory control and timing 40 will address the memory 10 to the same address specified in the cursor memory address register 58 and read out the end-of-screen character EOS for the second time, but this time into the memory information register 70 via the sense amplifiers 68. At the same time, that is, during the Read portion of this cycle, the graphic character code in the input storage register 106 is transferred into the display register 76 via the input data translator 114 and display register transfer gates 78. On the Write portion of this cycle, the graphic character in the display register 76 is written into the memory 10 via the memory input data gates 72 and information drivers 74 into the cell vacated by the end-of-screen character EOS. The memory control and timing 40 will then count up the cursor memory address register 58 by one count to initiate the next read/write cycle, address the memory 10 to the address specified in the cursor memory address register 58 and read out the next character. The character will be read out into the memory information register 70 via the sense amplifiers 68, and the end-of-screen character EOS transferred from the memory information register 70 to the display register 76 via the display register transfer gates 78. On the Write portion of this cycle, the end-of-screen character EOS in the display register 76 is written back into the memory 10 via the memory input data gates 72 and information drivers 74 to complete the Push cycle.

If the input character code in the input storage register 106 is a graphic character and if the character read out into the display register 76 is a new-line character CR, and if bit B9 (Table II) of the control storage register 60 is set indicating that the cursor 14 is over a new-line character CR, a Push cycle is performed similar to that described above to insert the input character into the memory 10 in front of the new-line character CR, however, in this case the Push cycles are continued until the end-of-screen character EOS is advanced into the next cell in the memory 10. If the new-line character CR which was read out into the display register 76 happened to be located in the memory 10 in a position corresponding to character position CP-80, that is the last display position on a line, no Push cycle would be involved, but a Replace function would be performed to have the new-line character CR replaced in the memory 10 with the graphic character code in the input storage register 106. This Replace function would be similar to that described above where the input graphic character replaced an existing graphic character in the memory 10.

If the character in the input storage register 106 is a graphic character and the character read out into the display register 76 is an escape header character ESC, the function to be performed is to replace the escape header character code ESC in the memory 10 with the graphic input data character in the input storage register 106 and then to delete the second or follower character of the escape sequence which follows the header character ESC. The first step is to write the escape header character ESC back into the memory 10 from the display register 76 via the memory input data gates 72 and information drivers 74 and then to perform the Replace function in which the escape header character ESC in the memory 10 is replaced by the character code in the input storage register 106. The next operation is to delete the escape follower character code which follows in the memory 10 the escape header character ESC, however, the manner of performing a character delete function will be described later.

Now, if the character code in the input storage register 106 is one of the eight excess character types represented by a two-character escape sequence, and if the character code read out into the display register 76 is a graphic character, the functions to be performed are to replace the graphic character in the memory 10 with an escape header character ESC and then to insert after it in the memory 10 the appropriate escape follower character corresponding to the code that is in the input storage register 106. These functions are performed by first writing the graphic character that is in the display register 76 back into the memory 10 via the memory input data gates 72 and information drivers 74. The graphic character in the memory 10 is then read out a second time and transferred into the memory information register 70 via the sense amplifiers 68. At the same time, that is, during the current Read portion of the memory cycle, the input/output control 110 will cause the input data translator 114 to generate and transmit into the display register 76 an escape header character ESC. On the Write portion of this cycle, the escape header character ESC in the display register 76 is written into the memory 10 via the memory input data gates 72 and information drivers 74 to replace the graphic character which is now stored in the memory information register 70, and which is discarded upon completion of this Replace function. The input data translator 114 will then generate an escape follower character corresponding to the code in the input storage register 106 and a Push cycle will be initiated by the memory control and timing 40 to insert the escape follower character into the memory 10 in front of the character code which follows the escape header character code ESC so as to follow this escape header code ESC to form the two-character escape sequence.

Again, if the character code in the input storage register 106 is one of the eight excess character types and the character read out into the display register 76 is a new-line character CR, and if bit B9 (Table II) of the control storage register 60 is set, the operation to be performed is to insert a two-character escape sequence in front of the new-line character code CR by performing what may be termed a "push-by-two" cycle. This is performed by first writing back into the memory 10 the new-line character code CR from the display register 76 via the memory input data gates 72 and information drivers 74. The new-line character CR is again read out and stored in the memory information register 70 via the sense amplifiers 68. During this readout, an escape header character ESC is generated by the input data translator 114 and transferred into a buffer register 116 via buffer register transfer gates 118. The input data translator 114 then generates the corresponding escape follower character code which is transferred into the display register 76 via the display register transfer gates 78. On the Write portion of this cycle, the escape header character ESC is written into the memory 10 from the buffer register 116 via the memory input data gates 72 and information drivers 74. The memory control and timing 40 then counts up the cursor memory address register 58, addresses the memory 10 with the address in the cursor memory address register 58, the escape follower character code is transferred from the display register 76 to the buffer register 116 via the buffer register transfer gates 118, the character in the memory information register 70 is transferred into the display register 76 via the display register transfer gates 78 and the character in the memory 10 at the cursor address read out into the memory information register 70 via the sense amplifier 68. On the Write portion of this memory cycle, the escape follower character code in the buffer register 116 is written into the memory 10 via the memory input data gates 72 and the information drivers 74. The memory control and timing 40 again counts up the cursor memory address register 58 by one count, addresses the memory 10 to this address and similarly reads out the character at this address into the memory information register 70 via the sense amplifiers 68. During this readout, the information which was in the memory information register 70 is transferred into the display register 76 via the gates 78, and the information which was in the display register 76 is transferred into the buffer register 116 via the gates 118. On the Write portion of this memory cycle, the character code in the buffer register 116 is similarly written into the memory 10 via the memory input data gates 72 and information drivers 74. The read/write cycles continue in this manner until the end-of-screen character EOS is written back into the memory 10 from the buffer register 116 into a position two cells forward from the memory position it occupied when the push-by-two cycle was initiated.

If the input data character in the input storage register 106 is, again, one of the eight excess character codes and if the character which was read out into the display register 76 is an end-of-screen character EOS, a fixed tab character FT, or a variable tab character VT, and if the corresponding one of bits B12 or B11 (Table II) of the control storage register 60 is set and detected as such by the memory control and timing 40, a push-by-two cycle similar to the one just described will be performed to insert a two-character escape sequence into the memory 10 in front of the particular one of these characters which may have been read out into the display register 76.

Again, if the character code in the input storage register 106 is one of the eight excess characters and if the character read out into the display register 76 is an escape header character ESC, the operations to be performed are to replace the existing escape header character ESC with a new escape header character ESC and then replace the existing escape follower character with a new escape follower character corresponding to the code which is in the input storage register 106. This involves two functions and begins by writing the existing escape header character ESC back into the memory 10 from the display register 76 via the memory input data gates 72 and information drivers 74. The memory 10 is then readout at the same address and the escape header character ESC readout for the second time into the memory information register 70 via the sense amplifiers 68. During this readout, the input/output control 110 will cause the input data translator 114 to generate an escape header character ESC and load it into the display register 76 via the gates 78. On the Write portion of this cycle, the new escape header character ESC is written into the memory 10 from the display register 76 via the memory input data gates 72 and information drivers 74 to complete the Replace function for this character. The memory control and timing 40 then counts up the cursor memory address register 58 by one count and reads out the next character from memory, which is the escape follower character code, into the memory information register 70 via the sense amplifiers 68. During this readout, an input escape follower character corresponding to the code in the input storage register 106 is generated by the input data translator 114 and similarly transferred into the display register 76 via the transfer gates 78. The new escape follower character in the display register 76 is then written into the memory 10 via the memory input data gates 72 and information drivers 74 to complete the Replace function for the escape follower character code.

Loading of data into the memory 10 is accomplished with the aid of certain keys (FIG. 8) on the respective keyboards K–0 to K–3. Certain of these keys are used for positioning the cursor 14 to the screen position where the next alphanumeric entry is to take place, while other keys are used in conjunction with the cursor positioning keys and their operation may or may not result in an additional movement of the cursor display. A description will now be given of the operation of the several keys and the corresponding functions to be performed.

Depressing any one of the keys associated with movement or positioning of the cursor 14 results in the encoding of the character code represented by the key in the appropriate one of the keyboard encoders KE–0 to KE–3 and the transfer of the encoded character into the input storage register 106 where it is decoded by the input control decoder 112 which provides on the appropriate one of its output lines 122 a signal to the memory control and timing 40 to initiate appropriate action.

Accordingly, depressing a SHIFT key and a CLEAR/HOME key (FIG. 8) results in a CLEAR signal from the input control decoder 112 to the memory control and timing 40 and serves to clear the screen and position the cursor 14 to the first character position CP–1 (FIG. 21) at the upper left corner of the screen. This function is performed by the memory control and timing 40 first resetting the cursor memory address register 58 and memory address register 64 to their first position, each corresponding to the first data display position, or sixth memory cell in the particular memory section. The memory 10 is then addressed with the memory address register 64 and a Read/Write cycle initiated by the memory control and timing 40 to read out the first display data address of the particular section of the memory 10. The memory control and timing 40 then generates an end-of-screen character EOS, and on the Write portion of this cycle writes the end-of-screen character EOS into the memory 10 via the memory input data gates 72 and information drivers 74. The cursor 14 will now be displayed at the upper left corner of the screen in the first character position CP–1 and the end-of-screen character EOS will be in the memory 10 in the first display data position, following the five control cells, which corresponds to the first character position CP–1 of the top line on the screen. The memory control and timing 40 will then continue to generate read/write cycles by addressing the memory 10 with the memory address register 64 until all display data positions in the particular section of memory have been loaded with space codes generated by the memory control and timing 40, and written into the memory 10 via the memory input data gates 72 and information drivers 74.

Depressing a NEW LINE key (FIG. 8) causes a new-line character CR (carriage return) to be transferred into the input storage register 106 and results in the cursor 14 being positioned to the first character position CP–1 on the next line down on the screen. This function is performed when the memory control and timing 40 detects the NEW LINE signal out of the input control decoder 112, addresses the memory 10 to the address specified in the cursor memory address register 58 and reads out the character at this address into the display register 76. If the character in the display register 76 is also a new-line character CR, as decoded by the display register decoder 80, the input new-line character CR in the input storage register 106 is discarded and the existing new-line character CR in the display register 76 written back into the memory 10. The cursor memory address register 58 is then counted up by one count by the memory control and timing 40 to place the cursor 14 display at the first character position on the next line down. If the character read out into the display register 76 is an end-of-screen character EOS, the new-line character CR in the input storage register 106 is loaded into the memory 10 by means of a push-by-one cycle and the cursor memory address register 58 again counted up by one count to place the cursor display on the next line.

Again, with the NEW LINE key depressed, if the character read out into the display register 76 is a graphic character, the new-line input character CR in the input storage register 106 is not loaded into the memory 10, but is discarded. In this case, the graphic character in the display register 76 is written back into the memory 10 via the memory input data gates 72 and information drivers 74 and a search initiated by the memory control and timing 40 to locate the address of the last character position CP–80 of the particular line on the screen that the cursor 14 is positioned on. In this case, the memory address register 64 is reset to its first position. The memory control and timing 40 then generates a display cycle, but with no display presented to the particular monitor, and the memory 10 is read out repeatedly in consecutive read/write cycles by addressing it with the consecutive addresses of the memory address register 64 until the memory control and timing 40 detects the output of the horizontal position counter 18 corresponding to the last character position CP–80 of the line that the cursor 14 is on.

With the address of the last character position CP–80 of the line that the cursor 14 is on now in the memory address register 64, this address is now transferred from the memory address register 64 into the cursor memory address register 58 via the input gates in the same block 58, however, the cursor 14 is not displayed at the end of the line. If the character in the display register 76 at this time is an end-of-screen character EOS, indicating that this end-of-screen character EOS is at the end of the same line that the cursor 14 is on, the end-of-screen character EOS in the display register 76 is first written back into the memory 10 and then the input new-line character CR in the input storage register 106 is loaded into the memory 10 in front of the end-of-screen character EOS by means of a push-by-one cycle. The cursor memory address register 58 is then counted up by one count to position the cursor to the first character position CP–1 on the next line down on the screen. If the character in the display register 76 is not an end-of-screen character EOS at this time, the cursor memory address register 58 is counted up by one count to position the cursor 14 to the first character position CP–1 on the next line.

Accordingly, the only time that a new-line character CR will be inserted into the memory 10 when the NEW LINE key is depressed is when the character in the memory 10 at the address specified by the cursor memory address register 58 is on a line in which the end-of-screen character EOS is the last character of the line.

Depressing a BACK LINE key (FIG. 8) causes the cursor 14 to move to the left or first position CP–1 of the same line, if it is not already in the first position of that line, or, if it is in the first position of that line, causes it to move to the first position CP–1 of the next line up.

In the case where the cursor 14 is not in the first position of a line, the back line function is performed by the memory control and timing 40 receiving the BACK LINE output signal from the input control decoder 112 and initiating a search cycle for an end-of-line character at the end of the line that is above the line that the cursor 14 is on. The end-of-line character may be either a new-line character CR or a graphic character at character position CP–80 of the upper line.

The memory control and timing 40 initiates and generates a search cycle in which the memory 10 is cycled similarly as in the display cycle, however, no display is presented to the particular monitor at this time. During this search cycle, the memory 10 is repeatedly read out by being addressed by the memory address register 64. If a new-line character CR is detected in the display register 76, or if a graphic character is in the display register 76 at the same time that the memory control and timing 40 detects count 80 out of the horizontal position counter 18, indicating that the graphic character in the display register 76 is an end-of-line character, in either of such events, detection of either end-of-line character causes the memory control and timing 40 to generate two additional read/write cycles for loading the address in the memory address register 64 into the first two control cells of the particular section of memory which store the cursor address for that section of memory. This function is accomplished by first writing the character code in the display register 76 back into the memory 10 via the memory input data gates 72 and information drivers 74 and then initiating the first of these two additional memory read/write cycles by addressing the memory 10 with the five control address lines 63 out of the memory control and timing 40. Thus, if keyboard K–1 were the selected keyboard at this time, for example, the control address in the lines 63 to the address selection gates 66 would be presented to memory section MS–1 and the first control cell M–256 would be read out of the memory 10. On the Write portion of this first additional cycle, the first five bits in the memory address register 64 will be written into the control cell M–256 via the memory input data gates 72 and information drivers 74. The memory control and timing 40 will then initiate the next read/write cycle by adjusting the least significant one of the three least significant bits of the control address lines 63 to the next address which is the address of control cell M–257 and then read this address out into the memory information register 70 via the sense amplifiers 68. On the Write portion of this second additional cycle, the second five bits of the memory address register 64 are written into the control cell M–257 via the memory input data gates 72 and information drivers 74.

The search cycle continues and each time an end-of-line character is encountered in the cycle, as just described, the address in the memory address register 64 will similarly be written into the same two control cells, so that these two control cells will currently be storing the last end-of-line address. The search cycle continues until the address in the memory address register 64 equals the address in the cursor memory address register 58, as determined by the memory address comparator 104, and this condition indicates that the last address in the two control cells of the memory section is the address of the end-of-line character on the line above the line that the cursor 14 is on. At this time, the search cycle stops and the memory control and timing 40 addresses the memory 10 through the control address lines 63 and generates two read/write cycles to read out the two cursor control cells into the cursor memory address register 58 via the sense amplifiers 68, the memory information register 70 and the input gates in the same block 58, and causes a Control flip-flop to be set in the input/output control 110 for the particular screen being edited. At the beginning of the next display cycle for this screen and the detection of this Control flip-flop in the input/output control 110, the cursor memory address register 58 will be counted up by one count and the cursor 14 will be positioned to the first position of the line.

In the case where the sensor 14 is in the first character position CP-1 of a line when the BACK LINE key is depressed, the search cycle is similar except that the search is made to locate the address of the character in the first position CP-1 of the line above the line that the cursor 14 is on. Each time that the horizontal position counter 18 is reset at the end of a line to its first output state corresponding to the first character position CP-1 on the screen, the address in the memory address register 64 is similarly transferred into the two control cells which store the cursor address. When the address in the memory address register 64 and in the cursor memory address 58 are similarly found to be equal by the memory address comparator 104, the two cursor control cells will be similarly read out into the cursor memory address register 58 and thus, in this case, complete the back line function so that the cursor 14 will be displayed in the first character position CP-1 of the line above.

Additional keyboard editing capability is provided by means of an Insert feature whereby characters and lines may be inserted into existing screen data. The existing data, starting at the insertion position, is moved to the right and/or down to make room for the insertion.

Accordingly, upon depression of an INSERT key, (FIG. 8), the character under the cursor 14 and the following characters move one position to the right, a space character is inserted at the position of the cursor 14, and the cursor 14 remains at the original position. Thus, when the memory control and timing 40 detects the INSERT signal out of the input control decoder 112, it will generate a readout of the memory 10 at the address specified by the cursor memory address register 58, write the character in the display register 76 back into the memory 10 via the memory input data gates 72 and information drivers 74, and then generate and load a space character into the memory 10 by means of a Push cycle to make room for the insertion. The Push cycle will be continually repeated so that the movement of characters to make room for the insertion will involve all characters from the one under the cursor 14 to the first character that precedes an unused screen location, that is, at the end of a partially filled line or at the end of a tab column. At the end of the Push cycles, the address in the cursor memory address register 58 is not replaced in memory during the next initialization period, so that the cursor 14 will remain at the same position. When a character is moved or pushed from the last position of a line, it moves to the first position of the following line. If the particular screen is full, any attempt by the operator to insert additional characters will be inhibited by the memory control and timing 40 when it detects the set bit B3 (Table II) in the control storage register 60.

If a graphic key is depressed to make a graphic-character insertion at the space formed by depressing the INSERT key, the graphic character will replace the space character at the position of the cursor 14. This is accomplished by a Replace function after which the cursor memory address register 58 is counted up by one count to place the cursor 14 to the next character position to the right. FIG. 29 shows the insertion of the letter "D" into a word illustrated in FIG. 28. FIG. 30 illustrates the memory content and cursor position for the word in FIG. 28 while FIG. 31 illustrates the memory content and cursor position for the word illustrated in FIG. 29.

Figure 36:
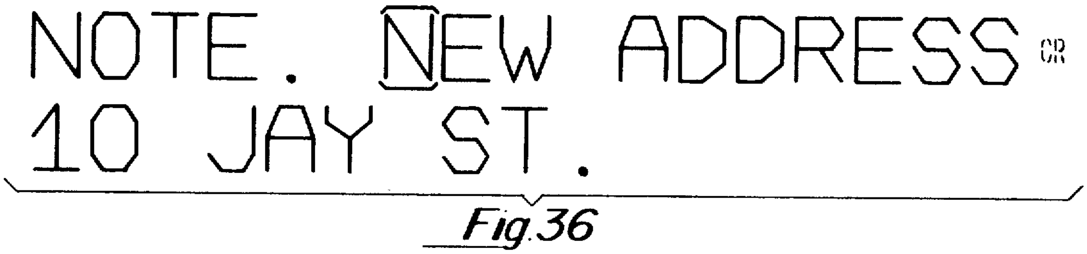
FIG. 36 illustrates a display prior to inserting a new line into existing data.
Figure 37:
FIG. 37 illustrates the result of inserting a new line into the display of FIG. 36.
Figure 38:
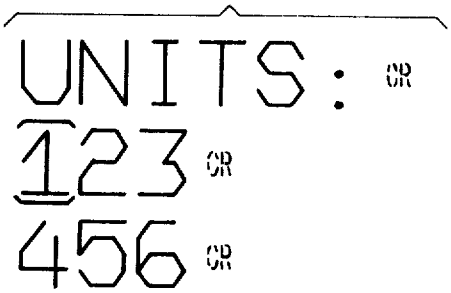
FIG. 38 is another example of a display prior to inserting a new line into existing data.
Figure 39:
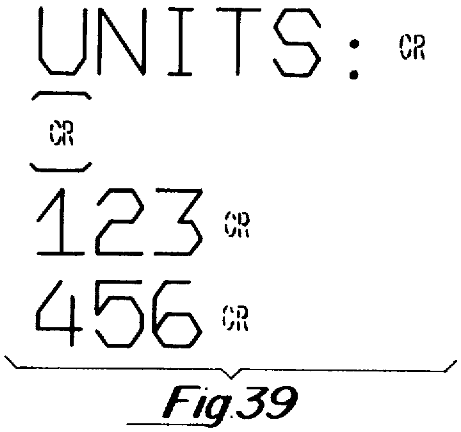
FIG. 39 illustrates the result of inserting a new line into the display of FIG. 38.

If the SHIFT key and the INSERT key are both depressed, the function to be performed is to insert a new line into the existing screen data. Thus, when the memory control and timing 40 receives the INSERT signal output from the input control decoder 112 and a Shift signal from the selected keyboard, it will first generate a read/write cycle of the address specified by the cursor memory address register 58, and then generate and load into the memory 10, via the memory input data gates 72 and information drivers 74, a new-line character CR by means of a Push cycle which will be continually repeated as in the case of the character-insert function. At the end of the Push cycles, the address in the cursor memory address register 58 is not replaced in memory during the next initialization period so that the cursor 14 will remain at the same position. FIG. 37 illustrates the completion of a line-insert function in which the new-line character CR under the cursor 14 is inserted into the existing data of FIG. 36, so that the character under the cursor and the following characters are moved down one line. FIG. 39 is a similar illustration of the completion of a line-insert function in which the new-line character CR under the cursor is inserted into the existing data of FIG. 38 and the character under the cursor and the following characters moved down one line. If the operator should attempt to insert a new line on a screen which already has 25 lines of display, the line-insert function will be inhibited when the memory control and timing 40 detects the set bit B4 (Table II) of the control storage register 60.

The cursor 14 may be moved one space forward, that is, to the right in the present embodiment of the invention by depressing the space bar (FIG. 8). Performance of this function will be initiated when the memory control and timing 40 receives a CURSOR FORWARD output signal from the input control decoder 112 and reads out into the display register 76 the character in memory 10 at the address specified by the cursor memory address register 58. If the character read out into the display register 76 is a graphic or a format effector character, it is written back into the memory 10 via the memory input data gates 72 and information drivers 74 and the cursor memory address register 58 counted up by one count by the memory control and timing 40 to move the cursor 14 one character position to the right on the screen.

Again, with the space bar depressed, if the character read out into the display register 76 is an escape header character ESC and bit B10 (Table II) in the control storage register 60 is detected as being set by the memory control and timing 40, the cursor memory address register 58 will be counted up by two counts to move the cursor 14 one character position to the right on the screen. Again, if the space bar is depressed and the character read out into the display register 76 is an end-of-screen character EOS, this character will first be read back into the memory 10 via the memory input data gates 72 and information drivers 74, and then a space character and Push cycle generated by the memory control and timing 40 to insert the space character in front of the end-of-screen character EOS which was read back into the memory 10. The cursor memory address register 58 is then counted up by one count to move the cursor 14 one character position to the right.

By depressing a BACKSPACE key (FIG. 8), the cursor 14 moves backward, or to the left, one character position on the screen. If the cursor 14 is in the first character position CP-1 of a line, it moves to the last character position CP-80 of the line above. Performance of this function is initiated when the memory control and timing 40 senses the CURSOR BACK output signal from the input control decoder 112 and reads out into the display register 76 the character in memory 10 at the address specified by the cursor memory address register 58. If the character read out into the display register 76 is a graphic character, it is written back into the memory 10 via the memory input data gates 72 and information drivers 74, and the cursor memory address register 58 counted down by one count by the memory control and timing 40 to move the cursor 14 one character position to the left. If the address of the cursor 14, as specified in the cursor memory address register 58, follows the address of a two-character escape sequence, as indicated by bit B7 (Table II) in the control storage register 60 being set, as detected by the memory control and timing 40, the cursor memory address register 58 will be counted down by two counts by the memory control and timing 40 to move the cursor 14 to the left one character position on the screen.

As indicated previously, the invention also provides the features of tabulating to any one or more of the fixed tab stops at character positions CP-1, 9, 17, 25, 33, 41, 49, 57, 65 and 73 and to a single variable tab stop which may be set by the operator to any horizontal position on a line, up to character position CP-73. The fixed tab function will be described first and this will be followed by a description of the single variable tab feature.

Depressing a TAB VAR FIXED key (FIG. 8) serves to load a fixed tab character FT into the memory 10 and causes the cursor 14 to be displayed at the next fixed tab stop, as was described earlier in the description of the display cycle. Performance of this function will be initiated when the memory control and timing 40 receives a TAB (FIXED) output signal from the input control decoder 112 and reads out into the display register 76 the character in memory 10 at the address specified by the cursor memory address register 58. If the character in the display register 76 is a new-line character CR or an end-of-screen character EOS, the character in the display register 76 will be written back into the memory 10 via the memory input data gates 72 and information drivers 74 and then the input fixed tab character FT in the input storage register 106 will be loaded into the memory 10 by means of a Push cycle.

Again, with respect to the fixed tab function, if the character read out into the display register 76 is not a new-line character CR or an end-of-screen character EOS, the character in the display register 76 will be written back into the memory 10 via the memory input data gates 72 and memory information drivers 74, the address in the cursor memory address register 58 transferred into the memory address register 64 via the input gates in the same block 64 and a search cycle initiated by the memory control and timing 40 to locate, if there is one, a new-line character CR or an end-of-screen character EOS on the same line that the cursor 14 is on. During this search cycle, the memory 10 is addressed by the memory address register 64. If, during the search, a new-line character CR or an end-of-screen character EOS is detected in the display register 76 it is written back into the memory 10 via the memory input data gates 72 and information drivers 74 and the input fixed tab character FT in the input storage register 106 loaded into the memory 10 by means of a Push cycle. If the search reaches the end of the line that the cursor 14 is on but does not locate either a new-line character CR or an end-of-screen character EOS, the last character on the line which is now in the display register 76 will be written back into the memory 10 via the memory input data gates 72 and information drivers 74 and the input fixed tab character FT in the input storage register 106 loaded into the memory 10 at the address specified by the cursor memory address register 58 by means of a Push cycle.

Continuing with the fixed tab function, if the horizontal position counter 18 should attain a count of 72 before the cursor 14 is displayed, and if bit B8 (Table II) in the control storage register 60 is set, as detected by the memory control and timing 40, the insertion of the fixed tab character will be inhibited. FIG. 23 illustrates the operation of inserting a fixed tab character FT at character position CP-11, where the cursor 14 was located when the associated tab key was depressed, and the resulting display position of the cursor 14 at character position CP-17.

Use of the single variable tab feature is commenced by setting a variable tab stop at the desired horizontal position. This is accomplished by depressing a VAR TAB SET key (FIG. 8) to cause the memory control and timing 40 to initiate a display cycle but with no display, however, being presented to the particular monitor. As the display cycle runs, the memory address comparator 104 will compare the address in the memory address register 64 with the address in the cursor memory address register 58 and when these two addresses are equal the memory control and timing 40 will transfer the horizontal position count from the horizontal position counter 18 into the variable tab register 62 to thereby establish the horizontal position of the variable tab stop.

With the variable tab stop set, the variable tab function can then be performed by first depressing the TAB VAR FIXED key and the SHIFT key. In this case, when the memory control and timing 40 detects the VARIABLE TAB signal out of the input control decoder 112 and a Shift signal from the selected keyboard, it will load the input variable tab character VT that is in the input storage register 106 into the memory 10 in a manner similar to that described for performing the fixed tab function. FIG. 24 shows the result of loading a variable tab character VT in character position CP-7, at which the cursor 14 was located when the associated variable tab key was depressed, and also shows that the variable stab stop was set at character position CP-20 where the cursor 14 is now displayed.

The cursor 14 may be moved to the "top of the form" or upper left corner of the screen to character position CP-1 of the top line. This function is performed by depressing the CLEAR/HOME key (FIG. 8). When the memory control and timing 40 detects the TOP OF FORM output signal from the input control decoder 112 it will reset the cursor memory address register 58 to its first position to cause display of the cursor 14 in character position CP-1 of the top line of the screen. In the performance of this top-of-form function, no data is loaded into the memory 10.

When the space bar (FIG. 8) is depressed and the memory control and timing 40 detects the SPACE output signal from the input control decoder 112, it will count up the cursor memory address register 58 by one count to move the cursor 14 display by one character position to the right on the screen.

Figure 40:
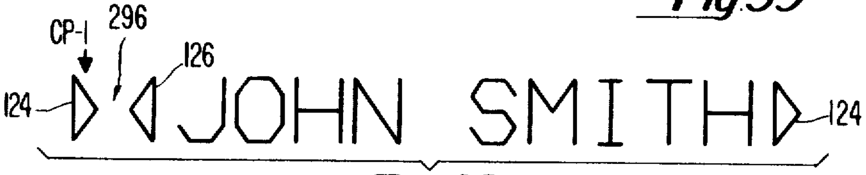
FIG. 40 illustrates a display in an alterable forms mode.

In the process of utilizing the feature of a forms mode, which will be described later, the Terminal will cause a unit separator character US to be displayed as a rightwardly pointing delta 124 (FIGS. 40 and 41) and a record separator character RS to be displayed as a leftwardly pointing delta 126. The unit separator character US is loaded into the memory 10 by depressing a key 128 (FIG. 8), and the record separator character RS is loaded into the memory 10 by depressing both key 128 and the SHIFT key. Both the unit separator character US and the record separator character RS are loaded into the memory 10 in a manner similar to that described for loading an alphanumeric or graphic character into the memory 10.

A Delete feature of the invention provides additional keyboard editing capability whereby characters of an entire or partial line may be deleted from existing screen data and the resulting gaps closed by moving data. The character delete feature will be described first after which a description will be given of the line delete feature.

The character delete function is initiated by depressing a DELETE key (FIG. 8). Upon detection of the CHAR DELETE output signal from the input control decoder 112, the memory control and timing 40 will transfer the address from the cursor memory address register 58 into the memory address register 64 via the input gates in the block 64. The cursor memory address register 58 will then be counted up by one count by the memory control and timing 40 and a cycle initiated, which may be termed a "Pull cycle," to replace the character in memory at the address specified by the memory address register 64 with the character in memory at the address specified by the cursor memory address register 58.

Each Pull cycle begins by addressing the memory 10 to the address specified in the cursor memory address register 58 and reading out the character at that address into the display register 76. Another memory cycle is generated by the memory control and timing 40 and the memory 10 is addressed by the memory address register 64 and the character at that address read out into the memory information register 70 via the sense amplifiers 68. On the Write portion of this memory cycle, the character in the display register 76 is written into the memory 10 via the memory input data gates 72 and information drivers 74 to replace the character in memory at the address specified by the memory address register 64, and thereby complete the Pull cycle. At this time, both the memory address register 64 and cursor memory address register 58 are counted up by one count and the Pull cycle repeated. This process continues until an end-of-screen character EOS is loaded into the memory 10 in an address specified by the memory address register 64. At the completion of the character delete function, the address in the cursor memory address register 58 is not replaced in the two cursor control cells in memory during the next initialization period, so that the cursor memory address will remain the same as in the previous display cycle before the character delete function was initiated. Therefore, at the completion of the character delete function, the cursor 14 will still be in its original display position and the space under the cursor, caused by the deletion, will be closed by the movement of the following characters through the first fixed tab character FT, variable tab character VT, or new-line character CR one space to the left. FIG. 46 illustrates the deletion of the letter "N" in FIG. 45 and shows that the following characters "DOE" have moved one character position to the left. FIG. 47 illustrates the memory cell content (character delete) of the display in FIG. 45 and FIG. 48 illustrates the memory cell content of the display in FIG. 46 after the deletion.

The deletion of a line is accomplished by depressing both the DELETE key and SHIFT key. The LINE DELETE signal out of the input control decoder 112 will be sensed by the memory control and timing 40 which will then readout into the display register 76 the character in the memory 10 at the address specified by the cursor memory address register 58. If the character in the display register 76 is a new-line character CR, this character will be deleted and the line that it is on will be filled with characters from the line below and all following lines will be moved up one line. This will be accomplished by first writing the new-line character CR back into the memory 10 from the display register 76 via the memory input data gates 72 and information drivers 74. Similar to the character delete function, the address in the cursor memory address register 58 will next be transferred into the memory address register 64. The cursor memory address register 58 will then be counted up by one count. The memory 10 will then be addressed by the address in the cursor memory address register 58, and the character at that address read out into the display register 76. Another memory cycle will then be generated by the memory control and timing 40 and the memory 10 read out at the address specified in the memory address register 64, and the new-line character CR at that address read out into the memory information register 70 via the sense amplifiers 68. On the Write portion of this cycle, the character in the display register 76 will be written into the memory 10 via the memory input data gates 72 and information drivers 74. This Pull cycle will be repeated continually until an end-of-screen character EOS is loaded into the memory 10 in an address specified by the memory address register 64.

Again, with respect to the line delete function, if the character read out into the display register 76 is not an end-of-line character such as a new-line character CR, a character at position CP–80, or an end-of-screen character EOS, the character in the display register 76 is written back into the memory 10 and the address in the cursor memory address register 58 is transferred into the memory address register 64. The cursor memory address register 58 is then counted up by one count by the memory control and timing 40 and the memory 10 read out using cursor memory address register 58.

The character read out into the display register 76 is detected to determine whether it is one of the end-of-line characters. This process is repeated by counting up the cursor memory address register 58 and reading out the memory 10 each time until the end-of-line character is detected in the display register 76, or by detection of count 80 of the horizontal position counter 18.

At this time, the character in the display register 76 is written back into the memory 10. The memory control and timing 40 generates another read/write cycle, addresses the memory 10 to the address in the memory address register 64 and generates and loads into the memory 10 at that address a new-line character CR. Both the memory address register 64 and cursor memory address register 58 are now counted up by one count and the Pull cycle similarly repeated continually, as in performing the character delete function, until an end-of-screen character EOS is loaded into an address specified by the memory address register 64.

Figure 25:
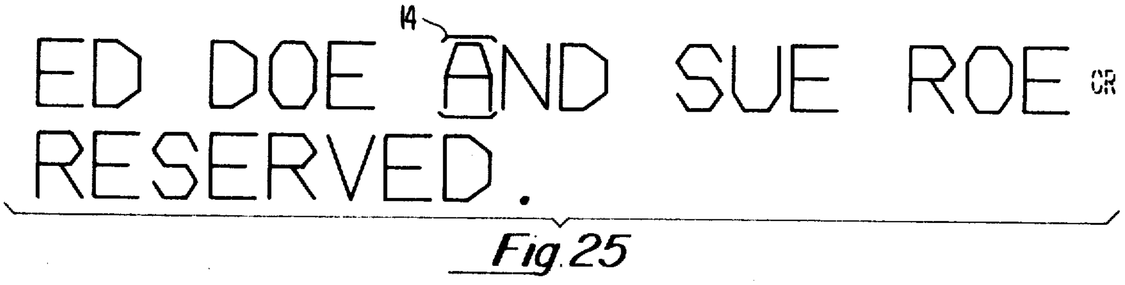
FIG. 25 illustrates a display prior to deleting a line of characters.
Figure 26:
FIG. 26 illustrates the result of deleting a line of characters at the end of a line in FIG. 25.
Figure 27:
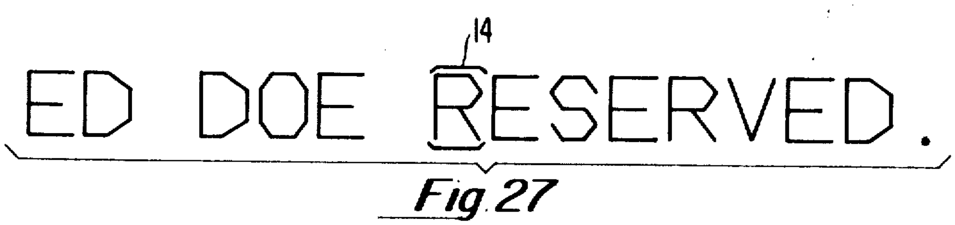
FIG. 27 illustrates the result of deleting the new-line character of FIG. 26.

FIG. 26 illustrates the result of deleting "AND SUE ROE" at the end of a line of FIG. 25, in which case the new-line character CR at the end of the line in FIG. 25 has been discarded and another new-line character CR in FIG. 26 loaded into the memory 10 at the position of the cursor 14. FIG. 27 illustrates the result of the line delete function in the case where the cursor 14 is first positioned over a new-line character CR, as in FIG. 26. Deletion of the new-line character CR in FIG. 26 has resulted in the characters on the following line moving up to the line that the cursor 14 is on, as indicated in FIG. 27. FIG. 43 illustrates the result of deleting an entire line of FIG. 42 beginning at the first character position CP–1 in which the new-line character CR has moved to the first character position CP–1 under the cursor 14. FIG. 44 illustrates the result of deleting the new-line character CR of FIG. 43 so that the following line of characters "SEAT 5" has moved up to the line that the cursor 14 is positioned on.

A tab character, whether a fixed tab character FT or a variable tab character VT, may be deleted by depressing a TAB INSERT DELETE key (FIG. 8). Upon detecting the TAB DELETE output signal from the input control decoder 112, the memory control and timing 40 will read out into the display register 76 the character in the memory 10 at the address specified by the cursor memory address register 58. If the character in the display register 76 is a tab character, a Delete cycle will be initiated to delete the tab character. If the character in the display register 76 is not a tab character, the function will be terminated and no character will be deleted. Therefore, performance of the tab delete function will only be effective to delete tab characters.

The input/output section illustrated in FIGS. 9–18 performs all the functions necessary to interface the Terminal with the data processor, or communications System. The input/output section monitors the input from the System by looking for selection messages, transmits appropriate responses to received messages, transfers input data to the memory 10 and extracts data from the memory 10 and transmits it on operator command to the System. The input/output section also performs a variety of specialized associated functions, which will be described in detail hereafter.

Figure 9:
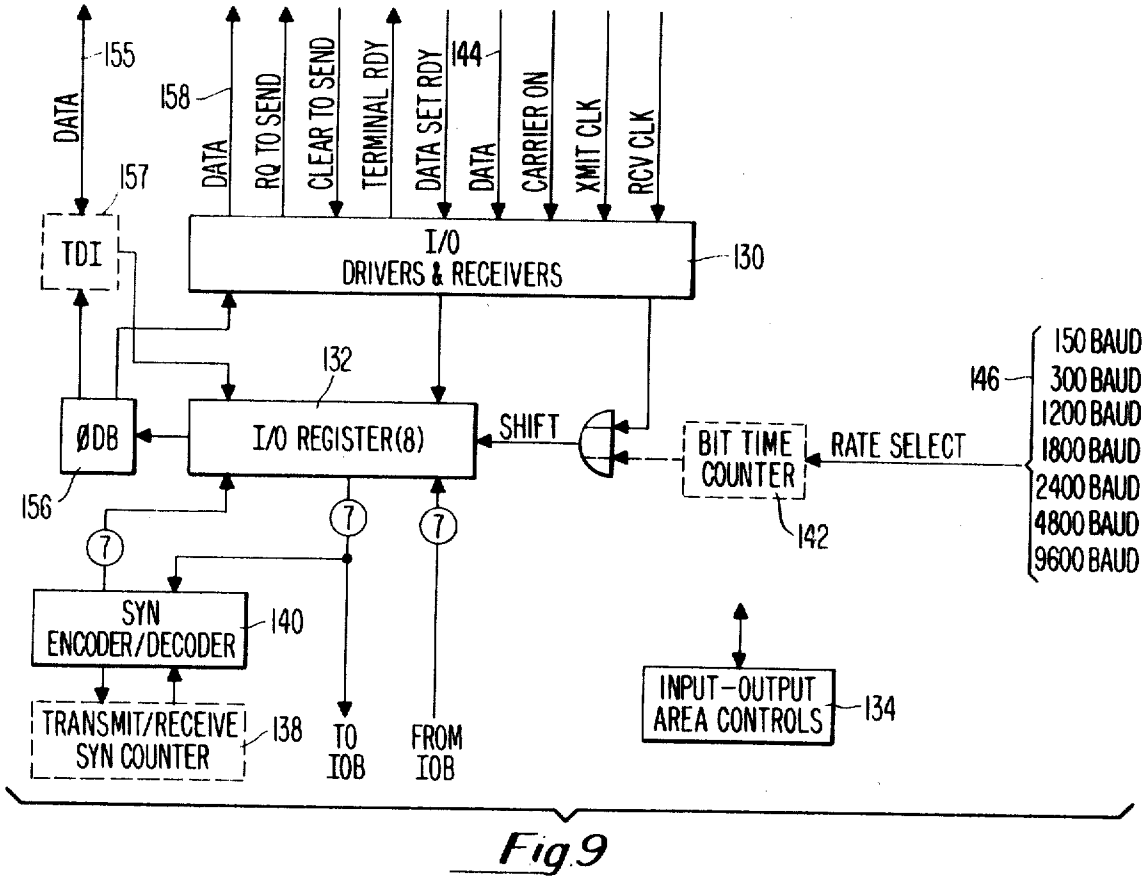
FIG. 9 is a block diagram of the input/output area of the input/output section.

The input/output area illustrated in FIG. 9 is primarily a serial-to-parallel and parallel-to-serial convertor. It establishes character sync, accepts serial input data, checks parity, and transfers complete seven-bit characters to the character processing area illustrated in FIG. 11. The input/output area (FIG. 9) accepts seven-bit characters from the character processing area (FIG. 11), generates a parity bit, serializes, and transmits the resulting eight-bit character to the data processor. The input/output area (FIG. 9) can detect and generate synchronous idle characters SYN for synchronous interface operation or, optionally, it can generate bit timing for asynchronous operation.

The illustrated embodiment of the invention includes drivers and receivers in an interface circuit 130 (FIG. 9) for the operation of an RS–232 type interface which is a standard of the Electronic Industries Association of 2001 Eye Street, Washington, D.C., N.W. Optionally, the drivers and receivers in the interface 130 can be replaced by circuitry to accomplish a two-wire direct interface.

Figure 11:
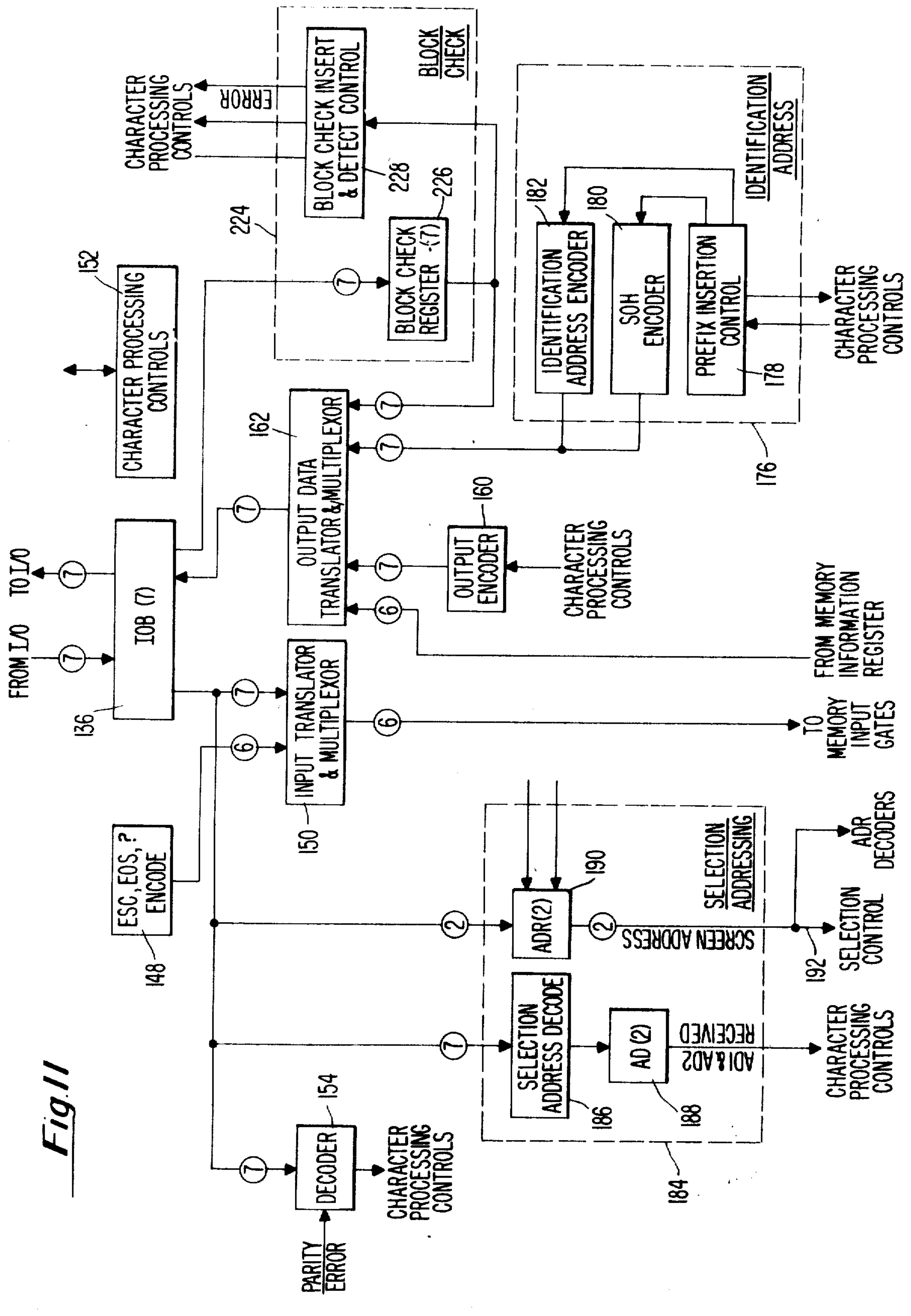
FIG. 11 is a block diagram of the character processor area of the input/output section.

The input/output area (FIG. 9) operates in both the Transmit and Receive modes. In the Receive mode, if the CARRIER ON signal from the System to the interface 130 is true, data bits are shifted serially from the interface 180 into an I/O register 132 by the input/output area controls 134 at a rate established by the Receive Clock input (RCV CLK). Bit counting in the I/O register 132 is performed by the input/output area controls 134 by presetting the I/O register 132 to all ONEs and shifting a leading ZERO down the I/O register 132 ahead of the data bits. When this ZERO is shifted out of the I/O register 132, the contents of this register are transferred to an input/output buffer register 136 (FIG. 11). If a transmit/receive SYN counter 138 is included (FIG. 9), two consecutive SYN characters are stripped from the character stream at the I/O register 132, when these characters are detected in a SYN decoder in a block 140. Before any SYN characters are received, however, the SYN counter 138 is reset to its zero count.

Bits are shifted through the I/O register 132 until a SYN character is decoded by the decoder in the block 140. When this occurs, the SYN counter 138 is counted up by one count and the I/O register 132 preset by the input/output area controls 134. The next eight bits from the System or data processor are now shifted into the I/O register 132, and examined by the decoder in block 140. If the I/O register 132 contains a SYN character, the SYN counter 138 is again counted up by one count, the I/O register 132 is preset by the input/output area controls 134, and the input/output area (FIG. 9) has achieved character sync. Subsequent characters (excepting SYNs) will now be transferred into the input/output buffer register 136 (FIG. 11) when they have been completely shifted into the I/O register 132. This process terminates when either the Receive mode is changed to the Transmit mode, or in the event that the CARRIER ON input to the interface 130 goes false. The CARRIER ON input acts as a receive enable level.

If the asynchronous interface option is incorporated into the Terminal, the Receive operation proceeds in a manner similar to that described for synchronous operation except that the Receive Clock (RCV CLK) input is no longer available. Asynchronous operation requires the input data character to be in start/stop format and thus 10 bits in length instead of eight. A bit time counter 142 (FIG. 9) is enabled by the detection of a ZERO on the input data line 144 by the input/output area controls 134. The bit time counter 142 provides the bit timing at a rate preselected by proper jumpering on an asynchronous data set control card, not shown. The illustrative counting rates, to which the invention is not limited, are bracketed at 146 and listed there in baud notation. The bit time counter 142 is disabled by the input/output area controls 134 at stop bit sampling time. The bit time counter 142 is also used when the . wire direct interface option is incorporated into the Termina., however, in that case, the CARRIER ON signal is not available as a receive enable level.

Parity is checked in the input/output area controls 134 by presetting a Parity flip-flop therein when the I/O register 132 is preset. Received ONEs complement the Parity flip-flop in the controls 134. Odd parity has been arbitrarily chosen for synchronous operation and even parity for asynchronous operation. If correct parity is not received, the Parity error flip-flop in the controls 134 is set. If the input/output area controls 134 detects a parity error, it will cause the following received control characters to be ignored and received data characters to be stored as question mark codes in the memory 10. Thus, upon the event of a parity error, the input/output area controls 134 will signal an encoder 148 (FIG. 11), which will encode the question mark character codes, and through an input translator and multiplexor 150, the memory input data gates 72 and the information drivers 74, the question mark codes will be transferred into the memory 10.

Each received character code is buffered in the input/output buffer register 136 (FIG. 11) and a Character Present flip-flop in the character processing controls 152 set to indicate that a character is in the input/output buffer register 136. Setting of the Character Present flip-flop causes the character in the input/output buffer 136 to be decoded by a decoder 154 and, if it is a control character, initiates appropriate action. If the character in the input/output buffer register 136 is a data character, and if the control logic has been placed into the data-load condition, the character in the input/output buffer 136 is translated into a six-bit code by the input translator 150 and written into the memory 10 via the memory input data gates 72 and information drivers 74. If the address in the memory 10 in which the input data character is written contained an end-of-screen character EOS, the end-of-screen character EOS is written into the following memory location. If the input data character to be stored in memory is one of the eight excess, or special characters represented by a two-character escape sequence, a Special Character flip-flop is set in the character processing controls 152 which causes an escape header character ESC to be encoded by the encoder 148 and then loaded into the memory 10 via the input translator 150, the memory input data gates 72 and information drivers 74. The seven-bit input excess character in the input/output buffer register 136 is then translated into a six-bit escape follower character code by the input translator 150 and written into the memory 10 via the memory input data gates 72 and information drivers 74. The manner in which the input data characters in the input/output buffer register 136 are transferred into the proper section MS–0 to MS–3 of the memory 10 will be described later when screen selection by the System is discussed.

When the Terminal is in the Transmit mode, characters are transferred from the input/output buffer register 136 to the I/O register 132 for ultimate delivery to the System via the interface 130. Before the first character is transmitted, the REQUEST TO SEND line (FIG. 9) out of the interface 130 is set true when the operator of a keyboard-monitor depresses the SEND key. No characters are transmitted, however, until the CLEAR TO SEND line (FIG. 9) from the System to the interface 130 goes true in response.

The Transmit Clock input (XMIT CLK) to the interface 130 is used to generate bit timing for the synchronous interface. If a synchronous data set control card, not shown, is installed, each transmission is prefixed by four SYN characters generated in the encoder in block 140 and counted by the SYN counter 138.

In transmitting, the first bit is transmitted at the leading edge of the Transmit Clock (XMIT CLK) following the leading edge that is detected with the setting true if the CLEAR TO SEND line. Bits are shifted serially by the input/output area controls 134 from the I/O register 132 into an output data bit flip-flop 156 (FIG. 9) which controls, through the interface 130, the output data line 158. In asynchronous operation, bits are shifted to an output data line 155 through a driver 157. Parity is generated by the input/output area controls 134 by presetting the Parity flip-flop therein and complementing this flip-flop for each transmitted ONE. Control characters are encoded in an output encoder 160 (FIG. 11) and transferred through an output data translator and multiplexor 162 into the input/output buffer register 136.

In transmitting, whenever a character is transferred into the input/output buffer register 136, the Character Present flip-flop is set in the character processing controls 152. The Character Present flip-flop, when set, will cause the input/output buffer register 136 to be transferred to the I/O register 132, when the I/O 132 is empty. When data is being transmitted, data character codes from the memory 14 are read out via the sense amplifiers 68 and memory information register 70, and transferred through the output data translator 162 into the input/output buffer register 136, and each time a character code is so read out and transferred, the Character Present flip-flop in the character processing controls 152 is set.

If the character code read out of the memory 10 is an escape header character ESC, as detected by an escape decoder 159 (FIG. 2D), this character is not transmitted but the Special Character flip-flop in the character processing controls 152 is set, and the next memory location accessed at which the escape follower character code is stored. The escape follower character code is now read out from the memory 10 via the sense amplifiers 68 and memory information register 70, translated into a seven-bit code in the output data translator 162 and loaded into the input/output buffer register 136. If the end-of-screen character EOS is read out of the memory 10 and detected in the output data translator 162, this character will not be transmitted but the character processing controls 152 will cause an end-of-text character code ETX to be encoded in the output encoder 160 and loaded into the input/output buffer register 136 via the output data translator and multiplexor 162.

The input/output section may request memory cycles either for the purpose of reading out data from the memory 10 in output operations or writing in data into the memory 10 in input operations, or for reading out of, or writing into, the memory 10 the address of the location corresponding to the cursor 14. The processor memory address register 120 (FIG. 10), shown also in FIG. 2B, provides the address for input/output data memory cycles.

Figure 10:
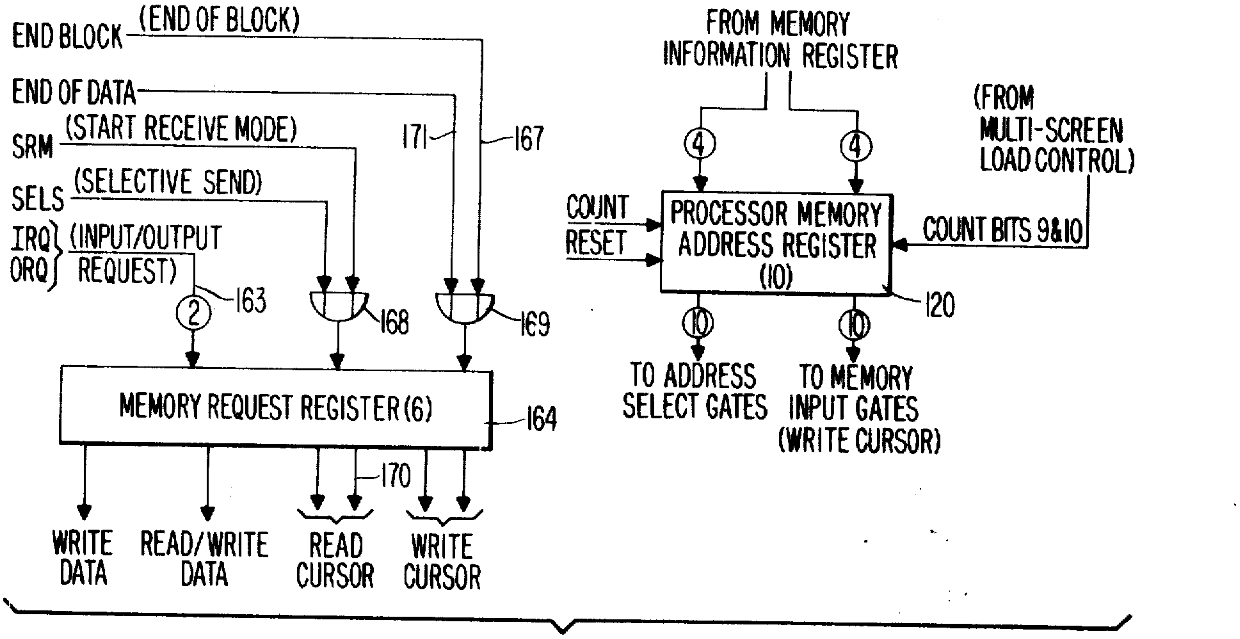
FIG. 10 is a block diagram of the memory request and addressing area of the input/output section.

When desiring to write input data into the memory 10, the character-processing controls 152 sets the input request signal IRQ true (FIG. 10). Similarly, when desiring to read out output data from the memory 10, the character processing controls 152 sets the output request signal ORQ true. The input/output request lines 163 feed into a memory request register 164 which, in response to the input request signal IRQ, provides both a WRITE DATA signal and a READ/WRITE DATA signal, and in response to an output request signal ORQ provides only the READ/WRITE DATA signal. In either case, for input or output, the WRITE DATA and READ/WRITE DATA signals are applied to priority selection circuitry in a memory priority block 166 (FIG. 2E).

The memory priority block 166 contains the necessary logic circuitry for resolving conflicts in the case of simultaneous requests to access the memory 10 by the System data processor and by the memory timing and control 40 and input/output control 110. Thus, simultaneous requests to the memory priority block 116 to access the memory 10 have been chosen to be resolved in the sequence now to be described, however, the invention is not limited to any particular priority scheme.

Access to the memory 10 is granted first by the memory priority circuit 166 to the memory timing and control 40 for initializing the system, that is, performing those functions during the 50-microsecond minimum period when the cursor address, the cursor control storage and variable tab position are written back into, and the read out of the five control cells in the particular section of memory. Access to the memory 10 is granted next by the memory priority 166 to requests by the data processor. Next to be granted access to the memory 10 are memory requests of the I/O control 110 to perform editing functions, and last to be granted access to the memory 10 by the memory priority 166 are requests by the memory timing and control 40 to perform memory display functions.

Accordingly, when the logic circuitry in the memory priority block 166 grants access to the memory 10 in response to either the input request signal IRQ or output request signal ORQ, a Processor Memory Request flip-flop will be set in the memory priority circuit 166. Setting of the Processor Memory Request flip-flop in the memory priority circuit 166 results in a signal which is gated with a signal from the memory timing and control 40 into a gate circuit in the memory priority block 166 whose output provides a Request Complete signal to the character processing controls 152 to inform it that data is available if a Read operation is being performed, or that data has been loaded if a Write operation is being performed. In either case, the character-processing controls 152 waits for this response signal whenever it sets the input request line IRQ or output request line ORQ true.

Now, in the case of an input operation, all data is loaded starting at the address in the memory 10 corresponding to the address of the cursor 14. Thus, each input operation begins with the character processing controls 152 raising the Start Receive Mode signal SRM (FIG. 10) into an OR-gate 168 whose output through a flip-flop in the memory request register 164 provides a READ CURSOR signal 170 to the memory control and timing 40 and also causes a Start Receive signal (START REC.) to be transmitted from the mode controls 172 (FIG. 2D) to the input/output control 110 to start the Receive mode. This will cause the memory control and timing 40 to address the memory 10 with the processor memory address register 120 and read out the first two control cells in the particular section of memory which contains the cursor address into the processor memory address register 120 via the sense amplifiers 68 and memory information register 70. The input operation to load data into the memory 10 from the input/output buffer register 136 then proceeds, using the cursor address in the processor memory address register 120 as the starting address. As indicated in FIG. 10, bits 9 and 10 of the processor memory address register 120 are appropriately counted by a multiscreen load control 174 (see also FIG. 12), which will be described more specifically hereafter, in the process of selecting the particular one of the screens S–0 to S–3, or the particular one of the memory sections MS–0 to MS–3 for the input or output operation.

In output or Send operations, data is normally transmitted out of the memory 10 beginning with the first display data character following the five control cells in the particular one of the sections MS–0 to MS–3 in memory. This will result in transmitting to the System the entire display data portion of the memory section, corresponding to all the data that is being displayed on the associated screen. For a Selective Send operation, however, only the data in the memory 10 beginning with the location of the cursor address 14 will be transmitted to the System. Therefore, a Selective Send operation begins by transferring the address of the cursor 14 from the first two control cells of the particular section in memory into the processor memory address register 120.

Each time a character code from the System is loaded into the memory 10 in an input operation, or transmitted out of the memory 10 in an output operation, the processor memory address register 120 is counted up by one count by the memory control and timing 40. Therefore, when a block of data has been loaded into the memory 10 in an input operation and results in a signal on a line 167 into an OR-gate 169 (FIG. 10) from the character processing controls 152 or a block of data has been transmitted in an output operation and results in a signal on a line 171 into the OR-gate 169 from the character-processing controls 152, the cursor 14 will be moved to the next screen position to the right following the screen position corresponding to the last entered or transmitted data code. This result will be attained after the ensuing initialization period in which the contents of the processor memory address register 120 is transferred into the two cursor address control storage cells in the particular section of memory via the memory input data gates 72 and information drivers 74.

When processing input/output data, the normal procedure is for the memory control and timing 40 to count up the processor memory address register 120 by one count after each character code has been processed. However, for multiple-screen operations including Broadcast Select, Group Select, or Sequential Select operations, the same data code may have to be entered into more than one of the memory sections MS–0 to MS–3 since in such operations it must be displayed on more than one of the screens S–0 to S–3. In these cases, the starting address for the input operation in the memory 10 is derived from the address of the cursor of the lowest-numbered screen, which in the present embodiment of the invention is screen S–0. Therefore, an input character code in the input/output buffer register 136 may be loaded into one or more of the memory sections MS–0 to MS–3 by counting the two most significant bits of the processor memory address register 120 while the input character code remains in the input/output buffer register 136. During such operations, it is possible in the present embodiment of the invention to load as many as 12 characters for a single input character code if an escape header character ESC must be loaded first, and an end-of-screen character EOS loaded last.

As indicated in the early part of this description, the invention may be used with a variety of communication selection and checking techniques such as, for example, Identification Addressing, Selection Addressing, Polling and Select Addressing, Broadcast Select Addressing, Group Select Addressing, Sequential Select Addressing, and Block Checking. These techniques will now be described in the order named.

The Identification Addressing feature allows the Terminal to precede all transmitted messages to the data processor or System with the Terminal address and screen address. The Identification Addressing function is performed by means of the components in an identification address block 176 (FIG. 11). Thus, for each data transmission, the character processing controls 152 causes the identification address circuit 176 to generate and transmit a three-character header sequence SOH AD1 AD2 as a prefix to each data transmission. This is accomplished by a signal from the character processing controls 152 to a prefix insertion control circuit 178 which signals an encoder 180 to have it generate the start-of-header character SOH, and to signal an identification address encoder 182 to have it encode the AD1 and AD2 characters. The AD1 character plus the four most significant bits of the AD2 character constitute the Terminal address, while the two least significant bits of the AD2 character constitute the screen address. The three prefixed characters SOH AD1 AD2 are transferred through the output data translator 162.

Selection Addressing is accomplished by means of the components shown in a selection addressing block 184 (FIG. 11) which, when incorporated into the Terminal, searches all input codes for the sequence AD1 AD2.

Selection Addressing detection beings by detecting the AD1 character in the input/output buffer register 136 be a selection address decoder 186. If the AD1 character is detected in the decoder 186, the AD1 flip-flop in the AD register 188 is set. If the AD1 flip-flop is set and the AD2 character is detected in the decoder 186, the AD2 flip-flop in the AD register 188 is set. At the same time that the AD2 flip-flop in the register 188 is set, the two least significant bits of AD2 are transferred from the input/output buffer register 136 into respective ones of an ADR-1 flip-flop and an ADR-2 flip-flop in an ADR register or screen address register 190 where they serve to select the screen involved in the operation. This is accomplished by transferring the ADR-1 and ADR-2 flip-flop output levels from the ADR screen address register 190 over lines 192 to a screen select control circuit 194 (FIG. 12) which activates the appropriate one of its four output lines 196 feeding into a screen select register 198 containing four flip flops each for storing the fact that a given screen has been selected. The output from the selected flip-flop in the screen select register 198 on the appropriate one of the four output lines 200 from the screen select register 198 signals the multiscreen load control 174 to have it select the particular one of the screens S-0 to S-3 by appropriately counting the two most significant bits, bits nine and 10, of the processor memory address register 120.

Figure 12:
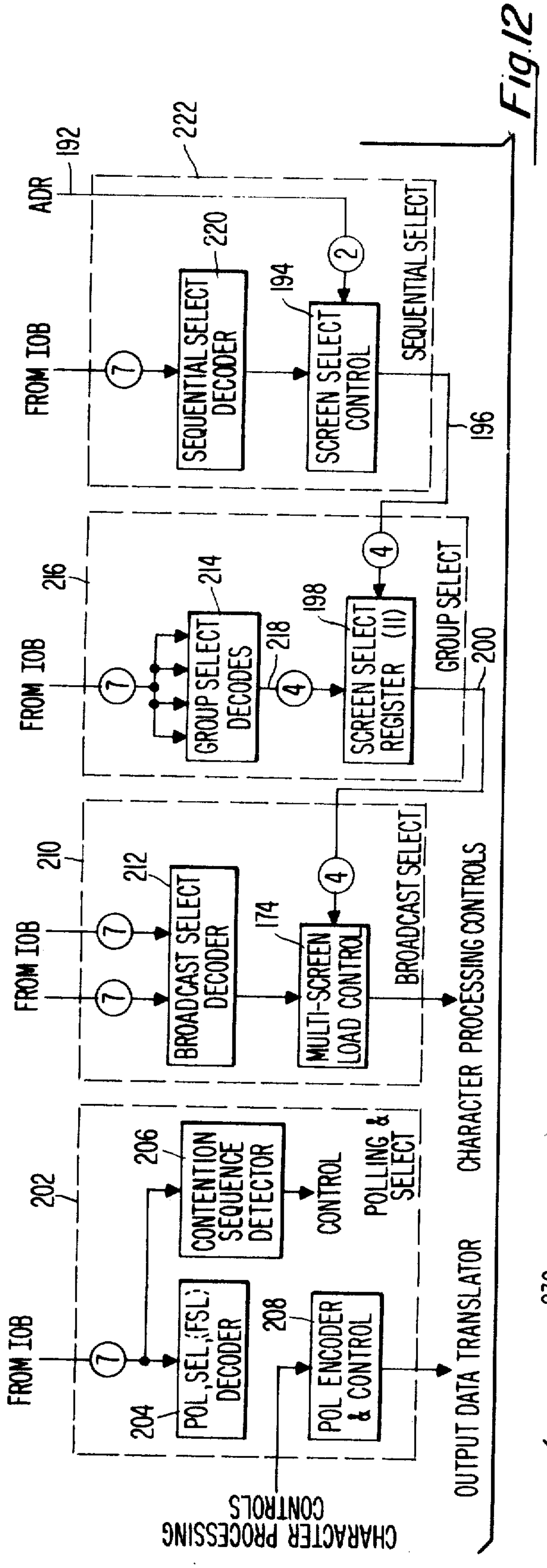
FIG. 12 is a block diagram of various selection circuits in the input/output section.

Incorporation of the Polling and Select Addressing feature into the Terminal requires that the Terminal only transmit data to the System in response to a poll message, unless the Terminal is in what has been termed the "contention mode." If the Terminal is in the contention mode, it can transmit data to the System without being polled. The Polling and Select feature is accomplished by means of components in a block 202 (FIG. 12). Thus, when a decoder 204 in block 202 decodes a poll character POL in the input/output buffer register 136, the Terminal will transmit data to the System in response to a poll message. If a contention sequence detector 206 in block 202 detects a predetermined sequence of communication control characters in the input/output buffer register 136, the Terminal will then be able to transmit data to the System without being polled.

Broadcast Select Addressing is accomplished by means of the components in a block 210 (FIG. 12). Thus, when a broadcast select decoder 212 in the block 210 decodes a sequence of control characters in the input/output buffer register 136 including a broadcast code BSL, all four keyboard-monitors will go into the Receive mode so that received data in the input/output buffer register 136, following receipt of a start-of-text character STX from the data processor, will be loaded into all sections MS-0 to MS-3 of the memory 10, and therefore will be displayed on all screens S-0 to S-3. This is accomplished when the multiscreen load control 174 receives the output of the broadcast select decoder 212 and, as described previously, counts the two most significant bits of the processor memory address register 120 while each input character code remains in the input/output buffer register 136. In this case, the starting address for loading into the memory 10 is derived from the address of the cursor 14 for screen S-0. Those of the screens S-1 to S-3 with an end-of-screen character EOS before the position corresponding to the cursor position of the screen S-0 will not be loaded since an end-of-screen character EOS in their memory section will inhibit the loading of any data into the memory cells following the memory cell in which their end-of-screen character EOS is located.

The multiscreen load control 174 contains two flip-flops which control the multiscreen loading by successively selecting each screen for each received data code. The multiscreen load control 174 also contains a Special Selection flip-flop which is set to enable the multiscreen loading procedures. The multiscreen load control 174 also contains an End Special Selection flip-flop which is used to permit the updating of all the cursor addresses when an end-of-text character ETX or end-of-transmission block character ETB is detected in the broadcast select decoder 212. This updating is disabled whenever the Terminal has been selected to perform a printing operation, as will be described hereinafter.

The feature of Group Select Addressing enables the fast selection, in the Receive mode, by the data processor or System of any preselected subset of Terminal screens. Each screen is assigned a particular group select character GSL, which may be any character in columns 2-6 of FIG. 20, to which the given screen is sensitive and which is selected by jumpering on a group select card, not shown. Each screen has independent jumpering available, however, more than one screen may be jumpered for selection by the same code. Accordingly, in Group Select addressing, the group select code GSL or codes GSLs will be detected in a group select decoder 214 (FIG. 12) in a group select block 216 and the appropriate ones of the four output lines 218 of the decoder 214 activated to set the appropriate ones of the Screen Select flip-flops in the screen select register 198, and thereby select the particular subset of screens for the operation. Subsequent operations are similar to those described above for the Broadcast Select feature.

The Sequential Select Addressing feature permits the screens to be successively selected to receive by means of a Sequential Select message containing their address. This feature allows the setting of the appropriate flip flop in the screen select register 198 when a particular screen's address is transmitted to the screen select control circuit 194 from the ADR screen address register 190 and is followed in the input/output buffer register 136 by a sequential character SEQ or a select character SEL, either of which is decoded in a sequential select decoder 220 in the sequential select block 222.

In addition to parity checking, the invention is also capable of performing a check of the accuracy of a block of characters both in the Receive and Transmit modes by means of the components in a block check block 224 (FIG. 11). Inclusion of the block checking feature will cause the Terminal, in the Receive mode, to look for and check a block check character received from the System after each end-of-transmisssion-block character ETB, which signifies the end of a block of characters, or after the receipt of an end-of-text character ETX, and in the Transmit mode to transmit a correct block check character following transmission to the System of an end-of-text character ETX. The block checking function will now be described.

In the Receive mode, a block check register 226 is held reset until a start-of-header character SOH or a start-of-text character STX is received and loaded into the input/output buffer register 136. Each received ONE in a bit position of a subsequent character received and loaded into the input/output buffer register 136 causes that bit in the block check register 226 to be complemented. Receipt of the block check character into the input/output buffer register 136 following the receipt and loading therein of an end-of-transmission-block character ETB or an end-of-text character ETX should result in the block check register 226 being reset. If the block check register 226 is not reset in such case, as detected by a block check insert and detect control circuit 228, a block check error signal will be raised by the circuit 228 to the character processing controls 152 which will cause the Terminal to respond to the received data block by generating in the output encoder 160 a negative acknowledge signal NAK and transferring it to the output data translator and multiplexor 162 for transmission to the System. In the Transmit mode, a similar action occurs. The block check register 226 is held reset until a start-of-text character STX is generated in the output encoder 160 and transferred into the input/output buffer register 136 for ultimate transmission to the System via the output data translator and multiplexor 162. Each transmitted ONE in a bit position of a subsequent transmitted character while in the input/output buffer register 136 causes that bit in the block check register 226 to be complemented. After transmission of the end-of-text character ETX, the contents of the block check register 226 are transferred to the I/O register 132 via the output data translator and multiplexor 162 and are transmitted to the System immediately following transmission of the end-of-text character ETX.

Figure 13:
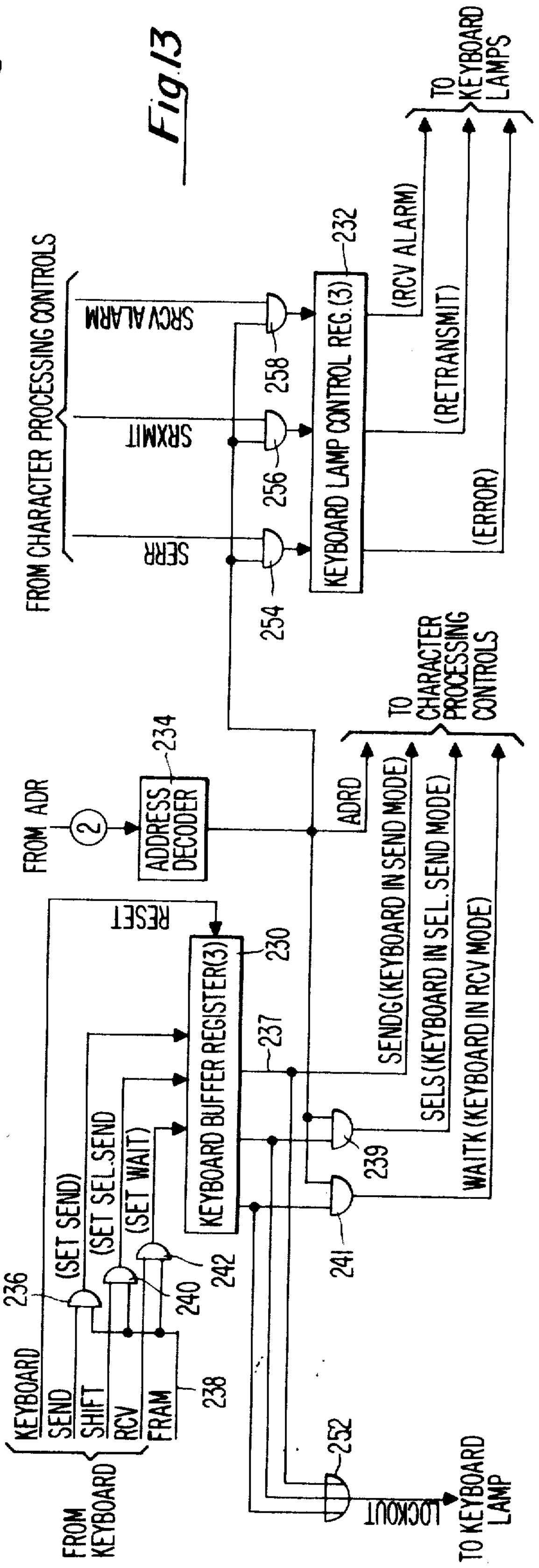
FIG. 13 is a block diagram of the keyboard logic circuitry for one of the keyboards in the input/output section.
Figure 14:
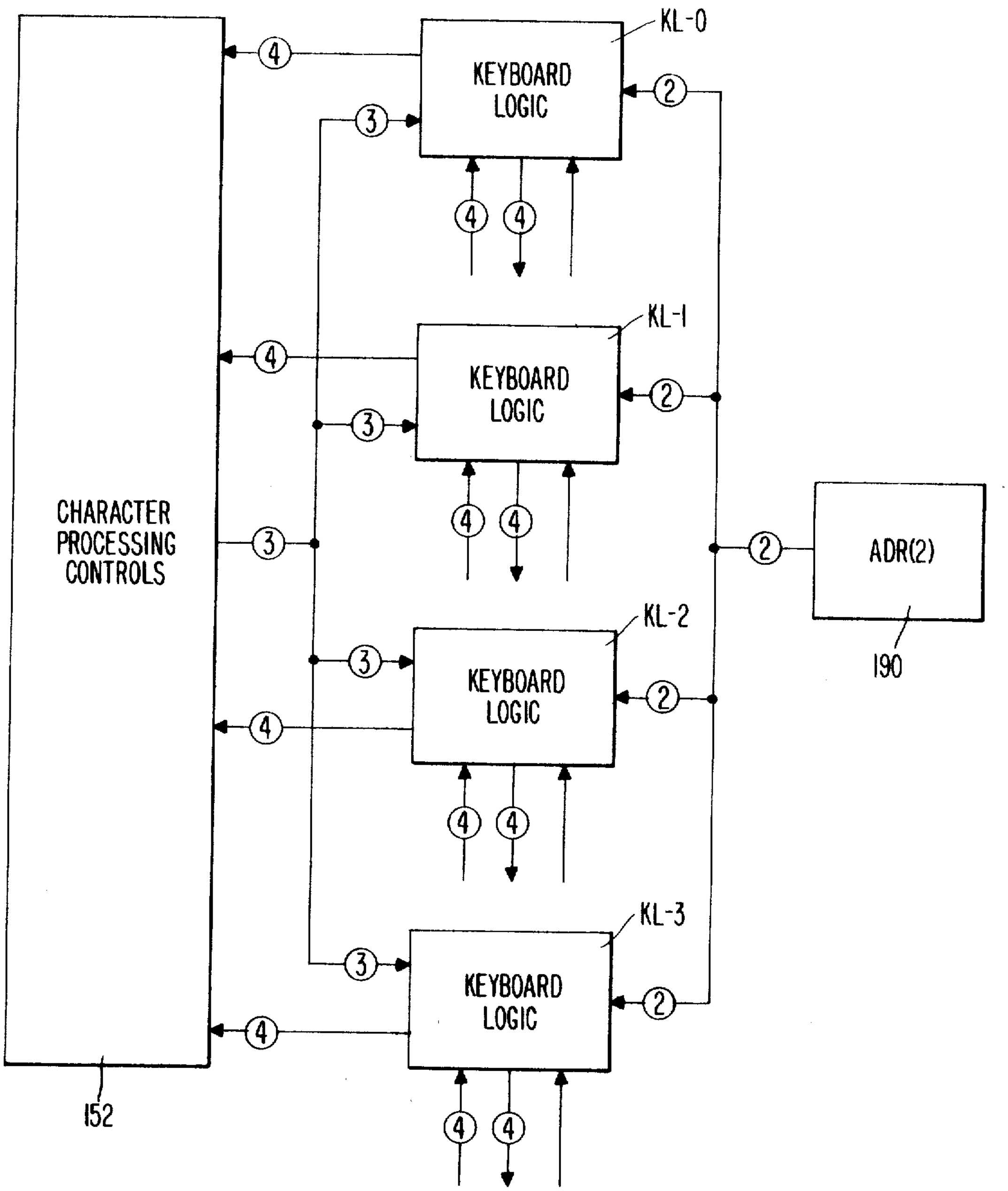
FIG. 14 is a block diagram illustrating the connections of the several keyboard logic circuits to other components in the input/output section.

Keyboard logic for the several keyboards K–0 to K–3 is identical. FIG. 14 is a block diagram showing the several keyboard logic circuits KL–0 to KL–3 for the keyboards K–0 to K–3, respectively, and the manner in which they are coupled to the character processing controls 152 and the ADR register or screen address register 190. FIG. 13 is a typical block diagram of any one of the keyboard logic circuits KL–0 to KL–3 and utilizes a keyboard buffer register 230 for storing keyboard requests, and a keyboard lamp control register 232 for driving indicator lamp drivers to light appropriate lamps on the associated keyboard. The typical keyboard logic circuit in FIG. 13 also provides address decoding for that particular keyboard by means of an address decoder 234 which receives its input from the ADR register or screen register 190.

The SEND and RECEIVE keys are only active in the keyboard mode. If depressed, they cause a code to be sent to the input/output control 110 to initiate the Send or Receive operation, respectively. In multipoint operation and with the Polling and Select Addressing feature incorporated into the Terminal and if the Terminal is in the contention mode, depressing the SEND key also results in a signal from the character processing controls 152 to a Pol encoder and control 208 (FIG. 12) which generates a poll character POL to the output data translator 162 for transmission to the System.

Depressing the SEND key also causes an input signal into an AND-gate 236 (FIG. 13) which, when strobed on a line 238 by the associated one of the frame pulses FP–0 to FP–3 causes a Send flip-flop in the keyboard buffer register 230 to be set, and results in an output signal on a line 237 to the character processing controls 152. Depressing the SHIFT key similarly causes a signal into an AND gate 240 so that with the SHIFT key depressed, depressing the SEND key causes both the Send and the Selective Send flip-flops in the keyboard buffer register 230 to be set, and results in a signal out of an AND-gate 239 to the character-processing controls 152. Depressing the RECEIVE key similarly causes a signal into an AND-gate 242 to cause the Wait flip-flop in the keyboard buffer register 230 to be set, and similarly results in a signal out of an AND-gate 241 to the character-processing controls 152.

Figures 15, 16:
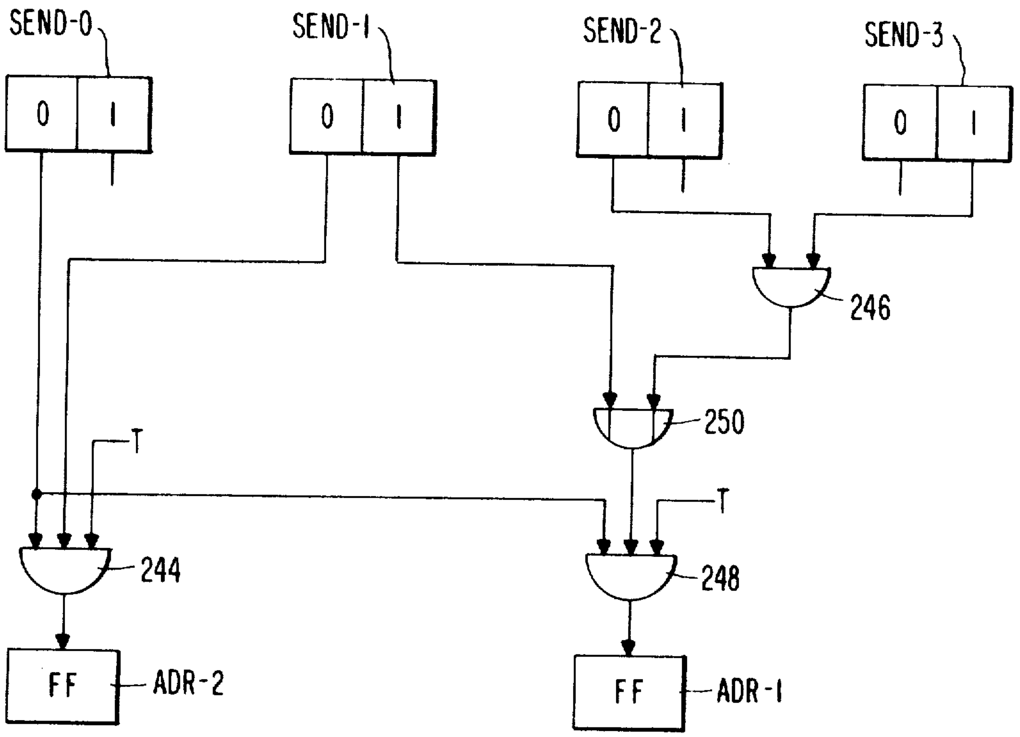
FIG. 15 is a block diagram of a priority circuit in the input/output section used for determining priority of the several keyboards in transmitting to the data processor.
FIG. 16 is a tabulation showing the possible states of two flip-flops in FIG. 15 and the corresponding keyboard Send priority.

If more than a single screen in enabled, that is, if more than one screen desires to transmit at the same time, the Terminal resolves the conflict by means of priority circuitry shown in FIG. 15 in which the Send flip-flops of the four keyboard buffer registers 230 are illustrated more specifically in block form and identified as Send–0 to Send–3, and in which the two flip-flops in the ADR screen address register 190 are similarly indicated individually and identified as ADR–1 and ADR–2. According to the particular logic chosen in the illustrated embodiment of the invention, whenever one of the Send flip-flops Send–0 to Send–3 is set, its "1" side is considered to be "true" and its "0" side is considered to be "false." Also, whenever all the inputs to AND-gates 244, 246 and 248 are true they will provide a true output and whenever either or both of the inputs to an OR-gate 250 are true it likewise will provide a true output. Whenever the input to either screen address flip-flop ADR–1 or ADR–2 is true, this flip-flop will be set and this condition is considered as being a binary "1." If the input to either flip-flop ADR–1 or ADR–2 is false, the particular flip-flop will remain reset and this condition is considered as storing a binary "0." FIG. 16 illustrates all the possible conditions of the screen address flip-flops ADR–1 and ADR–2, for any combination of simultaneously enabled Send flip-flops Send–0 to Send –3 in FIG. 15 and the resulting keyboard Send priority.

With the address of the highest priority screen or keyboard in the screen address register flip-flops ADR–1 and ADR–2, this address is detected by the address decoder 234 (FIG. 13) and the resulting signal ADRD to the character processing controls 152 initiates the generation of the character sequence AD–1 AD–2 by the identification address encoder 182 and followed by an inquiry character ENQ generated in the output encoder 160. Data transmission by the Terminal then follows reception of an acknowledge character ACK from the System. If Selective Send has been evoked, data is transmitted from the location in the particular section of the memory 10 corresponding to the cursor to the first location containing a group separator GS or an end-of-data character. If normal or Frame Send has been evoked, all data preceding the end-of-screen character EOS in the particular section of the memory 10 is transmitted.

At the conclusion of a Send operation, the Wait flip flop in the keyboard buffer register 230 for that screen is set by the character-processing controls 152. This puts the particular screen into a receive-ready condition. The operator may put the screen into this state directly, if in the keyboard mode, by depressing the RECEIVE key. The Wait flip-flop in the keyboard buffer register 230 is reset by the character-processing controls 152 upon the reception of an input message or an end-of-transmission character EOT, or by the operator depressing the KEYBOARD key to restore the screen to the keyboard or local mode. Depressing the KEYBOARD key will also reset the Send and Selective Send flip-flops in the keyboard buffer register 230 and prevent a Send operation from occurring, unless one has already started. When the Send, Selective Send or Wait flip-flops in the keyboard buffer register 230 are set, one or more of their outputs to an OR-gate 252 results in the particular keyboard being locked so as to prevent any operator activity which might disrupt the input/output operation, and causes the particular keyboard lamp to be lit to indicate the locked condition of the keyboard to the operator. The KEYBOARD key is, however, still active. Depressing the KEYBOARD key serves to unlock the keyboard by causing all flip flops in the keyboard buffer register 230 to be reset.

The keyboard lamp control register 232 includes an Input Error flip-flop, a Retransmit flip-flop and a Receive Alarm flip-flop for individually controlling one of three indicator lamps (FIG. 8) on the associated monitor. The Input Error flip-flop in the keyboard lamp control register 232 is set by the output of an AND-gate 254 which receives one input from the address decoder 234 and another input from the character processing controls 152 when the latter detects any one of the following four input error conditions: (1) any character following the start-of-text character STX with bad parity, (2) a block check error, (3) overflow of the memory 10 when its capacity is exceeded, and (4) overflow of a particular one of the memory sections MS–0 to MS–3 whenever its capacity is exceeded. The Input Error flip-flop in the keyboard lamp control register 232 is reset by the character processing controls 152 at the start of each input message for the associated screen.

The Retransmit flip-flop in the keyboard lamp control register 232 is set whenever the System requires a retransmission of a previously transmitted message. In such case, the System may respond to either the initial inquiry character ENQ or to the message data transmission with a negative acknowledge character NAK. The Retransmit flip-flop in the keyboard lamp control register 232 is set by the output of an AND-gate 256 which receives one of its inputs from the address decoder 234 and the other of its inputs from the character-processing controls 152 to light a Retransmit lamp on the associated keyboard to notify the operator of the need to retransmit the message.

The Receive Alarm flip-flop in the keyboard lamp control register 232 is set whenever the System attempts to send a message and the associated screen is not receive-ready, that is, its Wait flip-flop in the keyboard buffer register 230 is not set, as detected by the character-processing controls 152. Thus, the Receive Alarm flip-flop in the keyboard lamp control register 232 is set by the output of an AND-gate 258 which receives one input from the address decoder 234 and another input from the character-processing controls 152 to provide a signal to the associated keyboard to light the Receive Alarm lamp, and also to generate an audible alarm, and thereby notify the operator of the fact that a message has been addressed to his screen.

Another feature of the invention is its capacity to have the contents of one or more of the memory sections MS–0 to MS–3 printed on an associated printing machine 260 (FIG. 2D) at the request of either a keyboard or the System. An exemplary type of printing machine is a Teletype model 33 page printer which can be connected so as to interface with and become part of the Terminal. The memory contents associated with any keyboard-monitor may be printed at a desired rate, which in the present embodiment of the invention has been chosen to be 10 characters per second, upon command of the associated keyboard by depressing its PRINT key, or by the presence of bit B3 of the AD2 character in a Receive message.

Depressing the PRINT key evokes Frame Print. This results in all the data in the particular memory section being printed. The keyboard locks and the cursor 14 is positioned to the top line of the screen to the first character position CP–1. Each character is read out to the printer 260 via the sense amplifiers 68, the memory information register 70, the output data translator 162, the mode controls 172 and a block 280 (FIG. 2D) containing the printer output registers and various controls illustrated in FIG. 18. As each character is printed, the cursor memory address register 58 is counted up by one count until the end-of-screen character EOS of the particular memory section is detected, to end the print operation and to unlock the keyboard. By depressing both the SHIFT key and the PRINT key, Selective Print will be evoked. In this case, the keyboard will lock, and the print operation will commence from the location of the cursor 14 to the first group separator character GS, or to the end-of-screen character EOS.

A request to print from the System or data processor evokes Selective Print unless the message from the data processor contains a form feed character FF in which case Frame Print will be evoked. If a Receive message is addressed to a screen which is in the process of being printed, the Terminal will respond with a negative acknowledge character NAK.

When a print is requested either from a keyboard or the data processor, the request is stored in the logic of a print request storage unit in a block 262 (FIG. 18). The output from the print request storage unit in block 262 activates a format generator in block 264 and causes it to load the first character of the message format into a printer output register 266. The printer output register 266 contains 11 bits consisting of a start bit, two stop bits, a parity bit, and seven data bits. Data is loaded parallel into the printer output register 266 from the memory 10 via a data load controls 268 and shifted to the printer 260 serially. Data for loading the printer output register 266 is obtained from two sources: (1) the format generator in the block 264, and (2) the memory 10 via the data load controls 268.

The message format of printer message from the Terminal to the printer 260 is as follows:

CR, CR, LF, AD2, CR, CR, FL, TEXT (Memory)
LF - Line Feed
CR - Carriage Return
AD2 - Screen Address 0, 1, 2, or 3

The printer output register 266 is shifted by pulses from a counter 270 at a 9.1 msec. clock rate to the printer 260 via a driver 272 and a two-wire cable 274. When the printer output register 266 becomes empty, the format generator in the block 264 loads the next character in the sequence into the printer output register 266. When the message format is completed, the printer output register 266 is loaded from the particular one of the memory sections MS–0 to MS–3 under control of the data memory load controls 268 and the logic in a cursor control block 276.

An additional feature of the invention when using the printer interface is its ability to enable a portion of the memory 10, such as one or more of the memory sections MS–0 to MS–3, which in the present embodiment of the invention could contain 250, 500, or 750 characters, to be used as a buffer between System inputs and the printer 260. Also, multiple buffer areas in the memory 10 can be assigned. Buffer areas would be addressed by the AD2 address.

Printing can also be initiated by means of special select messages from the System in which bit B3 is present in the AD2 character. In Broadcast Select Addressing, for example, the print request of screen S–0 is set. Keyboard K–0 is locked and the cursor memory address register 58 counted as the message is written into the memory section MS–0 and then read out to the printer 260. With Group Select Addressing and with bit B3 present in the AD2 character, all print requests in the group will be set. All keyboards in the group will lock and each screen will print the message received. With Sequential Select Addressing and with bit B3 present in the AD2 character, if the last screen addressed in the Terminal is requested to print, all screens selected in the Terminal will print.

A mode control summary showing the main control states of the input/output section is given in FIG. 17. The important control flip-flops are the Phase Control flip-flops represented as PC1, PC2, and PC3, and the Mode Control Send flip-flop illustrated by the words "$\overline{\text{SEND}}$" and "SEND" at the top of the rightward columns in FIG. 17. PCO represents a gate which is true when all the Phase Control flip-flops PC1, PC2 and PC3 are reset. The Mode Control Send flip-flop indicates, when set, that the data transfer is from the Terminal to the System and, when reset, that the data transfer is from the System to the TERMINAL. The Transmit flip flop, represented by the words "TRANSMIT" and "$\overline{\text{TRANSMIT}}$" in the leftward column in FIG. 17, is set whenever the Terminal is transmitting and is reset whenever the Terminal is receiving. A single transfer of data from the Terminal to the System involves several separate transmitting and receiving sequences on the part of both the System and the Terminal. The Transmit flip-flop indicates which of these is occurring.

PC0 is the state to which the input/output section is initialized and to which it goes whenever it receives an end-of-transmission character EOT. In this state, the input/output section examines received characters, looking for a select or poll message. If a selected message for any screen at the Terminal is received, the I/O control goes to PC1 and transmits a select response, an acknowledge character ACK if the addressed screen is receive-ready, otherwise a negative acknowledge character NAK. If a negative acknowledge character NAK is transmitted, the control returns to PCO where incoming characters are examined as before. If an acknowledge character ACK was transmitted, the control goes to PC2 and extracts the address corresponding to the cursor from the memory to use as the starting address for loading incoming data. Received data is examined without further action until a start-of-text character STX is received. When this occurs, a Load Allow flip flop is set in the character processing controls 152 and subsequent characters are loaded into the memory 10. Receipt of an end-of-text character EXT or an end-of-transmission-block character ETB resets the Load Allow flip-flop. The input/output section now waits at least one full refresh cycle (16.66 ms.) to detect a possible screen overflow and also to receive a block check character if one is sent. At the end of this time, the control goes to PC3. If no error was detected, an ACK response is now generated, otherwise a NAK response is generated. Also, the cursor is updated if no error has been detected and no print operation must be performed. The control now returns to PC2 where it waits for more data or for an end-of-transmission character EOT. Receipt of an end-of-transmission character EOT resets PC2 and the control returns to PCO. If a poll message is received for any screen at the Terminal, the control goes to PC1. If the addressed screen is not send-ready, an end-of-transmission character EOT is transmitted and the control return returns to PCO.

If the addressed screen is send-ready, then the Mode Control Send flip-flop is set, the proper prefix, if any, is transmitted, and data is transmitted to the System. When a group separator character GS (if performing a Selective Send) or an end-of-screen character EOS is accessed, an end-of-text character ETX is transmitted optionally followed by a block check character and the control goes to PC2. Here the control waits for a response to the transmitted data. If a negative acknowledge character NAK is received then, in point-to-point operation, the message will be retransmitted automatically. In multipoint operation, the control automatically returns to PC1, retransmits the message and waits again in PC2 after transmitting an end-of-text character ETX. The control will return to PCO if an end-of-transmission character EOT is received. If an end-of-transmission character EOT is received, PC2 is reset as well as the Mode Control Send flip-flop and the control returns to PCO. If an acknowledge character ACK is received, the control goes to PC3. Here, it causes an end-of-transmission character EOT to be transmitted and then returns to PCO.

Another feature of the invention is its capacity to enable the System or data processor to reposition the cursor 14 on any one of the screens S–0 to S–3. This function is initiated when a message from the System includes the character sequence:

E P L

S : O I

C S N in which POS defines a horizontal screen position and LIN defines the screen line. Thus, upon receiving this character sequence and the AD2 character which selects the particular screen involved in the reposition cursor function, the character processing controls 152 will signal the mode controls 172 which in turn will apply a transfer signal to a reposition cursor register 282 (FIG. 2C) to transfer the seven-bit POS character from the input/output buffer register 136 into the reposition cursor register 282 and the appropriate five bits of the LIN character from the input/output buffer register 136 into the reposition cursor register 282. The reposition cursor register 282 is a 12-bit register with seven bits devoted to horizontal position and five bits devoted to vertical position.

A reposition cursor screen address register 281 consists of four flip-flops having a common output line 283, each flip-flop receiving at the proper time the associated one of the four START SCREEN signals from the start control 34. The output signal on the line 283 from the flip flop currently set in the register 281 be its START SCREEN signal enables a reposition comparator 284. Each time a display cycle is performed, the reposition comparator 284 compares the horizontal and vertical output states of the reposition cursor register 282 with both the horizontal position counter 18 and the vertical position counter 24 and when the output of the reposition cursor register 282 are equal to both the output of the horizontal position counter 18 and the output of the vertical position counter 24, an output is generated by the reposition comparator 284 to the memory control and timing 40. The memory control and timing 40 will then transfer the address from the memory address register 64 into the cursor memory address register 58. At the end of the selected screen's display cycle, the new address in the cursor memory address register 58 is written into the associated one of the memory sections MS–O to MS–3 into the first two control cells which store the cursor address. Each time a new cursor position is received from the System and transferred into the reposition storage register 282, the reposition cursor function is repeated.

The invention is also capable of enabling the System to reset the variable tab stop position of any one of the screens S–O to S–3. This function is initiated when a message from the System contains the character sequence:

E P

S ; O

C S in which POS again defines a horizontal screen position. The character processing controls 152 signals the mode controls 172 which in turn applies a transfer signal to the variable tab register 62 to transfer the POS character from the input/output buffer register 136 into the variable tab register 62. Each time a display cycle is performed, a variable tab comparator 286 (FIG. 2C) compares the output of the variable tab register 62 with the output of the horizontal position counter 18 and when these outputs are equal generates a signal to the memory timing and control 40. The memory control and timing 40 then transfers the address of the memory address register 64 into the cursor memory address register 58 to thereby position the cursor 14 to the new variable tab stop position.

Another feature of the invention is its capacity to enable the System to display a quantity of data on the screen of a keyboard-monitor which normally would exceed the capacity of the screen. Accordingly, if a full, or substantially full, screen display be regarded as a "page" of data, for example, the invention has the capacity of enabling the System to send a number of pages of data to the Terminal and of providing the Terminal operator with control over the receipt of each page of data. This function of the invention has been designated "-paging," and has been chosen to be used in the present embodiment of the invention with only a single keyboard-monitor, however, the use of the paging feature with a number of keyboard-monitors is within the scope of the invention.

In the present embodiment of the invention, each data message from the System, in the performance of the paging function, has been chosen for purposes of illustration to be no longer than 240 characters and the format to be such that the received data constituting the message occupy no more than three lines when displayed. Each time the Terminal receives such a message, a paging decoder 288 (FIG. 2C) will detect the output state of the memory address register 64 to determine whether the display contains data in the last block of 256 characters of the memory 10 and will detect the output of the vertical position counter 24 to determine whether there is data in the last three lines of the display. If neither of these conditions is true, the Terminal will respond automatically through the character processing controls 152 by having an acknowledge character ACK generated in the output encoder 160 and transmitted to the System to have it send the next data message to the Terminal. Since all such messages contain no more than 240 characters and will display on no more than three lines, at some time before the capacity of the screen or memory is reached, the Terminal will detect data in either the last block of 256 characters of memory or the last three lines of the display. Either of these conditions will be detected by the paging decoder 288 when it detects the output of the memory address register 64 as being equal to or exceeding 755 characters, or when it detects the output of the vertical position counter 24 as being equal to or exceeding 23 lines. In either event, the paging decoder 288 will provide the appropriate output to a paging controls circuit 290 which in turn will indicate to the input/output control 110 by a PAGE FULL signal that the screen is full. The input/output control 110 will then signal the mode controls 172 which in turn will signal the character-processing controls 152 to have the output encoder 160 generate a negative acknowledge character NAK and have this character transmitted to the System so that it will stop sending data messages. The Terminal will continue to respond in this manner by transmitting NAK characters to the System and thereby effectively stop the transmission of any data messages from the System, until the Terminal operator intervenes and takes some action.

At the time that the Terminal detects the page-full condition, the PAGE FULL indicator lamp (FIG. 8) on the monitor will light. Upon detection of a Receive message when the PAGE FULL indicator lamp is lit, the RECEIVE ALARM indicator lamp will also be lit. Therefore, at this point in time, these two lamp indicators will indicate to the Terminal operator that the screen is full and that the System has more data to be displayed. The operator may then take either of two actions. He may clear the screen and receive another screen full of data, or he may leave a portion of the received data on the screen and allow additional data to be received and displayed.

To clear the screen, the operator need only depress the RECEIVE key. This will automatically clear the display and allow a new page to be loaded and displayed. If the operator wants to retain some of the displayed data, he may delete the data that he does not wish to retain by means of the appropriate editing keys. When sufficient data has been deleted to allow at least 240 characters or three lines to be added to the displayed data, the PAGE FULL indicator lamp will be extinguished. The RECEIVE ALARM indicator lamp will still be lit so as to continue to inform the operator that the System has additional data to be sent. The operator will then depress the RECEIVE key to allow additional data to be loaded and displayed. These procedures are repeated until the System sends the complete amount of data to be displayed, or until the operator terminates the sequence.

Another feature of the invention is its ability to operate in a forms mode in which the System can display a message on one or more screens in such form as to limit operator access to predefined areas of the screen. Operation in the forms mode may be accomplished in either one of two modes, unalterable or alterable.

When the record separator character RS, which is displayed as a leftwardly pointing delta 126 (FIG. 41), is displayed in the first character position CP–1 of the top line of the screen, bit B5 (Table II) will have been set in the control storage register 60 by the memory control and timing 40 from the time the RS character was loaded into the memory 10, and the screen will contain an unalterable form that causes the Terminal to prevent the operator from entering or deleting data in any character position except those between the US and RS characters, that is, between the rightwardly pointing delta 124 and the leftwardly pointing delta 126. In the unalterable forms mode, the insert, delete, fixed tab and variable tab functions are inhibited to prevent the operator from expanding or contracting any preassigned operator areas. Therefore, as shown in FIG. 41, for example, the operator can enter data into the operator area 292 between the deltas 124 and the deltas 126, however, the area 292 cannot be expanded or contracted by the operator when operating in the unalterable mode.

If the cursor 14 is moved in the unalterable mode into any prohibited area between an RS character and a US character, that is, between a delta 126 on the left and a delta 124 when proceeding toward the right from the delta 126, as into the area containing the name "Mary Lee," for example (FIG. 41), the Terminal will automatically position the cursor 14 to the first character position following the next US character or delta 124. The manner in which the cursor 14 is so positioned to the first character position following the next delta 124 will now be described.

Figure 41:
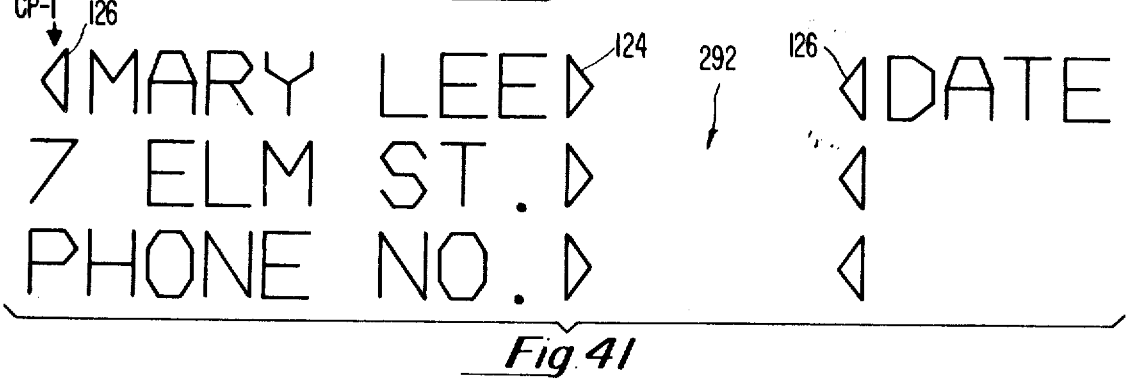
FIG. 41 illustrates a display in an unalterable forms mode.

It will be assumed that the cursor 14 has been moved by the operator so as to embrace, for example, the letter "L" in the prohibited area containing the name "Mary Lee" (FIG. 41). The cursor 14 will actually be displayed at this position but only for an instant. When the operator first depresses the appropriate key or keys to so position the cursor 14, bit B5 (Table II) in the control storage register 60 will be detected by the memory control and timing 40 and will indicate that an unalterable form is on the screen. This will cause a search to be made for RS and US characters during the display cycle of the particular screen involved, with the memory 10 being addressed by the memory address register 64. Each time an RS character is read out into the display register 76, the display register decoder 80 will detect this character and provide a RECORD SEPARATOR output signal to set a First flip-flop in a forms control 294 (FIG. 2E). Each time a US character is read out into the display register 76, the display register decoder 80 will detect this character and will provide a UNIT SEPARATOR output signal which will reset the First flip flop in the forms control 294. If the cursor 14 is displayed at a time when the First flip flop in the forms control 294 is set, that is, when the address in the memory address register 64 equals the address in the cursor memory address register 58, these conditions will be detected by the forms control 294 which will cause a Second flip-flop therein to be set. Setting of the Second flip-flop in the forms control 294 will indicate to the memory control and timing 40 that the cursor 14 is to be moved to the next character position following the next US character. Therefore, the search will continue until the next US character is read out into the display register 76. At this time, the address in the memory address register 64 will be transferred into the cursor memory address register 58 and the cursor memory address register 58 then counted up by one count by the memory control and timing 40 to position the cursor 14 to the next character position following the US character or delta 124, and therefore into the allowable operator area 292.

As indicated previously, in the unalterable mode, the variable tab and fixed tab functions are inhibited. However, in this mode, the FIXED TAB key is programmed to perform a forms mode tab function. Therefore, depressing the FIXED TAB key in this mode allows the operator to change from one operator area to another by positioning the cursor 14 to the character position following the next US character. If there are no US characters between the position of the cursor 14 and the end of the screen at the time when the FIXED TAB key is depressed, the cursor 14 will be positioned to the character position following the first US character on the screen (i.e., wraparound).

If the character displayed in the first character position CP–1 of the top line of the screen is a unit separator character US, which is displayed by a rightwardly pointing delta 124 (FIG. 40), bit B1 (Table II) in the control storage register 60 will have previously been set. The Terminal will be in the alterable mode in which it functions basically as in the unalterable mode except that the operator is allowed to expand or contract the operator areas of the screen. Each operator area of the screen between a delta 124 and a delta 126, such as the operator area 296, for example, is treated as if it were a separate screen and with the capacity to be expanded and contracted by the entering or deleting of characters therein. If the cursor 14 is positioned so as to embrace an RS character, that is, a delta 126, and an input data character is entered, the delta 126 and the following existing data are shifted one character position to the right and the input data character placed into the operator area in front of, or to the left of, the delta 126. If the NEW LINE key is depressed so as to cause the cursor 14 to be placed into a nonoperator area, the Terminal will automatically insert a new-line character CR and assign an additional line to the operator area.

The INSERT and DELETE keys are enabled when an alterable form is on the screen. The character delete function is modified to inhibit the deletion of RS characters. Performing the line delete function with an alterable form on the screen will cause deletion from the cursor 14 to the end of the line, or to the first RS character.

The FIXED TAB key is used for performing the same forms mode tab function in the alterable mode as in the unalterable mode. The variable tab function and the normal fixed tab function are inhibited also in the alterable mode. However, even though the normal fixed tab function is inhibited in the alterable mode, tab characters may be placed by the data processor, or System, in either the operator or nonoperator areas for formatting purposes.

The invention may also be operated in a compose forms mode which may be enabled by any of the Terminal operators by means of a suitable switch, not shown, on each of the keyboard-monitors KM-O to KM-3. The compose forms mode is a method of disabling the forms control 294 so as to permit the operator to type RS and US characters and obtain access to the entire screen.

When loading data from the System into the memory 10, a program error detection function is performed for determining whether the System has overloaded the screen. If the System loads the particular one of the memory sections MS-O to MS-3 to its last address or memory cell, a Program Error Detection flip-flop is set for that particular screen or section of memory in a program error detection circuit 296 (FIG. 2A) and the resulting signal transmitted to the mode controls 172 to cause the input/output section to respond by transmitting a negative acknowledge character NAK to the System. Also, if in the display cycle for the particular screen, 26 new-line characters CR are read out into the display register 76 indicating that an attempt was made to display data in a nonexistent line 26 prior to the receipt of the end-of-screen character EOS from the System, the Program Error Detection flip-flop in the program error detection circuit 296 is again set and the resulting signal similarly transmitted to the mode controls 172. In order to allow sufficient time to detect a screen overflow which would result in too many lines, the response to all messages from the System is delayed by a maximum of 34 ms. to insure that the particular screen will pass through at least one display cycle after a message is loaded into its associated memory section. During this time, the program error is detected and a negative acknowledge response NAK transmitted to the System.

We claim:

1. A display terminal comprising a plurality of display media, storage means for storing groups of character codes each group representative of symbols to be displayed on one of said display media, means common to said display media and responsive to the character codes of each group for generating the representative symbol information to the associated one of said display media to be used in effecting the display and including a common blanking control for controlling blanking of the display on each of said display media, means for repetitively generating a sequence of periodic pulses in successive time periods in a fixed order each pulse associated with one of said display media, and steering means responsive to each one of said pulses for steering the output of said blanking control in each time period so that in each time period the display of the associated display medium is enabled and the display of the other display media is blanked.

2. A display terminal according to claim 1 wherein said storage means is an addressable magnetic memory with consecutively addressed storage cells certain of which are for storing said character codes, and wherein said magnetic memory is divided logically into sections each section allocated to one of said display media and for storing one of said groups of character codes.

3. A display terminal according to claim 1 wherein said steering means comprises a plurality of gates, each gate responsive to one of said pulses in one of said time periods for providing an output steering signal to said blanking control.

4. A display terminal according to claim 3 wherein each of said pulses is part of an individual pulse train and the pulses in each pulse train are periodic.

5. A display terminal comprising a plurality of display media operable in successive display cycles, an addressable nonvolatile memory having a plurality of fixed storage cells for storing character codes certain of which are control character codes and others are display character codes, each display character code representing s symbol to be displayed on one of said display media, said memory being divided logically into a number of memory sections each allocated to one of said display media and each memory section having a display data portion for storing display character codes and a control portion for storing control character codes, said memory sections being similarly organized so that the storage cells for storing control character codes have the same location in each memory section and similarly located individual storage cells of the several memory sections are assigned to storing the same kind of control character code, a memory address register for addressing the display data portion of said memory sections, control means for adjusting said memory address register to selectively address said memory sections in the respective display cycles and to address the storage cells in the display data portion of said selected memory section, a display register, means for reading out each display character code at the address specified by said memory address register into said display register, a cursor memory address register for storing the address of a cursor marker symbol to be displayed on the selected display medium, control addressing means operable by said control means for addressing the storage cells in the control portion of each memory section, transfer means including said control addressing means operative at the end of a display cycle of one of said display media for writing back into the control portion of its associated memory section the address from said cursor memory address register and for reading out into the cursor memory address register the cursor address from the control portion of the associated memory section of the next display medium to enter into a display cycle, means coupled to and including said control means for selecting the display medium associated with the selected memory secton, symbol generating means common to said display media and responsive to each character code in said display register for generating the corresponding symbol information to the selected display medium to be used in effecting the display, and means responsive to particular states of said memory address register and said cursor memory address register for initiating the display of said cursor marker symbol on said selected display medium.

6. A display terminal according to claim 5 including an individual keyboard for each display medium for manual entry of input data, means for converting said input data into character codes and loading said character codes into the associated memory sections, and a multibit control storage register whose storage is used by logic in said control means for performing certain keyboard loading functions, the bits in said control storage register being updated by means including said control means in accordance with the particular type of character codes that are read out into said display register during each display cycle, said transfer means including means operative at the end of a display cycle of one of said display media for writing back into the control portion of its associated memory section the storage from said multibit control storage register and for reading out into said multibit control storage register the control storage from the control portion of the associated memory section of the next display medium to enter into a display cycle.

7. A display terminal according to claim 5 wherein each display medium has a plurality of display positions and means responsive to said symbol information for displaying the corresponding symbol at a display position, and wherein said display terminal further includes positioning means responsive to successive pulses from said control means for positioning the display to successive display positions, a variable tab register, means for loading a variable tab position character code into said variable tab register which defines a variable tab stop at one of said display positions, and means responsive to a variable tab character in said display register for transferring the contents of the variable tab register into said positioning means so that the symbol of the character code following in memory said variable tab character will be displayed at said variable tab stop, said transfer means including means operative at the end of a display cycle of one of said display media for writing back into the control portion of its associated memory section the variable tab position character code from said variable tab register and for reading out into said variable tab register the variable tab position character code from the control portion of the associated memory section of the next display medium to enter into a display cycle.

8. In a display apparatus comprising a display medium with successive display positions, a multibit position counter responsive to count pulses for providing output states each for establishing one of said display positions, a magnetic memory having a sequence of addressable memory cells each capable of storing a character code which may be a displayable character code or a nondisplayable format effector character code, a display register, control means providing said count pulses for counting, setting and resetting said multibit position counter, means for sequentially reading out said character codes into said display register, means for detecting character codes in said display register, and symbol generating means responsive to detected displayable character codes in said display register for generating and displaying their corresponding symbols at display positions established by said multibit position counter, the method of displaying a symbol at one of a number of fixed tab positions in which adjacent ones of said tab positions are $x$ positions apart comprising the steps of detecting a format effector fixed tab character code in said display register, resetting the $n$ least significant bits of said multibit position counter to zero count, adding a count of $x$ to said multibit position counter, detecting the next displayable character code in said display register which follows said format effector fixed tab character code, and displaying the symbol corresponding to said next displayable character code at the position specified by said multibit position counter, and wherein $$x=2^n.$$

9. In a communications system comprising a data processor and a display terminal capable of engaging in two-way communication with said data processor, said display terminal comprising a display medium having a screen with successive display positions, positioning means responsive to count pulses for establishing said display positions, a magnetic memory having a sequence of addressable memory cells each capable of storing a character code, control means providing said count pulses, a readout means including said control means and an address register for addressing said memory and sequentially reading out said character codes, and symbol generating means responsive to the readout of each character code for generating and displaying the corresponding symbol at a display position established by said positioning means, the method of transmitting by said data processor and receiving by said display terminal a page of information to be displayed on said screen comprising the steps of transmitting to said terminal by said data processor a character code message of predetermined maximum length less than the capacity of said memory and less than the capacity of said screen, loading said message into the memory, sequentially reading out the character codes in said memory by means of said readout means, decoding the output states of said address register, transmitting a first signal to said data processor by said display terminal to have it transmit to the display terminal another message of like construction if the decoded output of said address register indicates that the last block of $x$ memory cells does not contain a message character code, repeating said steps until the decoded output of said address register indicates that said last block of $x$ memory cells contains message character code data corresponding to a page-full screen condition, and transmitting a second signal to said data processor to have it stop transmitting any further messages to said display terminal.

10. The method of claim 9 including the steps of manually causing the clearing of said magnetic memory so as to clear the display on said screen, terminating said second signal, and transmitting another said first signal to said data processor from said display terminal to have it resume the transmission of message data to said display terminal.

11. In the communications system of claim 9 in which said positioning means includes a vertical position counter for establishing the vertical line position for the display on said screen, the method of claim 9 including the further steps of decoding the output states of said vertical position counter substantially simultaneously with the decoding of said address register, transmitting said first signal to said data processor by said display terminal to have it transmit to said display terminal another message of like construction if the decoded output of said vertical position counter indicates that the last $y$ lines of said screen do not display any symbol of a message character code, repeating said further steps until the decoded output of said vertical position counter indicates that at least one of said last $y$ lines of said screen displays the symbol of a message character code corresponding to a page-full screen condition, and transmitting a third signal to said data processor to have it stop transmitting any further messages to said display terminal.

12. The method of claim 11 including the steps of manually causing the clearing of said magnetic memory so as to clear the display on said screen, terminating said third signal, and transmitting another said first signal to said data processor from said display terminal to have it resume the transmission of message data to said display terminal.

13. The method of claim 11 including the steps of manually causing the deleting of a selected number of character codes in said memory after the attainment of a page-full condition, said selected number being equal to or greater than the number of character codes in said character code message of predetermined maximum length, or said selected number of character codes being such as to result in the deletion of the display on at least the last $y$ lines of said screen, and transmitting another said first signal to said data processor from said display terminal to have it resume the transmission of message data to said display terminal.

14. In a display apparatus comprising a display medium having successive display positions, positioning means responsive to count pulses for establishing said display positions, a magnetic memory having a plurality of addressable memory cells each capable of storing a character code, means for loading character code data into said memory, a display register, control means providing said count pulses, readout means including said control means and a memory address register for addressing said memory and sequentially reading out said character codes into said display register, means for decoding character codes in said display register, symbol generating means responsive to the output of said decoding means for generating and displaying symbols corresponding to said character codes at display positions established by said positioning means, first and second storage devices for storing control information, and a cursor memory address register for storing the character code address of a cursor marker symbol to be displayed at one of said display positions, the method of displaying an alterable form and preventing the placement of said cursor marker symbol permanently into a prohibited area of said form comprising the steps of loading into said magnetic memory a number of character codes of which there are at least two US (unit separator) character codes and at least one RS (record separator) character code in such order that the display area between the symbol of a US character code and the symbol of an RS character code defines an expansible and contractable operator area and the display area between the symbol of an RS character code and a US character code defines a prohibited area and so that the first US character code loaded into said memory is stored in a predetermined memory cell, recording in said first storage device the fact that said predetermined memory cell is storing a US character code, detecting the initial placement of said cursor marker symbol into a prohibited area, detecting the storage in said first storage device, reading out said memory sequentially into said display register, decoding each character code read out and setting a second storage device if the character code is a US character code or resetting said second storage device if the character code read out is an RS character code, comparing the address of the memory address register with the address in the cursor memory address register until a state of comparison is reached which causes the display of said cursor marker symbol at a display position corresponding to the address in said memory address register, detecting the set state of said second storage device at the time of said cursor marker symbol display, continuing to read out said memory until the next US character code is decoded in said display register, transferring the address in said memory address register into said cursor memory address register, and counting up said cursor memory address register by one count to cause the cursor marker symbol to be displayed in an operator area following the symbol of said next US character code.

* * * * *